(12) United States Patent
Yasumura

(10) Patent No.: US 7,158,389 B2
(45) Date of Patent: Jan. 2, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/534,609

(22) PCT Filed: Nov. 28, 2003

(86) PCT No.: PCT/JP03/15236

§ 371 (c)(1),
(2), (4) Date: Feb. 6, 2006

(87) PCT Pub. No.: WO2004/051833

PCT Pub. Date: Jun. 17, 2004

(65) Prior Publication Data

US 2006/0239039 A1    Oct. 26, 2006

(30) Foreign Application Priority Data

| Nov. 29, 2002 | (JP) | ............................ 2002-348139 |
| Jan. 16, 2003 | (JP) | ............................ 2003-008689 |
| Oct. 20, 2003 | (JP) | ............................ 2003-359754 |

(51) Int. Cl.
H02M 3/335 (2006.01)

(52) U.S. Cl. .......................................... 363/17; 363/98

(58) Field of Classification Search ................. 363/16, 363/17, 21.02, 97, 98, 131, 132
See application file for complete search history.

(56) References Cited

U.S. PATENT DOCUMENTS

| 5,442,540 | A | * | 8/1995 | Hua et al. ..................... 363/98 |
| 5,757,626 | A | * | 5/1998 | Jovanovic et al. .......... 363/132 |
| 6,366,474 | B1 | * | 4/2002 | Gucyski ....................... 363/16 |
| 6,839,245 | B1 | * | 1/2005 | Yasumura ................ 363/21.02 |

FOREIGN PATENT DOCUMENTS

| EP | 1 172 924 A2 | 1/2002 |
| JP | 07-263262 | 10/1995 |
| JP | 8-37778 A | 2/1996 |
| JP | 8-103078 A | 4/1996 |
| JP | 8-289553 A | 11/1996 |
| JP | 2002-34249 A | 1/2002 |

* cited by examiner

Primary Examiner—Jessica Han
(74) Attorney, Agent, or Firm—Lerner, David, Littenberg, Krumholz & Mentlik, LLP

(57) ABSTRACT

A switching power supply circuit having a power factor improving function that makes it possible to improve power conversion efficiency and reduce size and weight of the circuit. A complex resonant converter is formed by at least combining a current resonant converter of a half-bridge coupling system on a primary side with a partial resonant voltage circuit. Power factor improvement is made by performing voltage feedback of a switching output of the complex resonant converter to a rectification current path by a power factor improving transformer (a loosely coupled transformer VFT), interrupting a rectification current by a rectifier diode, and thereby increasing a conduction angle of an alternating input current. Thus, for example, the power supply circuit having a power factor improving circuit does not need to employ a configuration in which a choke coil is inserted in a commercial alternating-current power supply line.

7 Claims, 28 Drawing Sheets

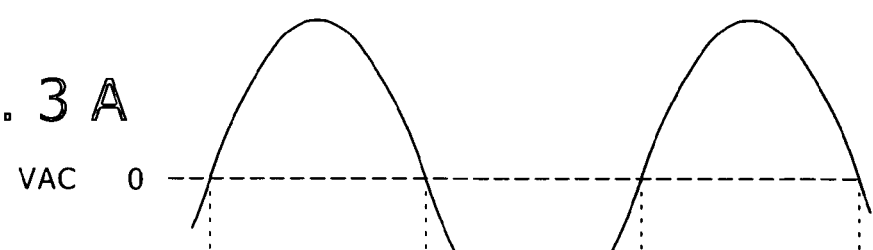
FIG.3A VAC
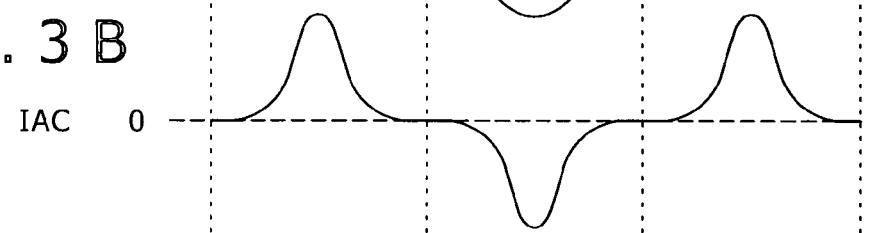
FIG.3B IAC
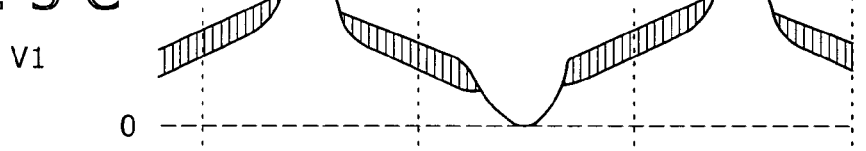
FIG.3C V1
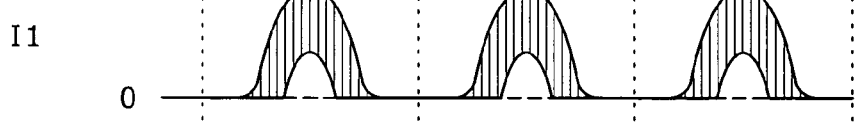
FIG.3D I1
FIG.3E V2
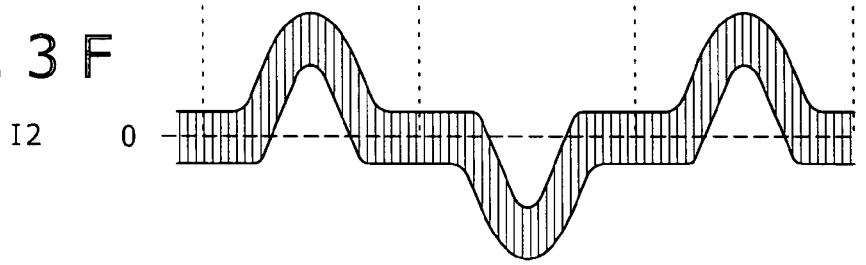
FIG.3F I2

FIG. 8A  VAC  0
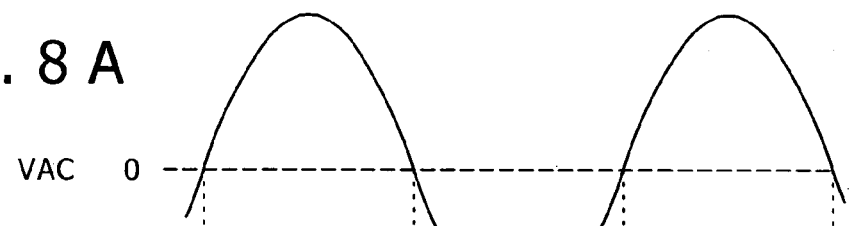
FIG. 8B  IAC  0
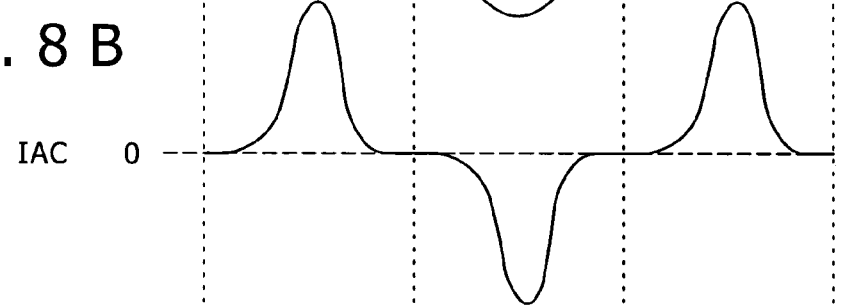
FIG. 8C  V1  0
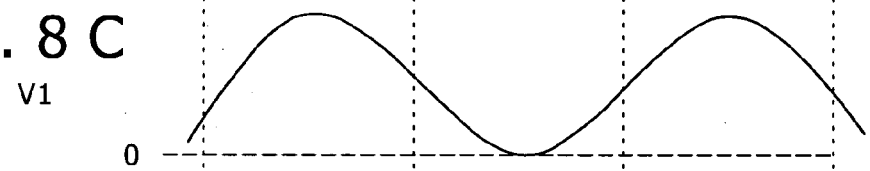
FIG. 8D  I1  0
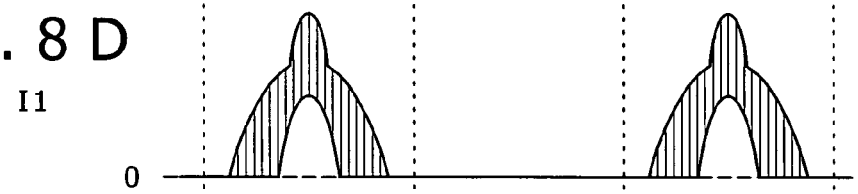
FIG. 8E  I2  0
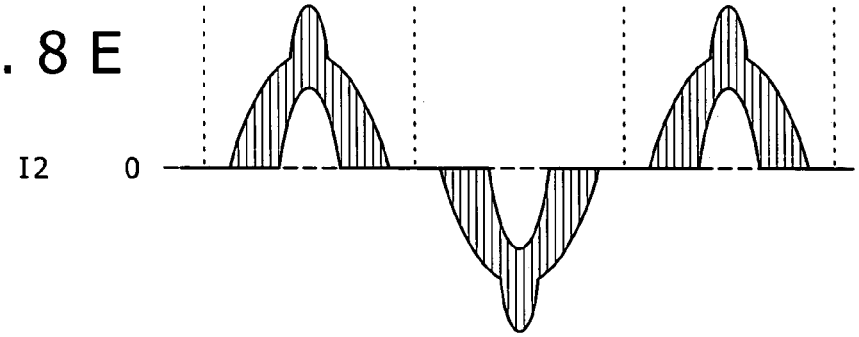

SWITCHING POWER SUPPLY CIRCUIT

TECHNICAL FIELD

The present invention relates to a switching power supply circuit having a circuit for power factor improvement.

BACKGROUND ART

Recently, due to development of switching devices capable of withstanding relatively high current and voltage of high frequency, most of power supply circuits that rectify a commercial power supply and obtain a desired direct-current voltage have become switching type power supply circuits.

Switching power supply circuits have a transformer and other devices miniaturized by raising switching frequency, and are used as a power supply for various electronic devices as a high-power DC—DC converter.

Generally, when a commercial power supply is rectified, a current flowing in a smoothing circuit forms a distorted waveform, thus causing a problem in that a power factor indicating efficiency of use of the power supply is degraded.

In addition, a measure to suppress harmonics caused by the distorted current waveform is required.

Accordingly, various switching power supply circuits having a configuration for power factor improvement added thereto are proposed. As one of such switching power supply circuits, a switching power supply circuit using a so-called choke input system is known in which a power choke coil is inserted in series with a commercial alternating-current power supply line to thereby increase a conduction angle of alternating input current and thus improve a power factor (see Japanese Patent Laid-Open No. Hei 7-263262 (FIG. 19)).

FIG. 27 shows an example of a switching power supply circuit configured to improve a power factor by a choke input system as described above. In this power supply circuit shown in this figure, a power factor improving configuration of the choke input system is added to a configuration of a complex resonant converter previously proposed by the present applicant.

Incidentally, the power supply circuit shown in this figure meets conditions of [load power Po=150 W or higher and an alternating input voltage VAC=100 V system].

The power supply circuit shown in this figure has a common mode noise filter formed by connecting a common mode choke coil CMC and two across capacitors CL to a commercial alternating-current power supply AC. The common mode noise filter suppresses noise transmitted from a switching converter side to the commercial alternating-current power supply AC, for example.

A rectifying and smoothing circuit comprising a bridge rectifier circuit Di and a smoothing capacitor Ci is provided for a line of the commercial alternating-current power supply AC as shown in the figure. This rectifying and smoothing circuit is supplied with the commercial alternating-current power supply AC and then performs a rectifying and smoothing operation, whereby a rectified and smoothed voltage Ei having a level corresponding to the alternating input voltage VAC multiplied by unity is obtained across the smoothing capacitor Ci. The rectified and smoothed voltage Ei is supplied as direct-current input voltage to a switching converter in a succeeding stage.

As a configuration for power factor improvement, a power choke coil PCH is inserted in series with the line of the commercial alternating-current power supply AC. In this case, the power choke coil PCH is inserted in a negative electrode line of the commercial alternating-current power supply AC.

When the power choke coil PCH is thus inserted in the line of the commercial alternating-current power supply AC, as is well known, an inductance Lpch of the power choke coil PCH acts to suppress harmonics of an alternating input current flowing into rectifier diodes forming the bridge rectifier circuit Di from the commercial alternating-current power supply AC. That is, a conduction angle of the alternating input current IAC is increased to improve the power factor.

The power supply circuit shown in this figure has a complex resonant converter as switching converter that is supplied with the above-mentioned rectified and smoothed voltage Ei for operation. The complex resonant converter in this case refers to a switching converter having a resonant circuit added to a primary side or a secondary side thereof in addition to a resonant circuit provided to convert operation of the switching converter into a resonant type operation, so that the plurality of resonant circuits are operated in a complex manner within one switching converter.

The resonant converter provided as the complex resonant converter in the power supply circuit shown in FIG. 27 is of a current resonant type. The current resonant converter in this case has two switching devices Q1 and Q2 formed by a MOS-FET connected to each other by half-bridge coupling as shown in the figure. Damper diodes DD1 and DD2 are connected in a direction shown in the figure in parallel with the switching devices Q1 and Q2 between a drain and a source of the switching devices Q1 and Q2, respectively.

A partial resonant capacitor Cp is connected in parallel with the switching device Q2 between the drain and the source of the switching device Q2. A capacitance of the partial resonant capacitor Cp and a leakage inductance L1 of a primary winding N1 form a parallel resonant circuit (a partial voltage resonant circuit). Then, a partial voltage resonant operation, in which voltage resonance occurs only when the switching devices Q1 and Q2 are turned off, is obtained.

The power supply circuit is provided with a control IC 2 to switching-drive the switching devices Q1 and Q2. The control IC 2 includes an oscillating circuit for driving the current resonant converter by an external excitation system, a control circuit, a protecting circuit and the like. The control IC 2 is a general-purpose analog IC (Integrated Circuit) having a bipolar transistor therewithin.

The control IC 2 operates on a direct-current voltage input to a power supply input terminal Vcc. The rectified and smoothed voltage Ei is input as a starting voltage to the power supply input terminal Vcc via a starting resistance RS. The control IC 2 is started by the starting voltage input to the power supply input terminal Vcc at a time of a start of power supply.

The control IC 2 has two drive signal output terminals VGH and VGL as terminals for outputting drive signals (gate voltages) to the switching devices.

The drive signal output terminal VGH outputs a drive signal for switching-driving the high side switching device. The drive signal output terminal VGL outputs a drive signal for switching-driving the low side switching device.

In this case, the drive signal output terminal VGH is connected to a gate of the high side switching device Q1. The drive signal output terminal VGL is connected to a gate of the low side switching device Q2.

Thus, the high side drive signal output from the drive signal output terminal VGH is applied to the gate of the switching device Q1. The low side drive signal output from the drive signal output terminal VGL is applied to the gate of the switching device Q2.

Though not shown in the figure, a bootstrap circuit as an external circuit is connected to the control IC 2. This bootstrap circuit shifts level of the high side drive signal output from the drive signal output terminal VGH to a level at which the switching device Q1 can be driven properly.

The control IC 2 generates an oscillating signal of a required frequency by the internal oscillating circuit. Then, the control IC 2 generates the high side drive signal and the low side drive signal using the oscillating signal generated by the oscillating circuit. The high side drive signal and the low side drive signal are generated in such a relation as to have a 180° phase difference from each other. Then, the control IC 2 outputs the high side drive signal from the drive signal output terminal VGH, and outputs the low side drive signal from the drive signal output terminal VGL.

The high side drive signal and the low side drive signal are applied to the switching devices Q1 and Q2, respectively. In a period of an H level of the drive signal, the gate voltage of the switching devices Q1 and Q2 is higher than a gate threshold value, and therefore the switching devices Q1 and Q2 are in an on state. In a period of an L level of the drive signal, the gate voltage of the switching devices Q1 and Q2 is lower than the gate threshold value, and therefore the switching devices Q1 and Q2 are in an off state. Thus the switching devices Q1 and Q2 are switching-driven at a required switching frequency in timing in which the switching devices Q1 and Q2 are turned on/off alternately.

The isolated converter transformer PIT is provided to transmit a switching output of the switching devices Q1 and Q2 from the primary side to the secondary side.

In this case, one end of the primary winding N1 of the isolated converter transformer PIT is connected to a point of connection (a switching output point) between the switching devices Q1 and Q2 via a primary side series resonant capacitor C1. Another end of the primary winding N1 is connected to a primary side ground.

A capacitance of the series resonant capacitor C1 and the leakage inductance (L1) of the primary winding N1 form a primary side series resonant circuit. This primary side series resonant circuit is supplied with the switching output of the switching devices Q1 and Q2 and thereby performs resonant operation. Thereby the primary side series resonant circuit converts the operation of a switching circuit comprising the switching devices Q1 and Q2 into a current resonant type operation.

Thus, the primary side switching converter in the circuit shown in FIG. 27 obtains the current resonance type operation by the primary side series resonant circuit (L1–C1) and the partial voltage resonant operation by the partial voltage resonant circuit (Cp//L1) described above.

That is, the power supply circuit shown in this figure employs the form of the complex resonant converter in which the resonant circuit for making the primary side switching converter a resonant converter is combined with another resonant circuit.

A secondary winding N2 is wound on the secondary side of the isolated converter transformer PIT.

The secondary winding N2 in this case is provided with a center tap, which is connected to a secondary side ground. A full-wave rectifier circuit comprising rectifier diodes D01 and D02 and a smoothing capacitor C0 is connected to the secondary winding N2. Thereby a secondary side direct-current output voltage E0 is obtained as a voltage across the smoothing capacitor C0. The secondary side direct-current output voltage E0 is supplied to a load side not shown in the figure, and also branches off to be input as a detection voltage for a control circuit 1.

The control circuit 1 supplies, as a control output, a current or a voltage varied in level according to level of the secondary side direct-current output voltage E0 input to the control circuit 1 to a control input terminal Vc of the control IC 2. The control IC 2 varies the frequency of the oscillating signal, for example, according to the control output input to the control input terminal Vc, and thereby varies the frequency of the drive signals to be output from the drive signal output terminals VGH and VGL. Thereby the switching frequency of the switching devices Q1 and Q2 is variably controlled. By thus varying the switching frequency, the level of the secondary side direct-current output voltage E01 is controlled to be constant. That is, stabilization by a switching frequency control system is performed.

FIG. 28 shows, by solid lines, characteristics of the power factor PF, power conversion efficiency ηAC→DC, and the level of the rectified and smoothed voltage Ei (direct-current input voltage) in a load variation range of load power Po=150 W to 0 W when the alternating input voltage VAC=100 V in the case of the power supply circuit shown in FIG. 27.

For comparison, characteristics in a case where the power supply circuit shown in FIG. 27 does not have a power factor improving configuration are shown by broken lines. That is, characteristics when the component of the inductance Lpch of the power choke coil PCH is omitted from the line of the commercial alternating-current power supply AC are shown by the broken lines.

FIG. 29 shows characteristics of the power factor PF, the rectified and smoothed voltage Ei, and the power conversion efficiency ηAC→DC in a voltage level variation range of the alternating input voltage VAC=80 V to 120 V when the load power Po=150 W in the case of the power supply circuit shown in FIG. 27.

In obtaining experimental results shown in FIG. 28 and FIG. 29, parts of the power supply circuit shown in FIG. 27 are selected as follows.

The power choke coil PCH Lpch=10 mH

The isolated converter transformer PIT: an EER35 ferrite core, a gap length of 1 mm The primary winding N1=25 T The secondary winding N2: 23 T+23 T with a center tap as a dividing position The primary side series resonant capacitor C1=0.082 μF The partial resonant capacitor Cp=680 pF Parts of the power supply circuit exhibiting the characteristics indicated by the broken lines in FIG. 28, the power supply circuit being formed by omitting the power choke coil PCH (inductance Lpch) from the circuit of FIG. 27, are changed as follows.

The isolated converter transformer PIT: an EER35 ferrite core, a gap length of 1 mm The primary winding N1=31 T The secondary winding N2: 23 T+23 T with a center tap as a dividing position The primary side series resonant capacitor C1=0.068 μF The partial resonant capacitor Cp=680 pF As shown in FIG. 28, the power conversion efficiencies ηAC→DC indicated by a solid line and a broken line both have a tendency to increase as the load power is increased. The characteristic of power conversion efficiency of the circuit shown in FIG. 27 in which the inductance Lpch is inserted, which characteristic is indicated by the solid line, reaches a maximum of ηAC→DC=87.5% when the load power Po=150 W.

The rectified and smoothed voltages Ei indicated by a solid line and a broken line are both decreased gently as the load becomes heavier. The characteristic of the rectified and smoothed voltage Ei when the inductance Lpch is inserted, which characteristic is indicated by the solid line, shows a change of Ei=134 V→115 V with respect to variation of the load power Po=0 W→150 W.

The power factor PF is increased as the load power is increased, and becomes substantially flat when the load power Po=75 W or higher. When the load power Po=150 W, the power factor PF=0.75.

Also, according to FIG. 29, the power factor PF is constant at about 0.75 with respect to variation of the alternating input voltage VAC. The power conversion efficiency ηAC→DC has a tendency of increasing gently as the alternating input voltage VAC rises. The rectified and smoothed voltage Ei rises in substantial proportion to the alternating input voltage VAC.

FIG. 30 shows another example of a complex resonant converter configured to improve a power factor by a choke input system. The power supply circuit shown in this figure can meet conditions of [load power Po=250 W or higher and an alternating input voltage VAC=100 V system]. Incidentally, in this figure, the same parts as in FIG. 27 are identified by the same reference numerals, and description thereof will be omitted.

The power supply circuit shown in this figure meets the condition of a heavier load than the power supply circuit of FIG. 27. Hence, a voltage doubler rectifier circuit is provided as a rectifying and smoothing circuit for generating a rectified and smoothed voltage Ei. The voltage doubler rectifier circuit in this case is formed by connecting two rectifier diodes Dia and Dib and two smoothing capacitors Ci1 and Ci2 connected in series with each other to an commercial alternating-current power supply AC, as shown in the figure.

The voltage doubler rectifier circuit is supplied with the alternating input voltage VAC and performs a rectifying and smoothing operation, whereby the rectified and smoothed voltage Ei corresponding to twice a level of the alternating input voltage VAC is generated across the series connection circuit of the smoothing capacitors Ci1→Ci2.

A primary side switching converter in a succeeding stage is supplied with the thus generated rectified and smoothed voltage Ei as direct-current input voltage, and performs switching operation.

FIG. 31 shows, by solid lines, characteristics of the power factor PF, power conversion efficiency ηAC→DC, and the level of the rectified and smoothed voltage Ei (direct-current input voltage) in a load variation range of load power Po=300 W to 0 W in the case of the power supply circuit shown in FIG. 30.

For comparison, also in this figure, characteristics in a case where the power supply circuit shown in FIG. 30 does not have a power factor improving configuration (in a case without a power choke coil PCH (inductance Lpch)) are shown by broken lines.

FIG. 32 shows characteristics of the power factor PF, the rectified and smoothed voltage Ei, and the power conversion efficiency ηAC→DC in a variation range of the alternating input voltage VAC=80 V to 120 V when the load power Po=300 W.

In obtaining experimental results shown in FIG. 31 and FIG. 32, parts of the power supply circuit shown in FIG. 30 are selected as follows.

The power choke coil PCH Lpch=5 mH

An isolated converter transformer PIT: an EER35 ferrite core, a gap length of 1 mm A primary winding N1=28 T A secondary winding N2: 25 T+25 T with a center tap as a dividing position A primary side series resonant capacitor C1=0.039 μF A partial resonant capacitor Cp=680 pF The power supply circuit formed by omitting the power choke coil PCH (inductance Lpch) from the circuit of FIG. 30 is changed as follows. The power supply circuit thus formed exhibits the characteristics indicated by the broken lines in FIG. 31.

The isolated converter transformer PIT: an EER42 ferrite core, a gap length of 1 mm The primary winding N1=32 T The secondary winding N2=25 T The primary side series resonant capacitor C1=0.033 μF The partial resonant capacitor Cp=680 pF As shown in FIG. 31, the power conversion efficiencies ηAC→DC indicated by a solid line and a broken line are both substantially constant in a range of the load power Po=100 W and higher. The characteristic of power conversion efficiency of the circuit shown in FIG. 30 in which the inductance Lpch is inserted, which characteristic is indicated by the solid line, indicates ηAC→DC=91.1% when the load power Po=300 W.

The rectified and smoothed voltages Ei indicated by a solid line and a broken line are both decreased gently as the load becomes heavier. The characteristic of the rectified and smoothed voltage Ei when the inductance Lpch is inserted, which characteristic is indicated by the solid line, shows a change of Ei=264 V→244 V with respect to variation of the load power Po=0 W→300 W.

The power factor PF has a tendency to increase as the load power is increased. When the load power Po=300 W, the power factor PF=0.75.

Also, according to FIG. 32, while the power factor PF is decreased gently as the alternating input voltage VAC becomes higher, it can be said that with a gradient of this degree, the power factor PF is constant at about 0.75 with respect to variation of the alternating input voltage VAC. The power conversion efficiency ηAC→DC has a tendency of increasing gently as the alternating input voltage VAC rises. The rectified and smoothed voltage Ei rises in substantial proportion to the alternating input voltage VAC.

As described thus far, the power supply circuits shown in FIG. 27 and FIG. 30 improve the power factor by the choke input system. Thereby a value of the power factor PF at a sufficient level to meet a power supply harmonic distortion regulation value for color television receivers, for example, is obtained.

However, the power supply circuits having the configurations shown in FIG. 27 and FIG. 30 have the following problems.

The power choke coil PCH provided for power factor improvement in the power supply circuits of FIG. 27 and FIG. 30 is formed by for example a silicon steel sheet core and a copper wire winding. Hence, there occur a core loss at the core and a copper loss caused by resistance of the copper wire, and therefore a power loss at the part of the power choke coil PCH is correspondingly increased.

Also, an inductance and a resistive component of the choke coil cause a voltage drop in the alternating input voltage VAC. Thereby the direct-current input voltage (rectified and smoothed voltage Ei) obtained by rectifying the alternating input voltage VAC is also lowered.

Thus, power conversion efficiency of the complex resonant converter operating on the direct-current input voltage input thereto is decreased, and also alternating-current input power is increased.

In the case of the power supply circuit shown in FIG. 27, for example, while the power factor PF is improved from 0.55 to 0.75 by inserting the power choke coil PCH, total power conversion efficiency ηAC→DC is decreased by 3.1 percentage points from 90.6% to 87.5%. The alternating-current input power Pin is increased by 5.9 W from 165.5 W to 171.4 W. Incidentally, the rectified and smoothed voltage Ei is lowered by 19 V from 134 V to 115 V.

In the case of the power supply circuit shown in FIG. 30, the power factor PF is improved from 0.60 to 0.75 by inserting the power choke coil PCH. However, the power conversion efficiency ηAC→DC is decreased by 1.7 percentage points from 92.8% to 91.1%. The alternating-current input power Pin is increased by 6.0 W from 320 W to 326.0 W. The rectified and smoothed voltage Ei is lowered by 20 V from 264 V to 244 V.

In addition, the power choke coil PCH has a large size and a great weight among parts constituting the power supply circuit. Therefore the power choke coil PCH occupies a large area on a board, and increases the weight of the circuit board.

When a leakage flux is to be reduced as much as possible in the power choke coil PCH, the core is formed into a ladder-like shape (an E-E-shape or an E-I-shape). For example, the weight and the board occupying area of the power choke coil PCH with such a core of the ladder-like shape are 153 g and 11 cm$^2$, respectively, in the power supply circuit shown in FIG. 27, and 240 g and 19 cm$^2$, respectively, in the power supply circuit shown in FIG. 30.

Further, as described above, the power choke coil PCH causes a relatively large amount of leakage flux. Depending on conditions such as arrangement of parts, the amount of leakage flux and the like, the leakage flux of the power choke coil PCH may affect a load side. In such a case, a part such as a magnetic shield or the like is added as a measure to suppress the leakage flux radiated from the power choke coil PCH, thus increasing the size and weight of the board.

Thus, the power supply circuits configured to improve the power factor by the choke input system have problems in that a decrease in power conversion efficiency, an increase in size and weight of the power supply circuits, and an increase in cost that result from the insertion of the power choke coil are inevitable.

DISCLOSURE OF INVENTION

Accordingly, in view of the above-described problems, a switching power supply circuit according to the present invention is comprised as follows.

The switching power supply circuit includes: rectifying and smoothing means for generating a rectified and smoothed voltage, the rectifying and smoothing means including a rectifying device for rectifying an alternating input voltage and a smoothing capacitor for smoothing the voltage rectified by the rectifying device; switching means for being supplied with the rectified and smoothed voltage generated by the rectifying and smoothing means and performing switching operation, the switching means being formed with two switching devices coupled by half-bridge coupling; and switching-driving means for switching-driving the two switching devices such that the two switching devices are turned on/off alternately.

The switching power supply circuit further includes: an isolated converter transformer formed by winding a primary winding supplied with a switching output obtained by the switching operation of the switching means and a secondary winding in which an alternating voltage as the switching output obtained in the primary winding is induced, and forming a gap of a predetermined length so as to obtain a state of loose coupling with a required coupling coefficient; and a primary side series resonant circuit for being supplied with the switching output from the switching means and converting operation of the switching means into a current resonant type operation, the primary side series resonant circuit being formed by at least a leakage inductance component of the primary winding and a capacitance of a primary side series resonant capacitor connected in series with the primary winding.

The switching power supply circuit further includes: direct-current output voltage generating means configured to generate a secondary side direct-current output voltage by receiving the alternating voltage obtained in the secondary winding and performing a rectifying operation; and constant-voltage control means configured to perform constant-voltage control on the secondary side direct-current output voltage by varying switching frequency of the switching means by controlling the switching-driving means according to level of the secondary side direct-current output voltage.

The switching power supply circuit thus comprised further includes a power factor improving transformer formed by winding a power factor improving primary winding inserted in series with the primary side series resonant circuit and a power factor improving secondary winding inserted in a rectifying and smoothing path formed as the rectifying and smoothing means. The rectifying device of the rectifying and smoothing means performs switching operation on a basis of an alternating voltage induced in the power factor improving secondary winding by the power factor improving primary winding.

In addition, another switching power supply circuit is comprised as follows.

The switching power supply circuit includes: rectifying and smoothing means including a plurality of low-frequency rectifying devices for rectifying an alternating input voltage in each positive/negative period of the alternating input voltage and a smoothing capacitor for smoothing the voltage rectified by the low-frequency rectifying devices; switching means for being supplied with the rectified and smoothed voltage generated by the rectifying and smoothing means and performing switching operation, the switching means being formed with two switching devices coupled by half-bridge coupling; and switching-driving means for switching-driving the two switching devices such that the two switching devices are turned on/off alternately.

The switching power supply circuit further includes an isolated converter transformer formed by winding a primary winding supplied with a switching output obtained by the switching operation of the switching means and a secondary winding in which an alternating voltage as the switching output obtained in the primary winding is induced, and forming a gap of a predetermined length so as to obtain a state of loose coupling with a required coupling coefficient.

The switching power supply circuit further includes a primary side series resonant circuit for being supplied with the switching output from the switching means and converting operation of the switching means into a current resonant type operation, the primary side series resonant circuit being formed by at least a leakage inductance component of the primary winding and a capacitance of a primary side series resonant capacitor connected in series with the primary winding.

The switching power supply circuit further includes: direct-current output voltage generating means configured to generate a secondary side direct-current output voltage by receiving the alternating voltage obtained in the secondary winding and performing a rectifying operation; and constant-voltage control means configured to perform constant-voltage control on the secondary side direct-current output voltage by varying switching frequency of the switching means by controlling the switching-driving means according to level of the secondary side direct-current output voltage.

The switching power supply circuit thus comprised further includes: a power factor improving transformer formed by winding a power factor improving primary winding inserted in series with the primary side series resonant circuit and a power factor improving secondary winding connected in parallel with a predetermined rectifying current path formed as the rectifying and smoothing means; and a plurality of high-frequency rectifying devices connected in series with the power factor improving secondary winding, for performing switching operation in each positive/negative period of the alternating voltage induced in the power factor improving secondary winding by the power factor improving primary winding, the alternating voltage having a high frequency as compared with frequency of the alternating input voltage.

In addition, another switching power supply circuit is comprised as follows.

The switching power supply circuit includes: rectifying and smoothing means including a plurality of rectifying devices for rectifying an alternating input voltage in each positive/negative period of the alternating input voltage and a smoothing capacitor for smoothing the voltage rectified by the rectifying devices; switching means for being supplied with the rectified and smoothed voltage generated by the rectifying and smoothing means and performing switching operation, the switching means being formed with two switching devices coupled by half-bridge coupling; and switching-driving means for switching-driving the two switching devices such that the two switching devices are turned on/off alternately.

The switching power supply circuit further includes an isolated converter transformer formed by winding a primary winding supplied with a switching output obtained by the switching operation of the switching means and a secondary winding in which an alternating voltage as the switching output obtained in the primary winding is induced, and forming a gap of a predetermined length so as to obtain a state of loose coupling with a required coupling coefficient.

The switching power supply circuit further includes a primary side series resonant circuit for being supplied with the switching output from the switching means and converting operation of the switching means into a current resonant type operation, the primary side series resonant circuit being formed by at least a leakage inductance component of the primary winding and a capacitance of a primary side series resonant capacitor connected in series with the primary winding.

The switching power supply circuit further includes: direct-current output voltage generating means configured to generate a secondary side direct-current output voltage by receiving the alternating voltage obtained in the secondary winding and performing a rectifying operation; and constant-voltage control means configured to perform constant-voltage control on the secondary side direct-current output voltage by varying switching frequency of the switching means by controlling the switching-driving means according to level of the secondary side direct-current output voltage.

The switching power supply circuit thus comprised further includes a power factor improving transformer formed by winding a power factor improving primary winding inserted in series with the primary side series resonant circuit and a power factor improving secondary winding connected in parallel with a predetermined rectifying current path formed as the rectifying and smoothing means. The rectifying devices of the rectifying and smoothing means perform switching operation on a basis of an alternating voltage induced in the power factor improving secondary winding by the power factor improving primary winding.

The switching power supply circuit according to the present invention having each of the above-described compositions has a current resonant converter of a half-bridge coupling system on a primary side as a complex resonant converter. For power factor improvement, the switching output of the complex resonant converter is fed back by voltage feedback to a rectifying and smoothing path by a power factor improving transformer, and a rectification current is interrupted by a rectifier diode, whereby a conduction angle of an alternating input current is increased to improve the power factor.

Thus, the switching power supply circuit according to the present invention having a power factor improving function does not need to employ a so-called choke input system in which a power choke coil is inserted in a commercial alternating-current power supply line. Thereby the switching power supply circuit according to the present invention has an effect of greatly improving power conversion efficiency as compared with power factor improvement by the choke input system.

BRIEF DESCRIPTION OF DRAWINGS

FIGS. 3A, 3B, 3C, 3D, 3E, and 3F are waveform charts showing operations of principal parts of the power supply circuit according to the first embodiment on the basis of a period of commercial alternating-current power supply;

FIGS. 8A, 8B, 8C, 8D, and 8E are waveform charts showing operations of principal parts of the power supply circuit according to the third embodiment on the basis of a period of commercial alternating-current power supply;

BEST MODE FOR CARRYING OUT THE INVENTION

Figure 1:
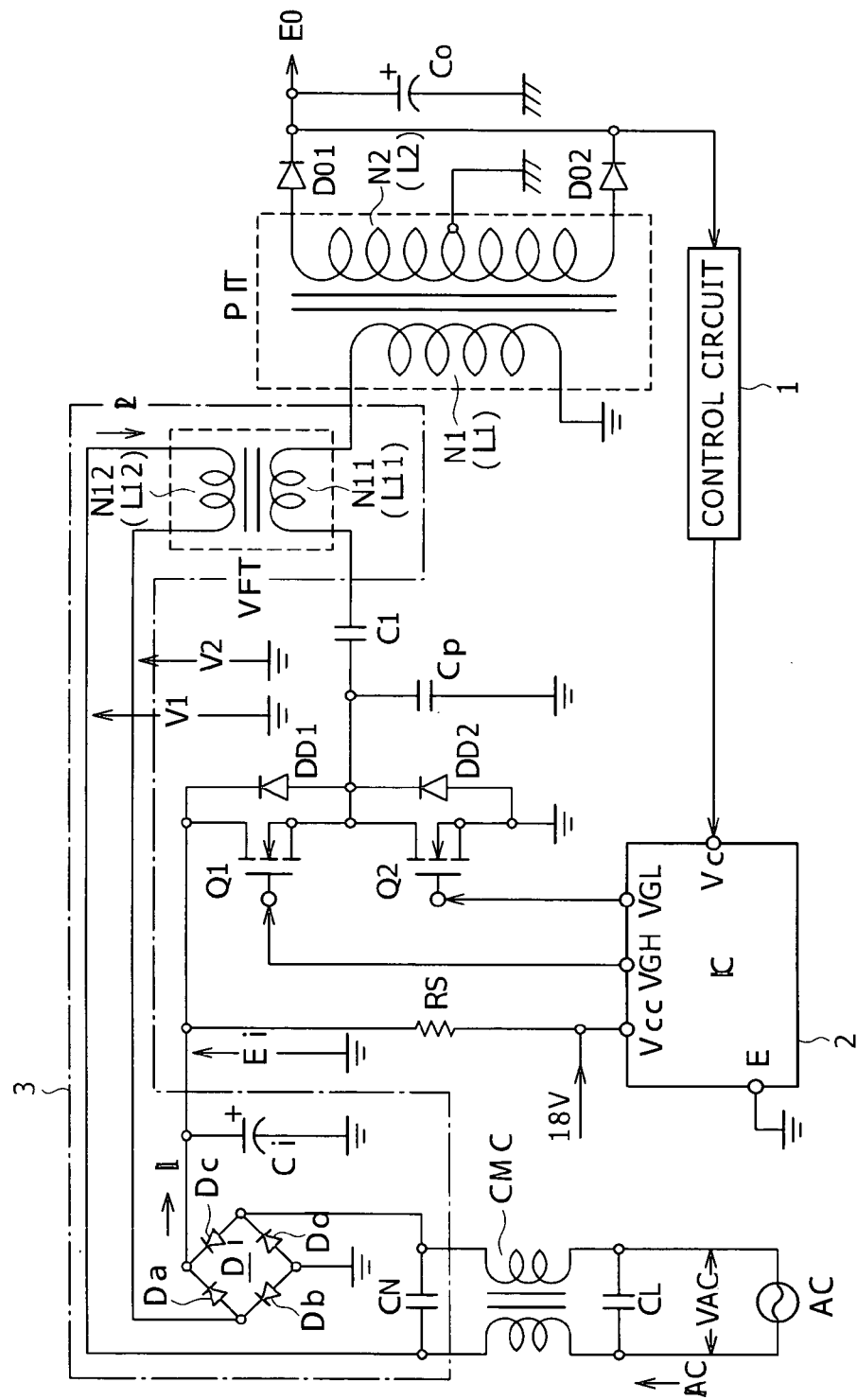
FIG. 1 is a circuit diagram showing an example of configuration of a power supply circuit according to a first embodiment of the present invention.

FIG. 1 shows an example of configuration of a switching power supply circuit according to a first embodiment of the present invention. The power supply circuit shown in this figure meets conditions of a so-called single range of an alternating input voltage VAC=100 V system and a load power Po=150 W or higher. That is, the power supply circuit shown in this figure meets the same load conditions as the foregoing power supply circuit shown in FIG. 27.

First, the power supply circuit shown in this figure has a common-mode noise filter formed by connecting a common-mode choke coil CMC and one across capacitor CL to a commercial alternating-current power supply AC. The common-mode noise filter suppresses noise transmitted from a switching converter side to the commercial alternating-current power supply AC, for example.

Then, the power supply circuit according to the present embodiment employs a configuration in which a power factor improving circuit 3 formed with a rectifier circuit system included therein is connected to the commercial alternating-current power supply AC. As shown in the figure, the power factor improving circuit 3 includes a bridge rectifier circuit Di, a smoothing capacitor Ci, a filter capacitor CN, and a loosely coupled transformer VFT (power factor improving transformer).

A positive electrode input terminal of the bridge rectifier circuit Di is connected to a positive electrode line of the commercial alternating-current power supply AC via a secondary winding N12 of the loosely coupled transformer VFT connected in series with the positive electrode input terminal of the bridge rectifier circuit Di. A negative electrode input terminal of the bridge rectifier circuit Di is connected to a negative electrode line of the commercial alternating-current power supply AC.

A positive electrode output terminal of the bridge rectifier circuit Di is connected to a positive electrode terminal of the smoothing capacitor Ci. A negative electrode terminal of the smoothing capacitor Ci is connected to a primary side ground. A positive electrode output terminal of the bridge rectifier circuit Di is connected to the primary side ground.

As operation of the rectifier circuit system in the thus formed power factor improving circuit 3, a so-called full-wave rectification operation is obtained in which the smoothing capacitor Ci is charged with a rectified output rectified by the bridge rectifier circuit Di in each period of the alternating input voltage VAC supplied from the commercial alternating-current power supply AC being positive/negative. That is, a fundamental configuration of the rectifier circuit system is a full-wave rectifier circuit comprising one set of the bridge rectifier circuit and one set of the smoothing capacitor. The rectification operation of the full-wave rectifier circuit generates a rectified and smoothed voltage Ei having a level equal to that of the alternating input voltage VAC multiplied by unity across the smoothing capacitor Ci.

In addition, a fast recovery type diode (high-frequency rectifier element) is selected as each of rectifier diodes (rectifier elements) Da to Dd forming the bridge rectifier circuit Di in the power factor improving circuit 3. This provision is made for the rectifier diodes Da to Dd to switch rectification current as an operation for power factor improvement, as later described.

Further, the power supply circuit according to the present embodiment employs a circuit configuration in which the secondary winding N12 of the loosely coupled transformer VFT is inserted in the positive electrode line of the commercial alternating-current power supply AC. This means that the secondary winding N12 of the loosely coupled transformer VFT is inserted in series with the rectifier circuit system. As a result of this, an operation that increases a conduction angle of rectification current flowing through the rectifier circuit system is obtained, thus improving a power factor. Incidentally, the power factor improving operation of the power factor improving circuit 3 will be described later.

Figure 2:
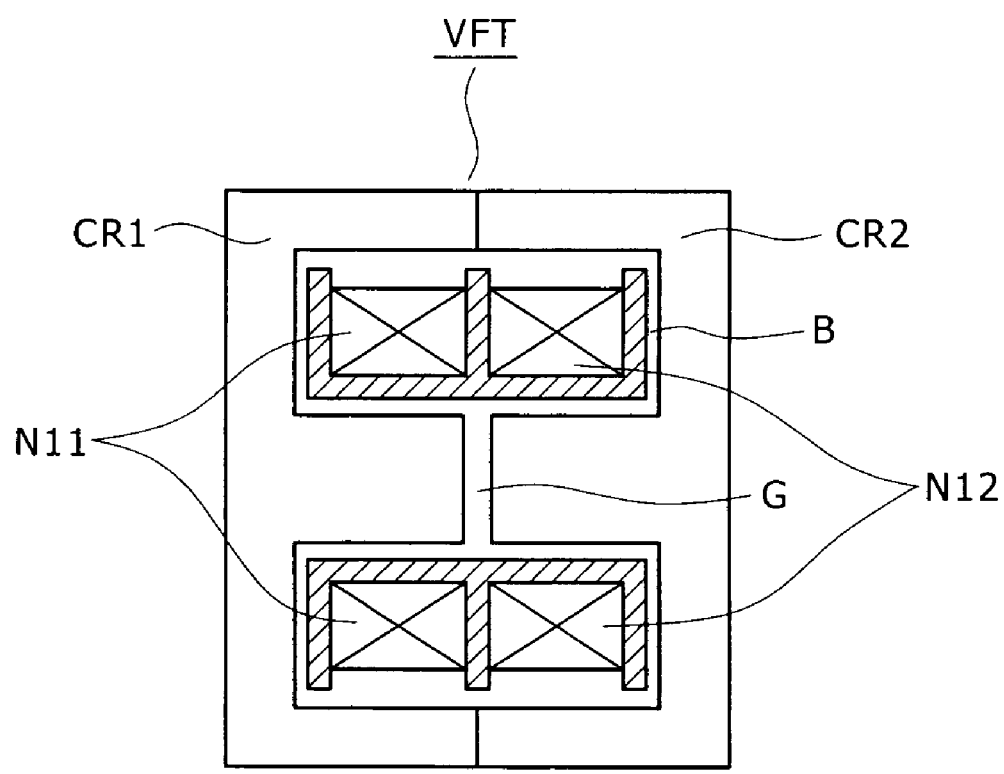
FIG. 2 is a sectional view of an example of structure of a loosely coupled transformer.

FIG. 2 shows an example of structure of the loosely coupled transformer VFT.

As shown in this figure, the loosely coupled transformer VFT has an E-E-shaped core formed by combining E-shaped cores CR1 and CR2 of ferrite material with each other in such a manner that magnetic legs of the core CR1 are opposed to magnetic legs of the core CR2.

A bobbin B is provided which is formed by a resin, for example, into a shape with a primary side winding part and a secondary side winding part divided from each other so as to be independent of each other. A primary winding N11 is wound around one winding part of the bobbin B. The secondary winding N12 is wound around the other winding part of the bobbin B. The bobbin B thus wound with the primary winding and the secondary winding is attached to the above-described E-E-shaped core (CR1 and CR2). Thereby the primary side winding and the secondary side winding are wound around the central magnetic leg of the E-E-shaped core in respective different winding regions. A structure of the loosely coupled transformer VFT as a whole is thus obtained.

Also, a gap G having a required gap length is formed at a junction part of the central magnetic leg. Thereby a state of loose coupling with a required coupling coefficient is obtained. In the first embodiment, and a second, a third, and a fourth embodiment to be described later, for example the gap length of the gap G is about 1.5 mm, and the coupling coefficient is 0.75 or lower.

The switching converter operating while receiving the rectified and smoothed voltage Ei as a direct-current input voltage in FIG. 1 employs the structure of a complex resonant converter in which the fundamental configuration of a current resonant converter is provided with at least a partial voltage resonant circuit on the primary side in this case.

In this case, as shown in the figure, two switching devices Q1 (high side) and Q2 (low side) formed by a MOS-FET are connected to each other by half-bridge coupling. Damper diodes DD1 and DD2 are connected in a direction shown in the figure in parallel with the switching devices Q1 and Q2 between a drain—a source of the switching devices Q1 and Q2, respectively.

A partial resonant capacitor Cp is connected in parallel with the switching device Q2 between the drain—the source of the switching device Q2. A capacitance of the partial resonant capacitor Cp and a leakage inductance L1 of a primary winding N1 form a parallel resonant circuit (a partial voltage resonant circuit). Then, a partial voltage resonant operation, in which voltage resonance occurs only when the switching devices Q1 and Q2 are turned off, is obtained. Incidentally, in this case, the partial voltage resonant circuit actually includes an inductance component L11 of the primary winding N11 of the loosely coupled transformer VFT which winding is connected in series with the primary winding N1 of an isolated converter transformer PIT.

A control IC 2 includes an oscillating circuit for driving the current resonant converter by an external excitation system, a control circuit, a protecting circuit and the like. The control IC 2 is a general-purpose analog IC (Integrated Circuit) having a bipolar transistor therewithin.

The control IC 2 operates on a direct-current voltage (18 V) input to a power supply input terminal Vcc. The power supply input terminal Vcc is also connected with a line of the rectified and smoothed voltage Ei via a starting resistance RS. The control IC 2 is started by the rectified and smoothed voltage Ei input via the starting resistance RS at a time of a start of power supply. The control IC 2 is connected to the primary side ground by a grounding terminal E.

The control IC 2 has two drive signal output terminals VGH and VGL as terminals for outputting drive signals (gate voltages) to the switching devices.

The drive signal output terminal VGH outputs a drive signal for switching-driving the high side switching device. The drive signal output terminal VGL outputs a drive signal for switching-driving the low side switching device.

The high side drive signal output from the drive signal output terminal VGH is applied to a gate of the switching device Q1. The low side drive signal output from the drive signal output terminal VGL is applied to a gate of the switching device Q2.

Incidentally, though not shown in the figure, a bootstrap circuit formed by a peripheral external part is actually connected to the control IC 2. This bootstrap circuit is to shift level of the drive signal applied to the high side switching device Q1 to a level at which the switching device Q1 can be driven properly.

In addition, the switching devices Q1 and Q2 are actually connected with part elements such as a gate resistance, a gate-to-source resistance and the like, though not shown in the figure.

The control IC 2 generates an oscillating signal of a required frequency by the internal oscillating circuit. As later described, the oscillating circuit varies the frequency of the oscillating signal according to level of a control output input from a control circuit 1 to a terminal Vc.

Then, the control IC 2 generates the high side drive signal and the low side drive signal using the oscillating signal generated by the oscillating circuit. Then, the control IC 2 outputs the high side drive signal from the drive signal output terminal VGH, and outputs the low side drive signal from the drive signal output terminal VGL.

The high side drive signal and the low side drive signal have a waveform including an on period in which a rectangular pulse of positive polarity occurs and an off period of 0 V within one switching period. The high side drive signal and the low side drive signal both have the above-described waveform, and have output timing with a 180° phase difference from each other.

Such waveforms are applied to the switching devices Q1 and Q2, whereby the switching devices Q1 and Q2 perform switching operation so as to be turned on/off alternately.

Incidentally, in actual switching operation, a short dead time in which both the switching devices Q1 and Q2 are turned off is formed in a period from the turning off of the switching device Q1 to the turning on of the switching device Q2 and in a period from the turning off of the switching device Q2 to the turning on of the switching device Q1.

This dead time is a period during which both the switching devices Q1 and Q2 are turned off. The dead time is formed to ensure charge and discharge operation at the partial resonant capacitor Cp in a short time in timing of the turning on/off of the switching devices Q1 and Q2 in partial voltage resonant operation. A time length as such a dead time can be set on the control IC 2 side, for example. The control IC 2 varies a pulse width duty ratio of the drive signals to be output from the drive signal output terminals VGH and VGL so as to form a period td of the set time length.

The isolated converter transformer PIT transmits a switching output of the switching devices Q1 and Q2 to the secondary side. In this case, the primary winding N1 and a secondary winding N2 are wound in the isolated converter transformer PIT.

In this case, one end of the primary winding N1 of the isolated transformer PIT is connected to a point of connection (a switching output point) between the source of the switching device Q1 and the drain of the switching device Q2 via a series connection of the primary winding. N11 of the loosely coupled transformer VFT and a series resonant capacitor C1. Another end of the primary winding N1 is connected to the primary side ground.

According to the above-described connection, the series circuit of the series resonant capacitor C1—the primary winding N11 of the loosely coupled transformer VFT—the primary winding N1 of the isolated converter transformer PIT is connected to the switching output point of the switching devices Q1 and Q2.

Thus, in this case, a capacitance of the series resonant capacitor C1, the leakage inductance L1 of the isolated converter transformer PIT including the primary winding N1, and the inductance component L11 of the primary winding N11 of the loosely coupled transformer VFT form a primary side series resonant circuit. This primary side series resonant circuit is connected to the switching output point as described above, whereby the switching output of the switching devices Q1 and Q2 is transmitted to the primary side series resonant circuit. The primary side series resonant circuit performs resonant operation according to the transmitted switching output, and thereby converts the operation of the primary side switching converter into a current resonant type operation.

Thus, the primary side switching converter shown in this figure obtains the current resonance type operation by the primary side series resonant circuit (C1-L11-L1) and the partial voltage resonant operation by the partial voltage resonant circuit (Cp//L1(-L11)) described above.

That is, the power supply circuit shown in this figure employs a form in which the resonant circuit for making the primary side switching converter a resonant converter is combined with another resonant circuit. That is, the power supply circuit shown in the figure employs the configuration of a complex resonant converter.

Though not described with reference to a figure, the structure of the isolated converter transformer PIT has an E-E-shaped core formed by combining E-shaped cores made of for example ferrite material with each other. The isolated converter transformer PIT has a primary side winding part and a secondary side winding part divided from each other. The primary winding N1 and the secondary winding N2 to be described next are wound around the central magnetic leg of the E-E-shaped core.

In the first embodiment, and the second, third, and fourth embodiments to be described later, a gap of about 1.0 mm to 1.5 mm is formed in the central magnetic leg of the E-E-shaped core. Thereby a state of loose coupling with a coupling coefficient of about 0.7 to 0.8 is obtained.

The secondary winding N2 is wound on the secondary side of the isolated converter transformer PIT. An alternating voltage corresponding to the switching output transmitted to the primary winding N1 is induced in the secondary winding N2.

The secondary winding N2 is provided with a center tap, which is connected to a secondary side ground. A full-wave rectifier circuit comprising rectifier diodes D01 and D02 and a smoothing capacitor C0 is connected to the secondary winding. Thereby a secondary side direct-current output voltage E0 is obtained as a voltage across the smoothing capacitor C0. The secondary side direct-current output voltage E0 is supplied to a load side not shown in the figure, and also inputted from a branch point as a detection voltage for a control circuit 1 to be described next.

The control circuit 1 obtains, as a control output, a current or a voltage varied in level according to level of the secondary side direct-current output voltage E0. This control output is output to the control terminal Vc of the control IC 2.

According to level of the control output input to the control terminal Vc, the control IC 2 operates to vary the frequency of each of the high side drive signal and the low side drive signal to be output from the drive signal output terminals VGH and VGL in a synchronous state while retaining timing of turning on/off the drive signals alternately.

Thereby the switching frequency of the switching devices Q1 and Q2 is variably controlled according to the level of the control output input to the control terminal Vc (that is, the level of the secondary side direct-current output voltage).

When the switching frequency is varied, resonant impedance in the primary side series resonant circuit is changed. When the resonant impedance is thus changed, an amount of current supplied to the primary winding N1 of the primary side series resonant circuit is changed, and power transmitted to the secondary side is also changed. Thereby the level of the secondary side direct-current output voltage E0 is changed. Thus constant-voltage control is effected.

Next, operation of the power factor improving circuit 3 having the above-described configuration will be described with reference to waveform charts of FIGS. 3A, 3B, 3C, 3D, 3E, and 3F.

Supposing that the alternating input voltage VAC having a period as shown in FIG. 3A is obtained, for example, an alternating input current IAC flowing from the commercial alternating-current power supply. AC to a rectification current path flows so as to be of positive polarity/negative polarity in a positive/negative period, respectively, of the alternating input voltage VAC, as shown in FIG. 3B.

A waveform shown in FIG. 3C is obtained as a potential V1 between the primary side ground and a point of connection between the filter capacitor CN and an end part of the secondary winding N12 of the loosely coupled transformer VFT in a line of the commercial alternating-current power supply AC.

A waveform shown in FIG. 3E is obtained as a potential V2 between the positive electrode input terminal of the bridge rectifier circuit Di and the primary side ground.

The switching output of the primary side switching converter is transmitted to the primary winding N11 in the loosely coupled transformer VFT. An alternating voltage is correspondingly induced in the secondary winding N12 of the loosely coupled transformer VFT. Since as also described above, the secondary winding N12 of the loosely coupled transformer VFT is inserted in a rectification current path, an operation of voltage feedback of the switching output of the primary side switching converter to the rectification current path is obtained by the loosely coupled transformer VFT.

The potentials V1 and V2 shown in FIGS. 3C and 3E have an alternating waveform component superimposed thereon in periods other than conduction periods of the alternating input current IAC, as shown in the figures. This results from the voltage feedback of the switching output of the primary side switching converter as described above.

Accordingly, a current I2 flowing from the line of the commercial alternating-current power supply AC to the secondary winding N12 of the loosely coupled transformer VFT flows in a steady alternating waveform as shown in FIG. 3F. This current I2 is obtained as a waveform having a fixed amplitude with a zero level as a center and having a component of a rectified current I1 of positive polarity superimposed thereon so as to correspond to the conduction periods of the alternating input current IAC.

In timing in the vicinity of a maximum/minimum of the potential V1 shown in FIG. 3C in each period of the alternating input voltage VAC being of positive polarity/ negative polarity, respectively, there is a period when the level of the potential V1 is higher than the rectified and smoothed voltage Ei, in which period the rectified current I1 shown in FIG. 3D flows from the bridge rectifier circuit Di to the smoothing capacitor Ci.

When rectification current flows through the fast recovery type rectifier diodes Da to Dd forming the bridge rectifier circuit Di, these rectifier diodes perform switching operation according to the alternating voltage induced in the secondary winding N12 of the loosely coupled transformer VFT. Thereby the rectification current flowing through the rectifier diodes is interrupted, so that the rectified current I1 has an alternating waveform as shown in FIG. 3D.

Within a positive period of the alternating input voltage VAC, the rectified current I1 flows from the filter capacitor CN through the positive electrode line of the commercial alternating-current power supply AC to a rectification current path of the secondary winding N12→the rectifier diode Da of the bridge rectifier circuit Di→the smoothing capacitor Ci→the primary side ground→the rectifier diode Dd→the negative electrode line of the commercial alternating-current power supply AC.

Within a negative period of the alternating input voltage VAC, the rectified current I1 flows from the filter capacitor CN through the negative electrode line of the commercial alternating-current power supply AC to a rectification current path of the rectifier diode Dc→the smoothing capacitor Ci→the primary side ground→the rectifier diode Db→the secondary winding N12.

Thus the rectified current is interrupted so as to be switched by the fast recovery type rectifier diodes (Da to Dd), whereby a charging current flows to the smoothing capacitor Ci even in a period when a rectification output voltage level is lower than level of the rectified and smoothed voltage Ei.

As a result, an average waveform of the alternating input current approaches a waveform of the alternating input voltage, whereby as shown in FIG. 3B, a conduction angle of the alternating input current IAC is increased. As a result of the increase in the conduction angle of the alternating input current IAC, a power factor is improved.

Figure 4:
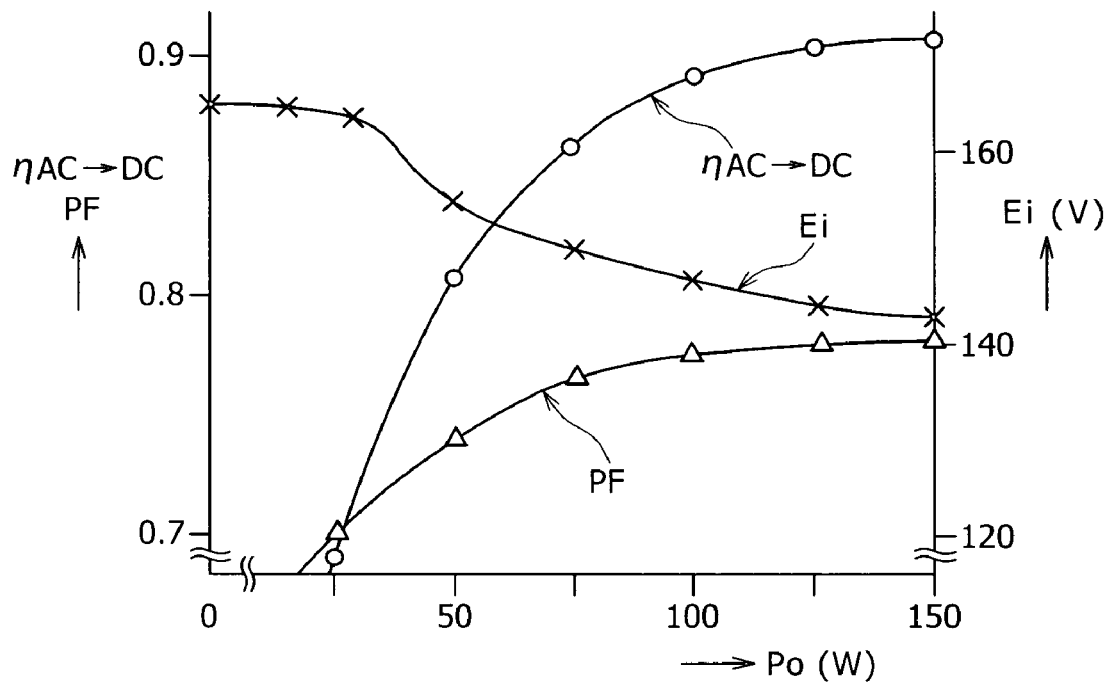
FIG. 4 is a diagram showing characteristics of a power factor, power conversion efficiency, and rectified and smoothed voltage level with respect to load variation in the power supply circuit according to the first embodiment.

FIG. 4 shows changes in power conversion efficiency (ηAC/DC), the power factor PF, and the rectified and smoothed voltage Ei with respect to variation of load power Po=0 to 150 W when the alternating input voltage VAC=100 V as characteristics of the power supply circuit having the configuration shown in FIG. 1.

Figure 5:
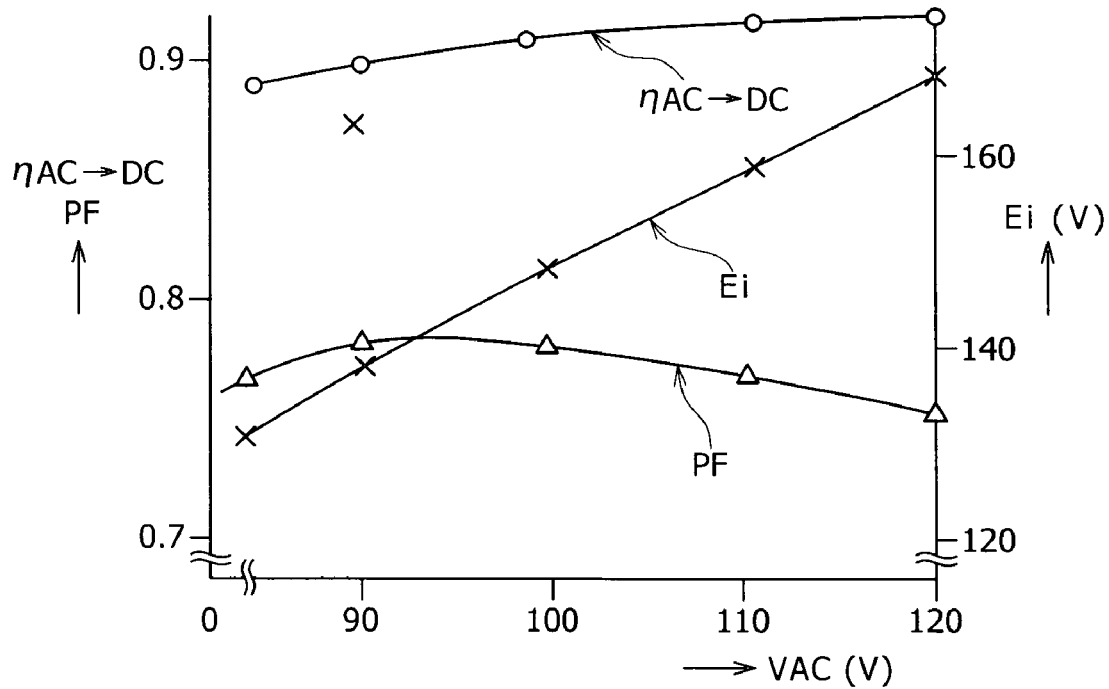
FIG. 5 is a diagram showing characteristics of a power factor, power conversion efficiency, and rectified and smoothed voltage level with respect to variation of alternating input voltage in the power supply circuit according to the first embodiment.

FIG. 5 shows changes in the power conversion efficiency (ηAC/DC), the power factor PF, and the rectified and smoothed voltage Ei with respect to variation of the alternating input voltage VAC=85 V to 120 V when the load power Po=150 W as characteristics of the power supply circuit having the configuration shown in FIG. 1.

Constants of parts of the circuit shown in FIG. 1 in obtaining experimental results shown in FIG. 4 and FIG. 5 will be shown for reference.

The filter capacitor CN=1 μF

The primary winding N1 of the isolated converter transformer PIT=32 T

Figure 30:
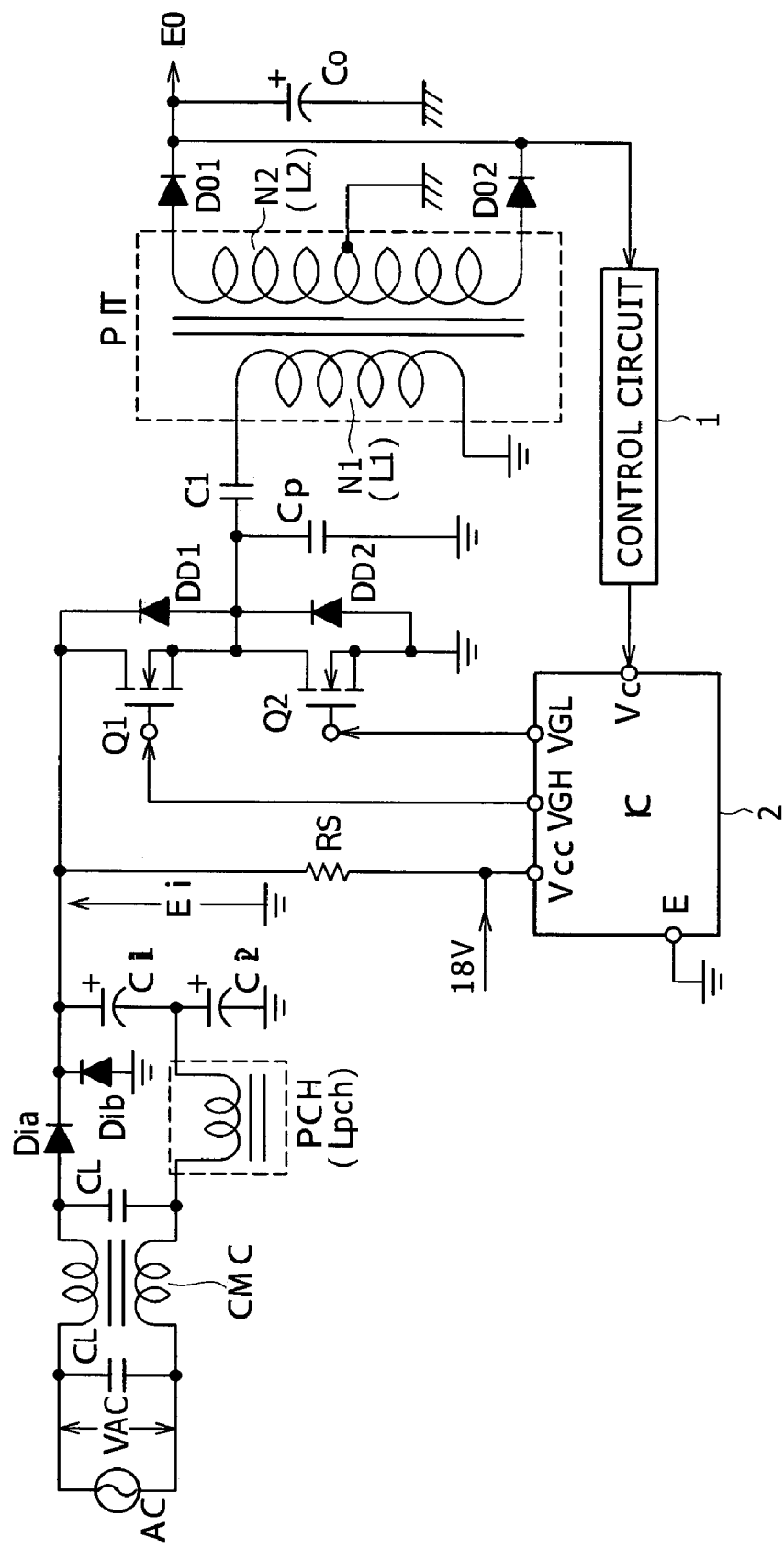
FIG. 30 is a circuit diagram showing another example of configuration of a related art power supply circuit.
Figure 31:
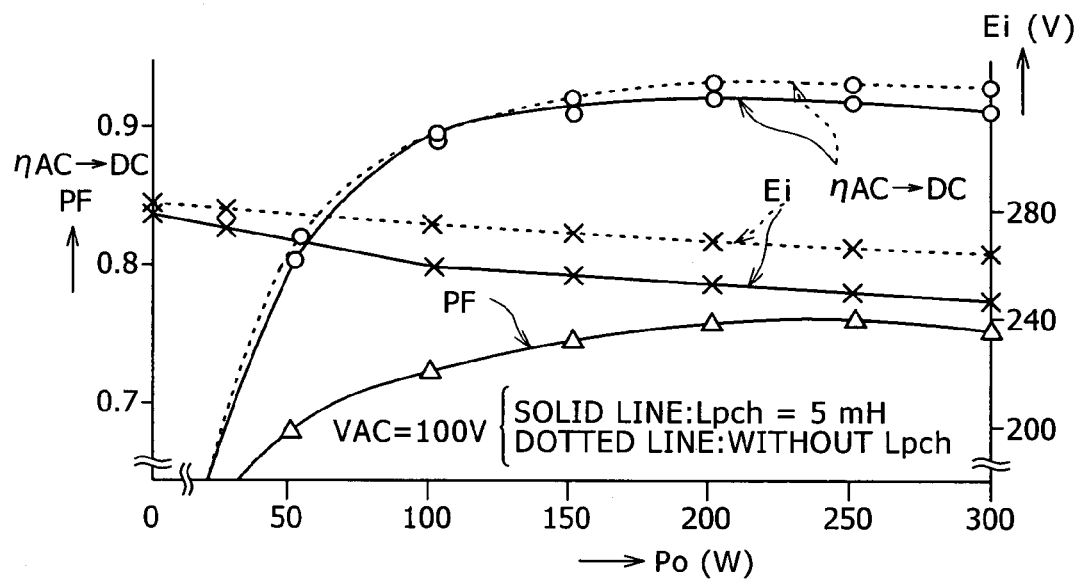
FIG. 31 is a diagram showing characteristics of a power factor, power conversion efficiency, and rectified and smoothed voltage level with respect to load variation in the power supply circuit shown in FIG. 30.
Figure 32:
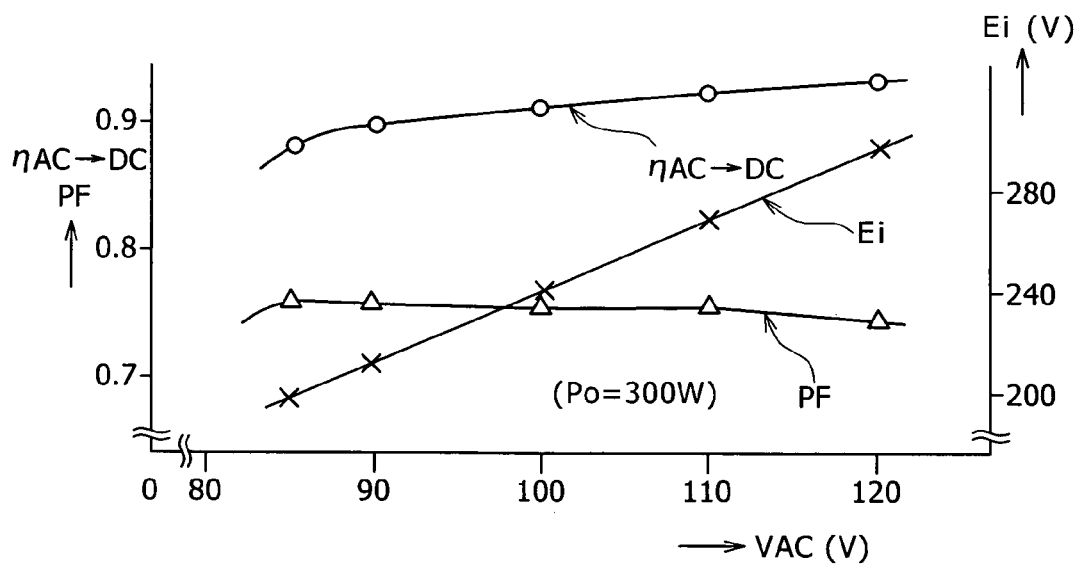
FIG. 32 is a diagram showing characteristics of a power factor, power conversion efficiency, and rectified and smoothed voltage level with respect to variation of alternating input voltage in the power supply circuit shown in FIG. 30.

The secondary winding N2 of the isolated converter transformer PIT: 23 T+23 T (turns) with the center tap as a dividing position The primary side series resonant capacitor C1=0.068 μF The primary side partial resonant capacitor Cp=680 pF The loosely coupled transformer VFT: EE-28 ferrite core, the gap length=1.5 mm The inductance L11 of the primary winding N11=75 μH The inductance L12 of the primary winding N12=50 μH Comparisons between the power supply circuit shown in FIG. 1 and the related art power supply circuit shown in FIG. 27 when the load power Po=150 W on the basis of FIG. 4 and FIG. 5 are as follows. Incidentally, while the two power supply circuits of FIG. 27 and FIG. 30 are shown as the related art, the circuit of FIG. 27 having the configuration to meet conditions equal to those of the power supply circuit of FIG. 1 will be compared in the following.

Figure 27:
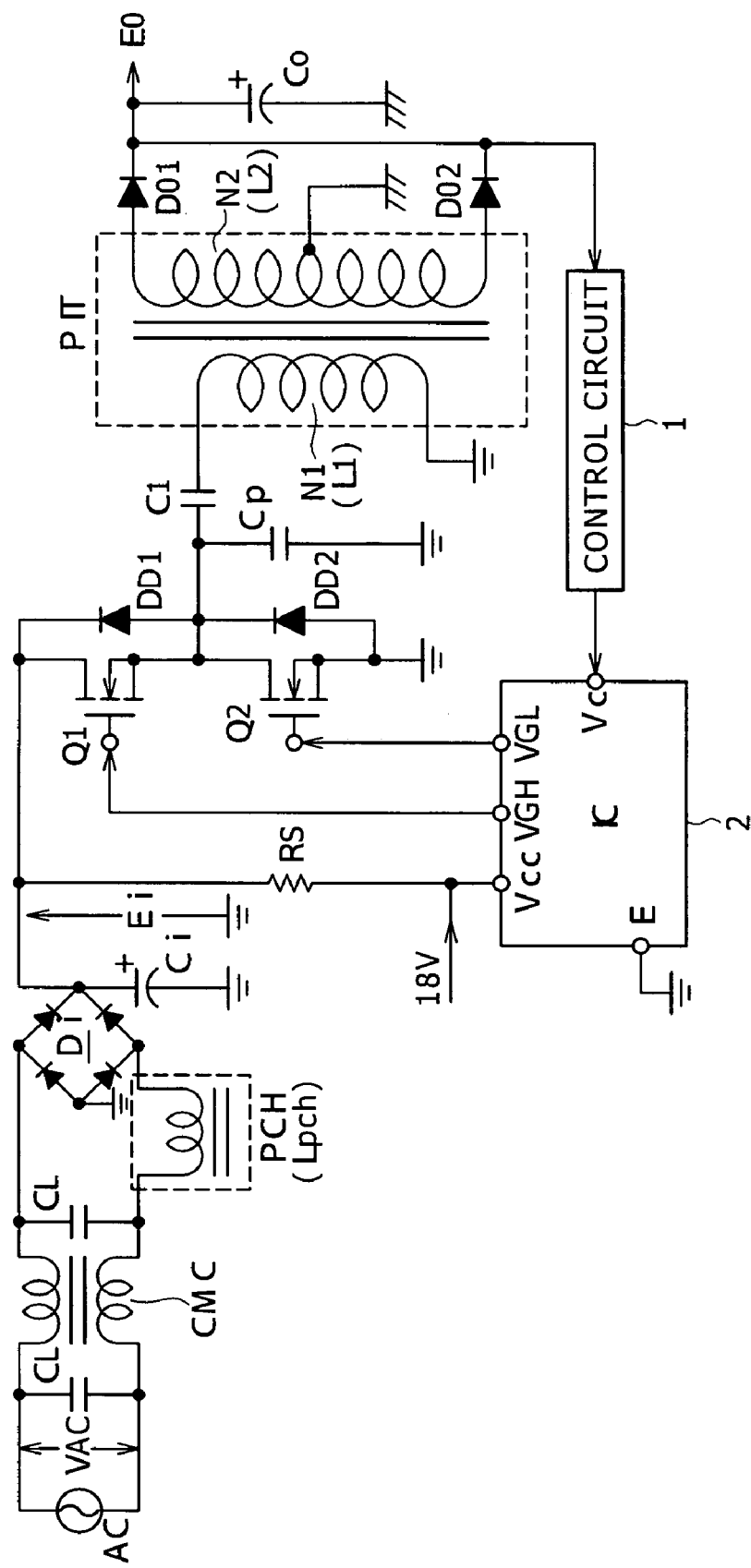
FIG. 27 is a circuit diagram showing an example of configuration of a related art power supply circuit.
Figure 28:
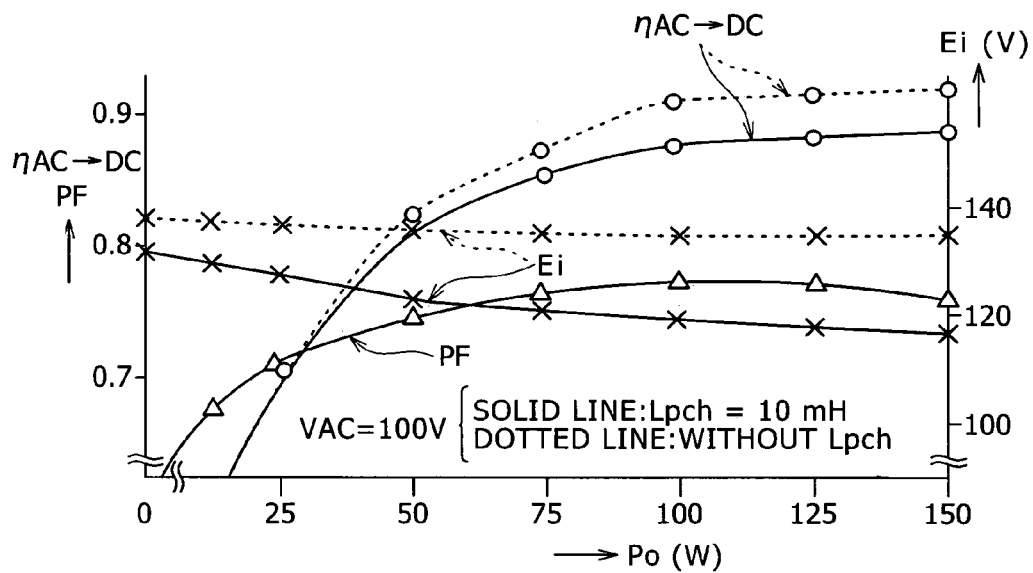
FIG. 28 is a diagram showing characteristics of a power factor, power conversion efficiency, and rectified and smoothed voltage level with respect to load variation in the power supply circuit shown in FIG. 27.
Figure 29:
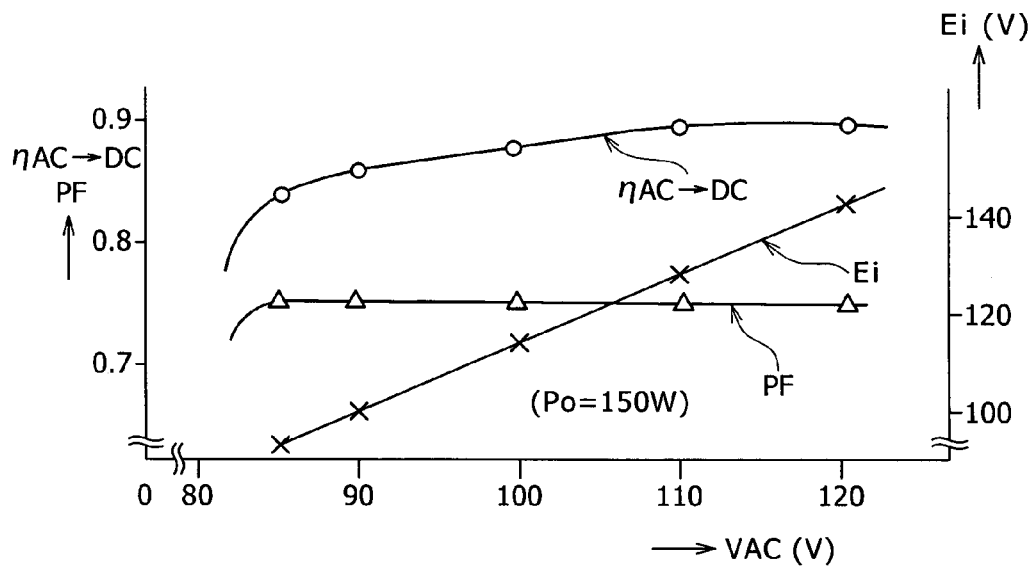
FIG. 29 is a diagram showing characteristics of a power factor, power conversion efficiency, and rectified and smoothed voltage level with respect to variation of alternating input voltage in the power supply circuit shown in FIG. 27.

First, as to the power factor, the power factor PF of the circuit shown in FIG. 1=0.78, which represents an improvement over the power factor PF of the power supply circuit shown in FIG. 27=0.75.

As to the power conversion efficiency (ηAC→DC) of the circuit shown in FIG. 1, ηAC→DC=90.6%, whereas in the case of the circuit of FIG. 27, ηAC→DC=87.5%. This represents an improvement of 3.1 percentage points. Hence, the alternating-current input power Pin of the circuit shown in FIG. 27 is 171.4 W, whereas the alternating-current input power Pin of the circuit shown in FIG. 1 is 165.5 W. This represents a reduction of 5.9 W. This power conversion efficiency is equal to that of the circuit configuration shown in FIG. 27 without the power choke coil PCH being inserted (without power factor improvement).

As to the level of the rectified and smoothed voltage Ei in the circuit shown in FIG. 1, Ei=143 V. In the case of the circuit configuration of the circuit shown in FIG. 27 without the power choke coil PCH being inserted (without power factor improvement), Ei=134 V. Therefore the present embodiment obtains the rectified and smoothed voltage Ei having a level higher than 134 V. Such an increase in the rectified and smoothed voltage Ei is obtained by superimposing an amount of voltage feedback of the switching output as the rectified and smoothed voltage Ei.

In addition, in the circuit shown in FIG. 1, the power choke coil PCH is omitted, and the loosely coupled transformer VFT is provided instead.

The power choke coil PCH in the circuit shown in FIG. 27 has a weight of 153 g and a board occupying area of 11 cm². On the other hand, even a combination of the loosely coupled transformer VFT and the filter capacitor CN in the circuit shown in FIG. 1 has a weight of 48 g, which represents a reduction to about 31% of that of the power choke coil PCH in the circuit shown in FIG. 27. In addition, the board occupying area is 9 cm², which represents a reduction to about 82%.

Thus, the power supply circuit shown in FIG. 1 has a smaller size and a lighter weight as the power supply circuit that has a power factor improving function and can deal with the load power Po=150 W or higher than the power supply circuit shown in FIG. 27.

Furthermore, because the power choke coil PCH is omitted, it is not necessary to consider effects of a leakage flux caused by the power choke coil PCH on a load side. This eliminates the need for a measure of providing a magnetic shield sheet to the power choke coil PCH, for example, and thus also contributes to reduction in size and weight of the circuit.

Figure 6:
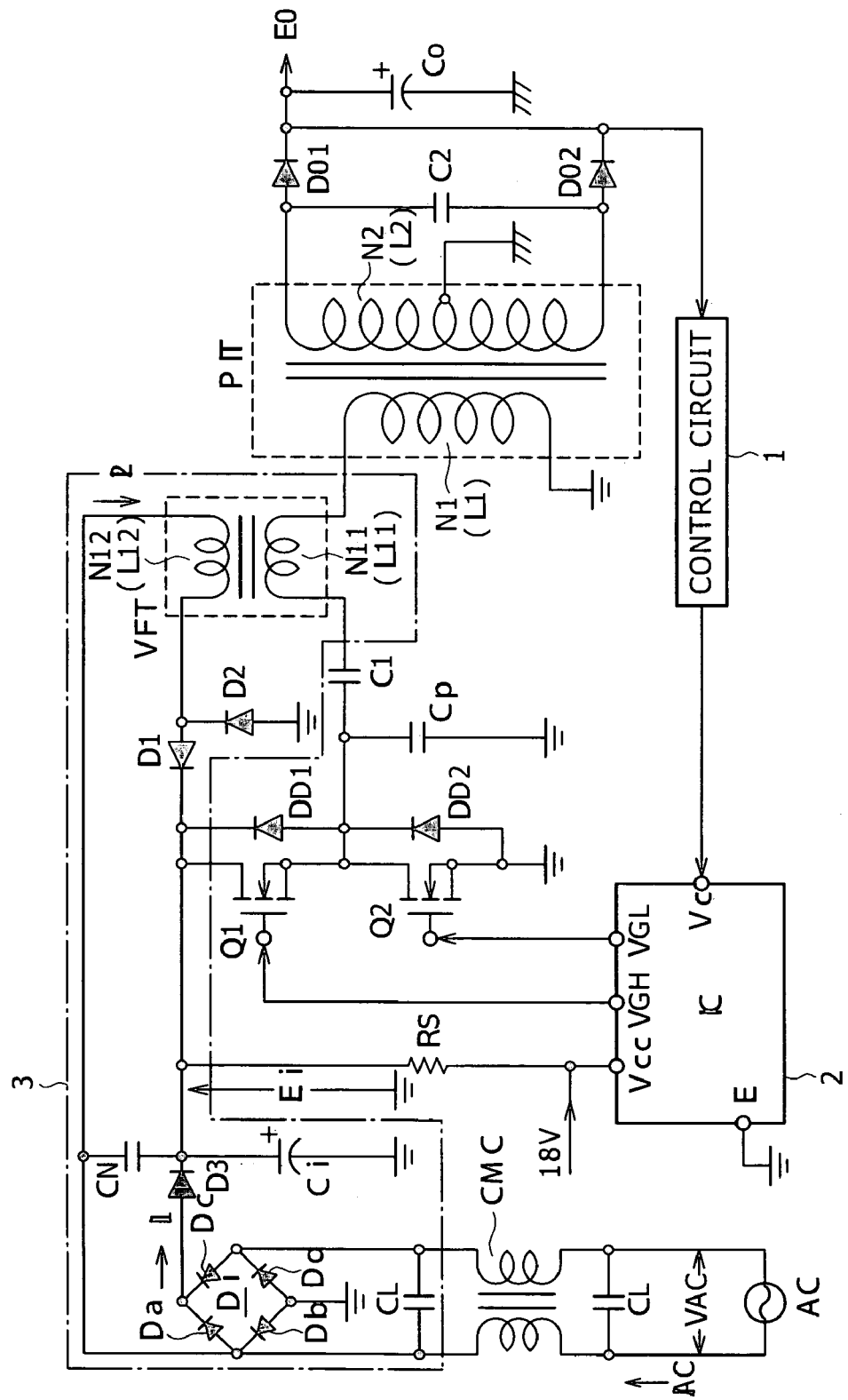
FIG. 6 is a circuit diagram showing an example of configuration of a power supply circuit according to a second embodiment.

FIG. 6 shows an example of configuration of a switching power supply circuit according to a second embodiment of the present invention. The power supply circuit shown in this figure also meets conditions of a single range of an alternating input voltage VAC=100 V system and a load power Po=150 W or higher. Incidentally, in this figure, the same parts as in FIG. 1 are identified by the same reference numerals, and description thereof will be omitted.

First, in the power supply circuit shown in this figure, a parallel resonant capacitor C2 is connected in parallel with a secondary winding N2 of an isolated converter transformer PIT.

A capacitance of the parallel resonant capacitor C2 and a leakage inductance L2 of the secondary winding N2 form a secondary side parallel resonant circuit. The capacitance of the parallel resonant capacitor C2 is selected to be 1000 pF to 3300 pF. Depending on the capacitance value actually selected, the secondary side parallel resonant circuit is formed as a voltage resonant circuit for converting operation of a secondary side rectifier circuit into a voltage resonant type operation, or a partial voltage resonant circuit for obtaining a partial voltage resonant operation.

That is, the power supply circuit according to the second embodiment has a resonant circuit also on the secondary side as a complex resonant converter. By thus providing the resonant circuit on the secondary side, it is possible to obtain a more stable switching operation and meet a condition of a heavier load.

As compared with the power factor improving circuit 3 shown in FIG. 1, the power factor improving circuit 3 of the power supply circuit shown in FIG. 6 has fast recovery type rectifier diodes (high-frequency rectifier elements) D1, D2, and D3 added thereto as component parts. That is, in this case, rectification current is not interrupted by switching by rectifier diodes of a bridge rectifier circuit Di. As diodes for switching rectification current in a rectification current path, the rectifier diodes D1, D2, and D3 are provided. The rectifier diodes Da to Dd of the bridge rectifier circuit Di in this case are a slow recovery type (low-frequency rectifier elements) because the rectifier diodes Da to Dd do not switch rectification current.

A positive electrode input terminal of the bridge rectifier circuit Di in this case is directly connected to a commercial alternating-current power supply AC. Also, the positive electrode input terminal of the bridge rectifier circuit Di is connected from a secondary winding N12 of a loosely coupled transformer VFT, which winding is connected in series with the positive electrode input terminal of the bridge rectifier circuit Di, through an anode→a cathode of the rectifier diode D1 to a positive electrode terminal of a smoothing capacitor Ci. The rectifier diode D2 has a cathode connected to the anode of the rectifier diode D1, and an anode connected to a primary side ground.

A positive electrode output terminal of the bridge rectifier circuit Di is connected through an anode→a cathode of the rectifier diode D3 to the positive electrode terminal of the smoothing capacitor Ci.

A filter capacitor CN in this case is inserted between the positive electrode input terminal of the bridge rectifier circuit Di and the positive electrode terminal of the smoothing capacitor Ci (a point of connection between the anodes of the rectifier diodes D1 and D3). The filter capacitor CN forms a current path for a high-frequency component obtained by switching rectification current flowing as described next.

Operation of the power factor improving circuit 3 formed as described above is as follows.

An alternating input current IAC in the power factor improving circuit 3 is branched into a first rectification current I1 flowing from a positive electrode line of the commercial alternating-current power supply AC to the diode Da forming the bridge rectifier circuit Di and a second rectification current I2 flowing from the positive electrode line of the commercial alternating-current power supply AC to the secondary winding N12 of the loosely coupled transformer VFT.

In a positive period of the alternating input voltage VAC, the first rectification current I1 flows in a path of the positive electrode line of the commercial alternating-current power supply AC→the rectifier diode Da (the bridge rectifier circuit Di)→the rectifier diode D3→the smoothing capacitor Ci→the rectifier diode Dd (the bridge rectifier circuit Di)→a negative electrode line of the commercial alternating-current power supply AC.

The second rectification current I2 branches off from the positive electrode line of the commercial alternating-current power supply AC to flow in a path of the secondary winding N12 (the loosely coupled transformer VFT)→the rectifier diode D1 and then flow into the smoothing capacitor Ci.

In a negative period of the alternating input voltage VAC, the first rectification current I1 flows in a path of the negative electrode line of the commercial alternating-current power supply AC→the rectifier diode Dc (the bridge rectifier circuit Di)→the rectifier diode D3→the smoothing capacitor Ci→the rectifier diode Db (the bridge rectifier circuit Di)→the positive electrode line of the commercial alternating-current power supply AC.

The second rectification current I2 flows in a path of the negative electrode line of the commercial alternating-current power supply AC→the rectifier diode Dc (the bridge rectifier circuit Di)→the rectifier diode D1→the smoothing capacitor Ci, and thereafter branches off to flow in a path of the rectifier diode D2→the secondary winding N12 (the loosely coupled transformer VFT)→the positive electrode line of the commercial alternating-current power supply AC.

Within the power factor improving circuit 3, voltage feedback of switching output is performed by an alternating voltage induced in the secondary winding N12 of the loosely coupled transformer VFT. Thus, in a process of the rectification currents flowing as described above, the first rectification current I1 is switched by the fast recovery type rectifier diode D3 and the second rectification current I2 is switched by the fast recovery type rectifier diodes D1 and D2 (and D3). The rectification currents thereby form an alternating waveform.

Incidentally, a high-frequency current component thus obtained as alternating waveform with a switching period is absorbed so as to charge and discharge the filter capacitor CN, whereby normal-mode noise is suppressed.

As a result of the rectification currents being thus interrupted so as to be switched by the fast recovery type rectifier diodes D1, D2, and D3, a conduction angle of the alternating input current IAC is increased to improve a power factor.

As with the power supply circuit shown in FIG. 1, as compared with the power supply circuit of FIG. 27, the power supply circuit shown in FIG. 6 with the above-described configuration can also improve power conversion efficiency and reduce circuit board size and weight.

The rectifier diode D3 inserted between the positive electrode output terminal of the bridge rectifier circuit Di and the positive electrode of the smoothing capacitor Ci operates to switch and pass the rectification current only in the vicinity of substantially a peak level of the alternating input voltage VAC, for example. This controls a peak level of the rectification current flowing on a side of the rectifier diodes D1 and D2, the peak level occurring in accordance with a peak of the alternating input voltage VAC. It is therefore possible to reduce a switching loss in the rectifier diodes D1 and D2 and attendant heat generation.

Figure 7:
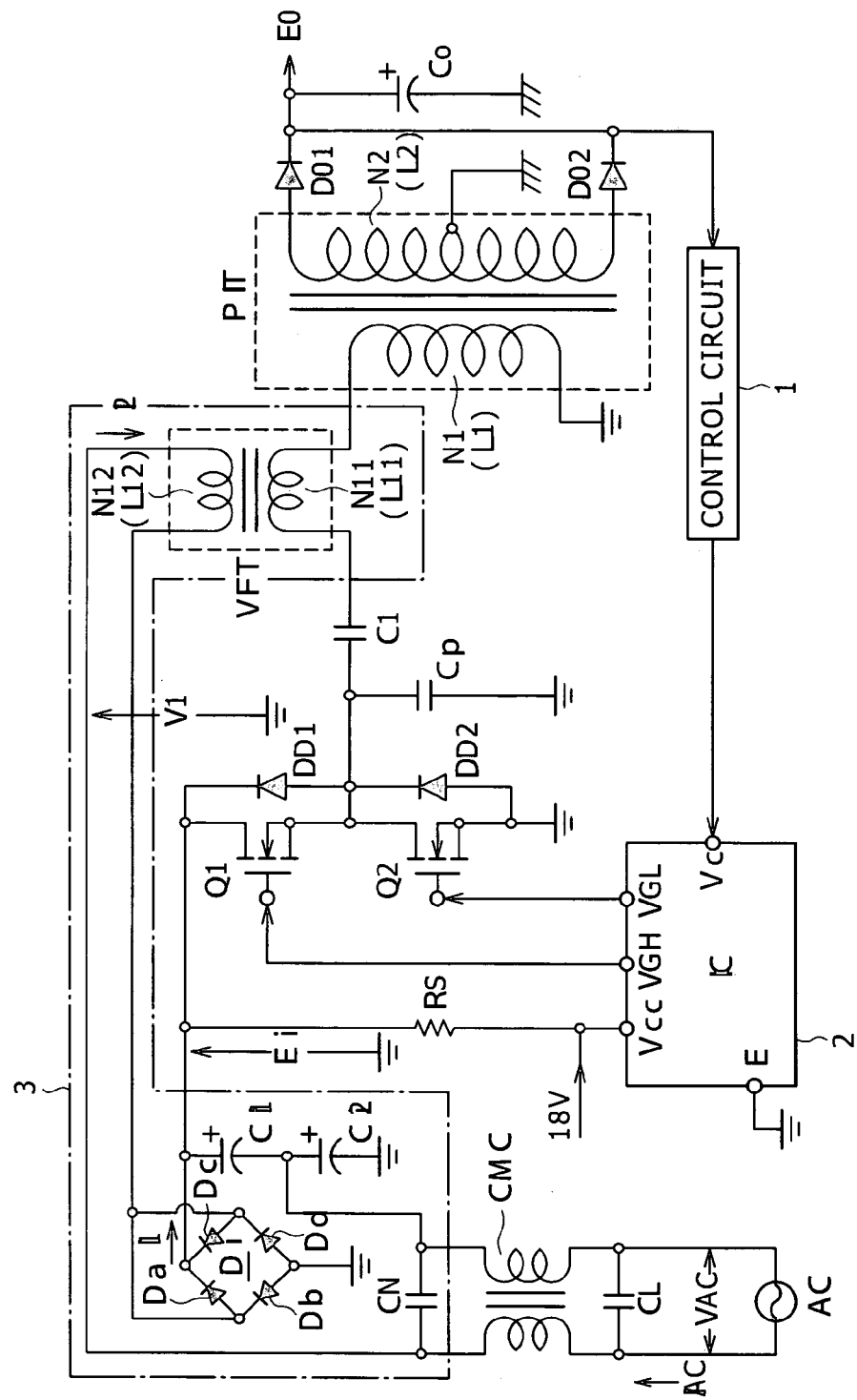
FIG. 7 is a circuit diagram showing an example of configuration of a power supply circuit according to a third embodiment.

FIG. 7 shows an example of configuration of a power supply circuit according to a third embodiment of the present invention. While the power supply circuits according to the first and second embodiments shown in FIG. 1 and FIG. 6 meet conditions of a single range of an alternating input voltage VAC=100 V system and a load power Po=150 W or higher, the power supply circuit according to the third embodiment meets a condition of the same single range of an alternating input voltage VAC=100 V system and a different condition of a load power Po=250 W or higher. Thus, the load condition that can be met is the same as that of the power supply circuit shown in FIG. 30.

Incidentally, in this figure, the same parts as in FIG. 1 and FIG. 6 are identified by the same reference numerals, and description of the similar component parts will be omitted.

The power supply circuit shown in this figure has a voltage doubler rectifier circuit as a fundamental configuration of a rectifier circuit system provided within a power factor improving circuit 3.

Specifically, two smoothing capacitors Ci1–Ci2 connected in series with each other are provided, and the series circuit of the smoothing capacitors Ci1 and Ci2 is inserted in parallel between a positive electrode output terminal of a bridge rectifier circuit Di and a primary side ground.

A negative electrode line of a commercial alternating-current power supply AC is connected to a point of connection between the smoothing capacitors Ci1–Ci2. Instead, a negative electrode input terminal of the bridge rectifier circuit Di is connected to a positive electrode input terminal of the same bridge rectifier circuit Di so that rectifier diodes Da and Dc forming the bridge rectifier circuit Di are connected in parallel with each other in a rectification current path.

The rectifier diodes Da to Dd of the bridge rectifier circuit Di in this case are of a fast recovery type for switching rectification current.

The thus formed voltage doubler rectifier circuit generates a rectified and smoothed voltage Ei (direct-current input voltage) corresponding to twice a level of the alternating input voltage VAC by rectifying operation to be described later. The voltage doubler rectifier circuit raises the level of the rectified and smoothed voltage Ei to thereby meet the condition of a heavier load than the circuits shown in FIG. 1 and FIG. 6, for example.

A power factor improving operation of the above-described power factor improving circuit 3 will be described with reference to waveform charts of FIGS. 8A, 8B, 8C, 8D, and 8E. Together with the power factor improving operation of the power factor improving circuit 3, rectifying operation of the voltage doubler rectifier circuit included in the power factor improving circuit 3 will also be described in the following.

Supposing that the alternating input voltage VAC having a period as shown in FIG. 8A is input, a potential V1 shown in FIG. 8C forms a sine wave having a maximum value in a positive period of the alternating input voltage VAC and a minimum value of 0 V in a negative period of the alternating input voltage VAC, as shown in the figure. This potential V1 is a potential between the primary side ground and a point of connection between a filter capacitor CN and a secondary winding N12 of a loosely coupled transformer VFT in a positive electrode line of the commercial alternating-current power supply AC as a path in which second rectification current I2 flows, as shown in the figure.

The second rectification current I2 flows on the basis of the alternating input current IAC in each positive/negative period in which an absolute value of the alternating input voltage VAC is higher than an absolute value of the potential V1 shown in FIG. 8C. As shown in FIG. 8E, the second rectification current I2 flows in an alternating waveform shown in the figure with positive polarity/negative polarity in each positive polarity/negative polarity period, respectively, of the alternating input voltage VAC.

First, in a period of positive polarity of the alternating input voltage VAC, the second rectification current I2 flows from the filter capacitor CN through the secondary winding N12 of the loosely coupled transformer VFT via the positive electrode line of the commercial alternating-current power supply AC, and further flows through the parallel circuit of the rectifier diodes Da//Dc of the bridge rectifier circuit Di. Then, passing through the parallel circuit of the rectifier diodes Da//Dc, the current flows into a positive electrode terminal→a negative electrode terminal of the smoothing capacitor Ci1 as first rectification current I1, and further flows from the negative electrode line of the commercial alternating-current power supply AC into the filter capacitor CN.

In a negative period of the alternating input voltage VAC, the second rectification current flows from the filter capacitor CN through the negative electrode line of the commercial alternating-current power supply AC to a positive electrode terminal→a negative electrode terminal of the smoothing capacitor Ci2, and further flows through the rectifier diode Db of the bridge rectifier circuit Di via the primary side ground. Then, passing through the rectifier diode Db, the second rectification current I2 flows from the positive electrode line of the commercial alternating-current power supply AC through the secondary winding N12 of the loosely coupled transformer VFT into the filter capacitor CN.

According to the flow of the rectification current as described above, as rectifying operation, the smoothing capacitor Ci1 is charged in a period of positive polarity of the alternating input voltage VAC, and thus a rectified and smoothed voltage having a level equal to that of the alternating input voltage VAC multiplied by unity is obtained at the smoothing capacitor Ci1. Similarly, in a period of negative polarity of the alternating input voltage VAC, the smoothing capacitor Ci2 is charged, and thus a rectified and smoothed voltage having a level equal to that of the alternating input voltage VAC multiplied by unity is also obtained at the smoothing capacitor Ci2.

As a result, a rectified and smoothed voltage Ei corresponding to twice the level of the alternating input voltage VAC is obtained as voltage across the series connection circuit of the smoothing capacitors Ci1–Ci2. That is, voltage doubler rectifier operation is obtained.

Incidentally, though only in the period of positive polarity of the alternating input voltage VAC, the second rectification current I2 is passed through the parallel circuit of the rectifier diodes (Da//Dc). This is because the power supply circuit shown in FIG. 7 deals with the condition of a heavier load than the power supply circuits according to the embodiments shown in FIG. 1 and FIG. 6. That is, while an amount of rectification current increases as the load becomes heavier, the amount of current flowing through the rectifier diodes is reduced when the rectification current is passed through the rectifier diodes in parallel. It is therefore possible to correspondingly reduce a load on the rectifier diodes.

Also in the power factor improving circuit 3 having such a circuit configuration, an alternating voltage is induced in the secondary winding N12 of the loosely coupled transformer VFT, and thus an alternating voltage component with a switching period is superimposed on a rectification current path. That is, voltage feedback of switching output to the rectification current path is performed. Since the alternating voltage component with a switching period is superimposed, the rectifier diodes of the bridge rectifier circuit Di obtain an operation of switching the rectification current.

That is, as is understood from the above-described rectification current path, an operation of switching and interrupting the rectification current is obtained in the rectifier diodes Da and Dc in the period of positive polarity of the alternating input voltage VAC. Consequently, as shown in FIG. 8D and FIG. 8E, the first rectification current I1 and the second rectification current I2 flow through the rectification current paths in an alternating waveform with a switching period.

In the period of negative polarity of the alternating input voltage VAC, an operation of switching and interrupting the rectification current is obtained in the rectifier diode Db. Thus, as shown in FIG. 8E, the rectification current forms an alternating waveform flowing in a direction of negative polarity.

As described so far, thus switching the rectification current by the rectifier diodes of the bridge rectifier circuit Di increases a conduction angle of the alternating input current IAC as shown in FIG. 8B, and consequently improves a power factor.

Figure 9:
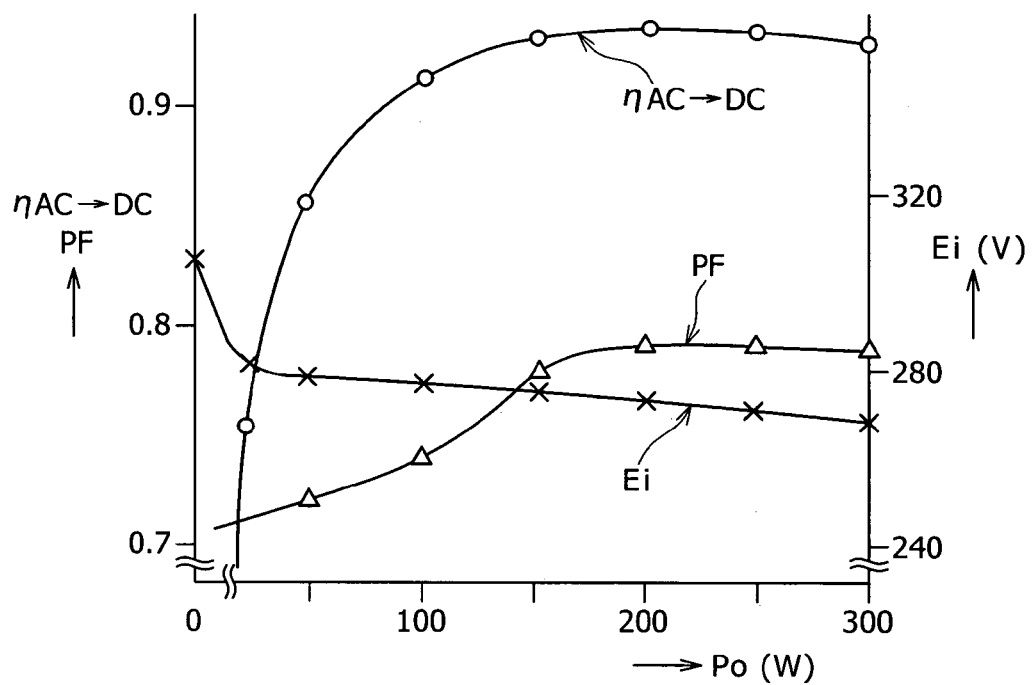
FIG. 9 is a diagram showing characteristics of a power factor, power conversion efficiency, and rectified and smoothed voltage level with respect to load variation in the power supply circuit according to the third embodiment.

FIG. 9 shows changes in power conversion efficiency ($\eta AC/DC$), the power factor PF, and the rectified and smoothed voltage Ei with respect to variation of load power Po=0 to 300 W when the alternating input voltage VAC=100 V as characteristics of the power supply circuit having the configuration shown in FIG. 7.

Figure 10:
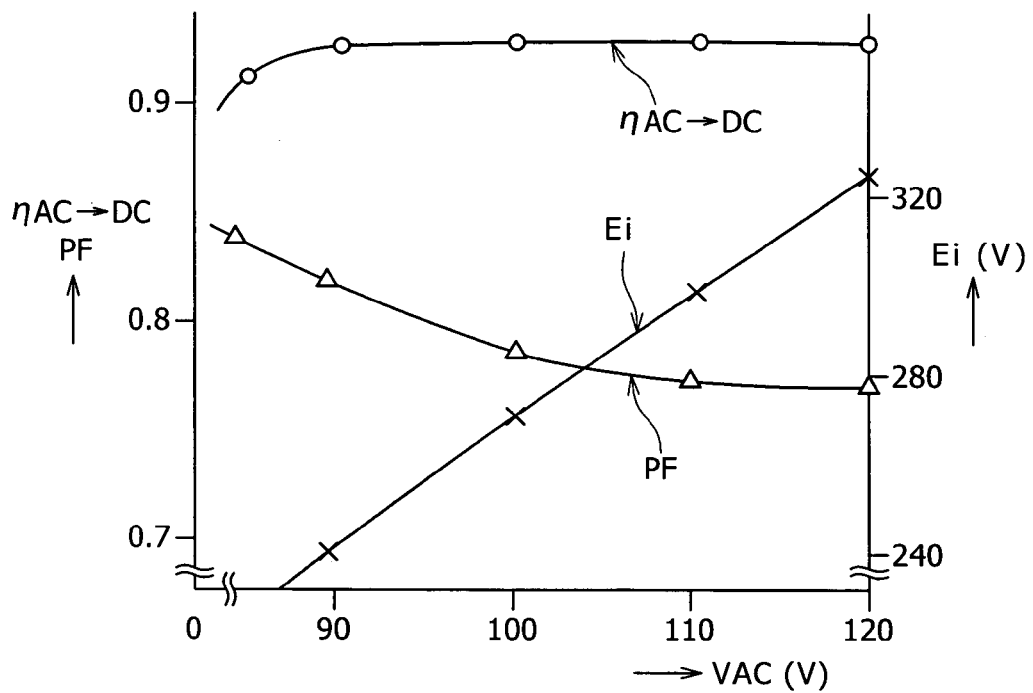
FIG. 10 is a diagram showing characteristics of a power factor, power conversion efficiency, and rectified and smoothed voltage level with respect to variation of alternating input voltage in the power supply circuit according to the third embodiment.

FIG. 10 shows changes in the power conversion efficiency ($\eta AC/DC$), the power factor PF, and the rectified and smoothed voltage Ei with respect to variation of the alternating input voltage VAC=85 V to 120 V when the load power Po=300 W as characteristics of the power supply circuit having the configuration shown in FIG. 7.

Constants of parts of the circuit shown in FIG. 7 in obtaining experimental results shown in FIG. 9 and FIG. 10 will be shown for reference.

The filter capacitor CN=1 µF

A primary winding N1 of an isolated converter transformer PIT=35 T

A secondary winding N2 of the isolated converter transformer PIT: 25 T+25 T (turns) with a center tap as a dividing position A primary side series resonant capacitor C1=0.039 µF A primary side partial resonant capacitor Cp=680 pF The loosely coupled transformer VFT: EE-28 ferrite core, a gap length=1.5 mm An inductance L11 of a primary winding N11=130 µH An inductance L12 of the primary winding N12=100 µH Comparisons between the power supply circuit shown in FIG. 7 and the related art circuit shown in FIG. 30 under a load condition of the load power Po=300 W on the basis of experimental results shown in FIG. 9 and FIG. 10 are as follows.

First, as to the power factor, the power factor PF of the circuit shown in FIG. 7=0.80, which represents an improvement over the power factor PF of the power supply circuit shown in FIG. 30=0.75.

As to the power conversion efficiency ($\eta AC \rightarrow DC$) of the circuit shown in FIG. 7, $\eta AC \rightarrow DC$=93.5%, whereas in the case of the circuit of FIG. 30, $\eta AC \rightarrow DC$=91.1%. This represents an improvement of 2.4 percentage points. Hence, the alternating-current input power Pin of the circuit shown in FIG. 30 is 326.0 W, whereas the alternating-current input power Pin of the circuit shown in FIG. 7 is 317.5 W. This represents a reduction of 8.5 W. This power conversion efficiency is further improved as compared with the circuit configuration shown in FIG. 30 without the power choke coil PCH being inserted (without power factor improvement).

As to the level of the rectified and smoothed voltage Ei in the circuit shown in FIG. 7, Ei=269 V. In the case of the circuit configuration of the circuit shown in FIG. 30 without the power choke coil PCH being inserted (without power factor improvement), Ei=264 V. Therefore the present embodiment obtains the rectified and smoothed voltage Ei having a level higher than 264 V.

Also in the circuit shown in FIG. 7, as compared with the circuit of FIG. 30 from a viewpoint of mounted parts, the power choke coil PCH is omitted, and the loosely coupled transformer VFT is provided instead.

To meet the condition of the heavier load, the power choke coil PCH in the circuit shown in FIG. 30 has a weight of 240 g and a board occupying area of 19 cm². On the other hand, the loosely coupled transformer VFT and the filter capacitor CN in the circuit shown in FIG. 7 has a total weight of 48 g and the loosely coupled transformer VFT has a board occupying area of 9 cm². Thus, the weight is reduced to about 20%, and the occupying area is greatly reduced to about 47%.

Thus, the power supply circuit shown in FIG. 7 is also reduced greatly in size and weight as the power supply circuit that has a power factor improving function and can deal with the load power Po=250 W or higher as compared with the power supply circuit shown in FIG. 30.

Furthermore, the power supply circuit of FIG. 7 also eliminates the need for a measure of providing a magnetic shield sheet or the like considering effects of a leakage flux caused by the power choke coil PCH on a load side.

Figure 11:
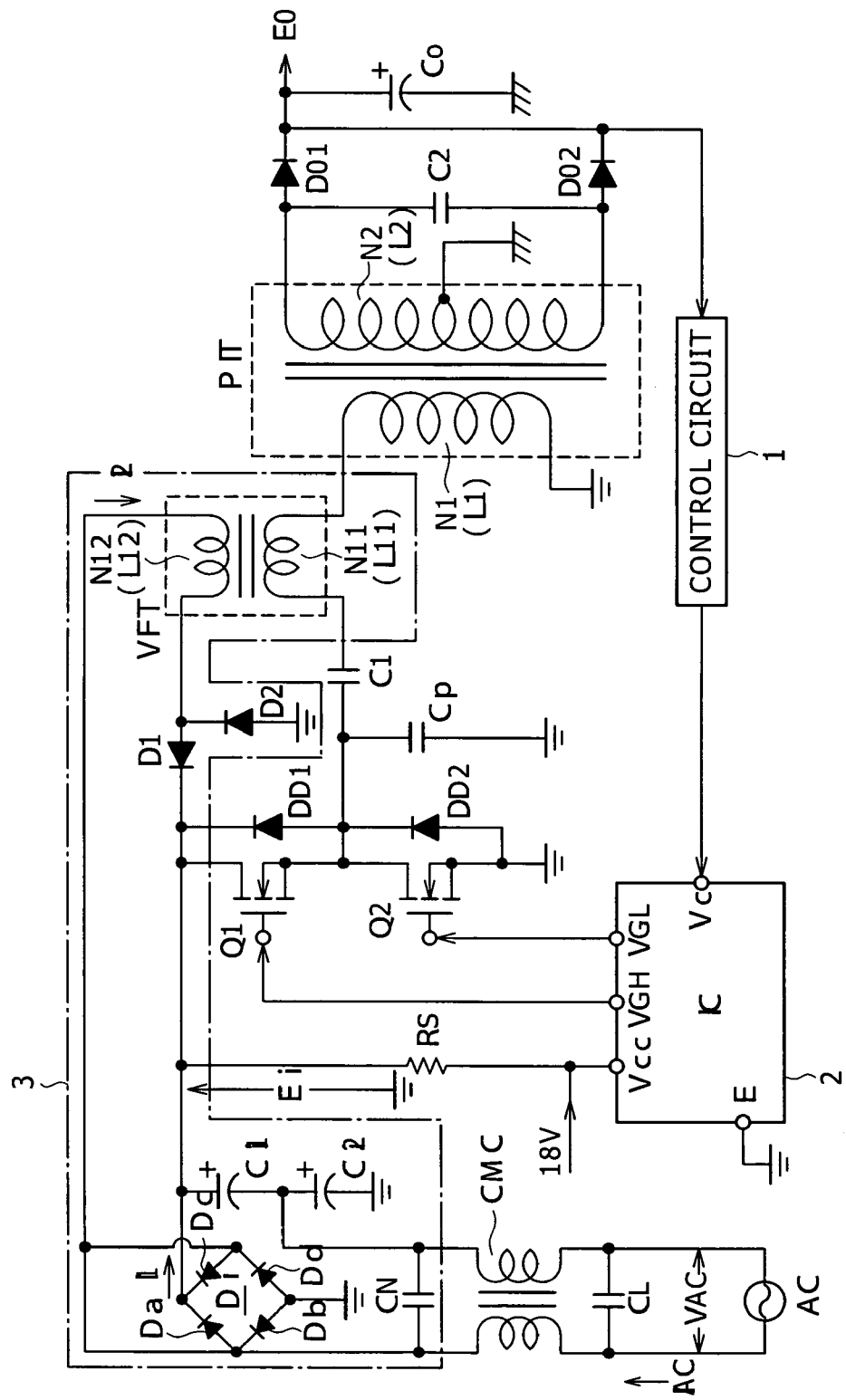
FIG. 11 is a circuit diagram showing an example of configuration of a power supply circuit according to a fourth embodiment.

FIG. 11 shows an example of configuration of a power supply circuit according to a fourth embodiment of the present invention. As with the power supply circuit according to the third embodiment shown in FIG. 7, the power supply circuit according to the fourth embodiment of the present invention also meets conditions of a single range of an alternating input voltage VAC=100 V system and a load power Po=250 W or higher. Incidentally, the same parts as in FIG. 1, FIG. 6, and FIG. 7 are identified by the same reference numerals, and description thereof will be omitted.

First, also in the power supply circuit shown in this figure, a voltage doubler rectifier circuit is formed as a rectifier circuit system provided within a power factor improving circuit 3 to deal with the condition of the load power Po=250 W or higher. A rectified and smoothed voltage Ei obtained across smoothing capacitors Ci1–Ci2 connected in series with each other has a level corresponding to twice the alternating input voltage VAC.

However, a slow recovery type rectifier diode is selected as rectifier diodes Da to Dd forming a bridge rectifier circuit Di shown in FIG. 11. That is, in this case, the rectifier diodes of the bridge rectifier circuit Di do not interrupt rectification current by switching. As a diode for switching rectification current in a rectification current path, fast recovery type rectifier diodes D1 and D2 are provided.

A positive electrode input terminal of the bridge rectifier circuit Di in this case is connected to a point of connection between a positive electrode line of a commercial alternating-current power supply AC and a filter capacitor CN. The positive electrode input terminal of the bridge rectifier circuit Di is also connected to a positive electrode terminal of the smoothing capacitor Ci1 via a secondary winding N12 of a loosely coupled transformer VFT—the rectifier diode D1 (an anode→a cathode). The rectifier diode D2 has an anode connected to a primary side ground, and a cathode connected to the cathode of the rectifier diode D2.

A negative electrode input terminal of the bridge rectifier circuit Di in this case is also connected to the positive electrode input terminal of the same bridge rectifier circuit Di, whereby a parallel circuit of the rectifier diodes Da//Dc is formed within a rectification current path formed as later described.

In the power factor improving circuit 3 formed as described above, a rectification current in a period of positive polarity of the alternating input voltage VAC branches off into a component of a first rectification current I1 flowing from the line of the commercial alternating-current power supply AC through a path of the rectifier diode Da→the smoothing capacitor Ci1→a negative electrode line of the commercial alternating-current power supply AC and a component of a second rectification current I2 flowing through a path of the secondary winding N12 of the loosely coupled transformer VFT→the rectifier diode D1→the smoothing capacitor Ci1→the negative electrode line of the commercial alternating-current power supply AC→the filter capacitor CN.

In this case, while the first rectification current I1 does not form an alternating waveform because the rectifier diode Da does not perform switching, the rectifier diode D1 performs switching on the basis of an alternating waveform induced in the secondary winding N12 of the loosely coupled transformer VFT, and thus the second rectification current I2 forms an alternating waveform.

On the other hand, in a period of negative polarity of the alternating input voltage VAC, the rectification current first flows from a side of the negative electrode line of the commercial alternating-current power supply AC to the smoothing capacitor Ci2. Thereafter the rectification current branches off into a path of the rectifier diode Db→the positive electrode line of the commercial alternating-current power supply AC and a path of the rectifier diode D2→the secondary winding N12 of the loosely coupled transformer VFT→the positive electrode line of the commercial alternating-current power supply AC→the filter capacitor CN. The rectification current flowing in the latter path is the second rectification current I2 in this case.

Also in this case, the rectification current flowing in the former path does not form an alternating waveform because the rectifier diode Db does not perform switching. On the other hand, the rectifier diode D2 performs switching on the basis of the alternating waveform induced in the secondary winding N12 of the loosely coupled transformer VFT, and thus the second rectification current I2 flowing in the latter path forms an alternating waveform.

Thus, in each period of positive polarity/negative polarity of the alternating input voltage VAC in the power factor improving circuit shown in FIG. 11, the path in which the rectification current flows through a required rectifier diode of the bridge rectifier circuit Di and a path in which the rectification current flows through the fast recovery type rectifier diode D1 or D2 form path portions in which the rectification current branches off to flow in parallel.

The rectification current flowing in the path on a side of the fast recovery type rectifier diode D1 or D2 is switched by the rectifier diode D1 or D2. Thereby, as described thus far, a conduction angle of an alternating input current IAC is increased to improve a power factor.

According to the rectification current as described above, as rectifying operation, also in the power supply circuit shown in FIG. 1, the smoothing capacitor Ci1 is charged in a period of positive polarity of the alternating input voltage VAC, and the smoothing capacitor Ci2 is charged in a period of negative polarity of the alternating input voltage VAC. It is thus understood that also in this case, the rectifying operation is a voltage doubler rectifier operation that generates a rectified and smoothed voltage Ei corresponding to twice a level of the alternating input voltage VAC as voltage across the series connection circuit of the smoothing capacitors Ci1–Ci2.

As in the case of the second embodiment shown in FIG. 6, the power supply circuit shown in FIG. 11 has a parallel resonant capacitor C2 connected in parallel with a secondary winding N2 of an isolated converter transformer PIT.

Also in this case, a capacitance of the parallel resonant capacitor C2 and a leakage inductance L2 of the secondary winding N2 form a voltage resonant circuit for converting operation of a secondary side rectifier circuit into a voltage resonant type operation, or a partial voltage resonant circuit for obtaining a partial voltage resonant operation.

Incidentally, such a secondary side voltage resonant circuit may be provided in the power supply circuits according to the first and third embodiments shown in FIG. 1 and FIG. 7. In addition, a secondary side series resonant circuit (current resonant circuit) formed by connecting a resonant capacitor in series with the secondary winding N2, for example, may be provided.

Figure 12:
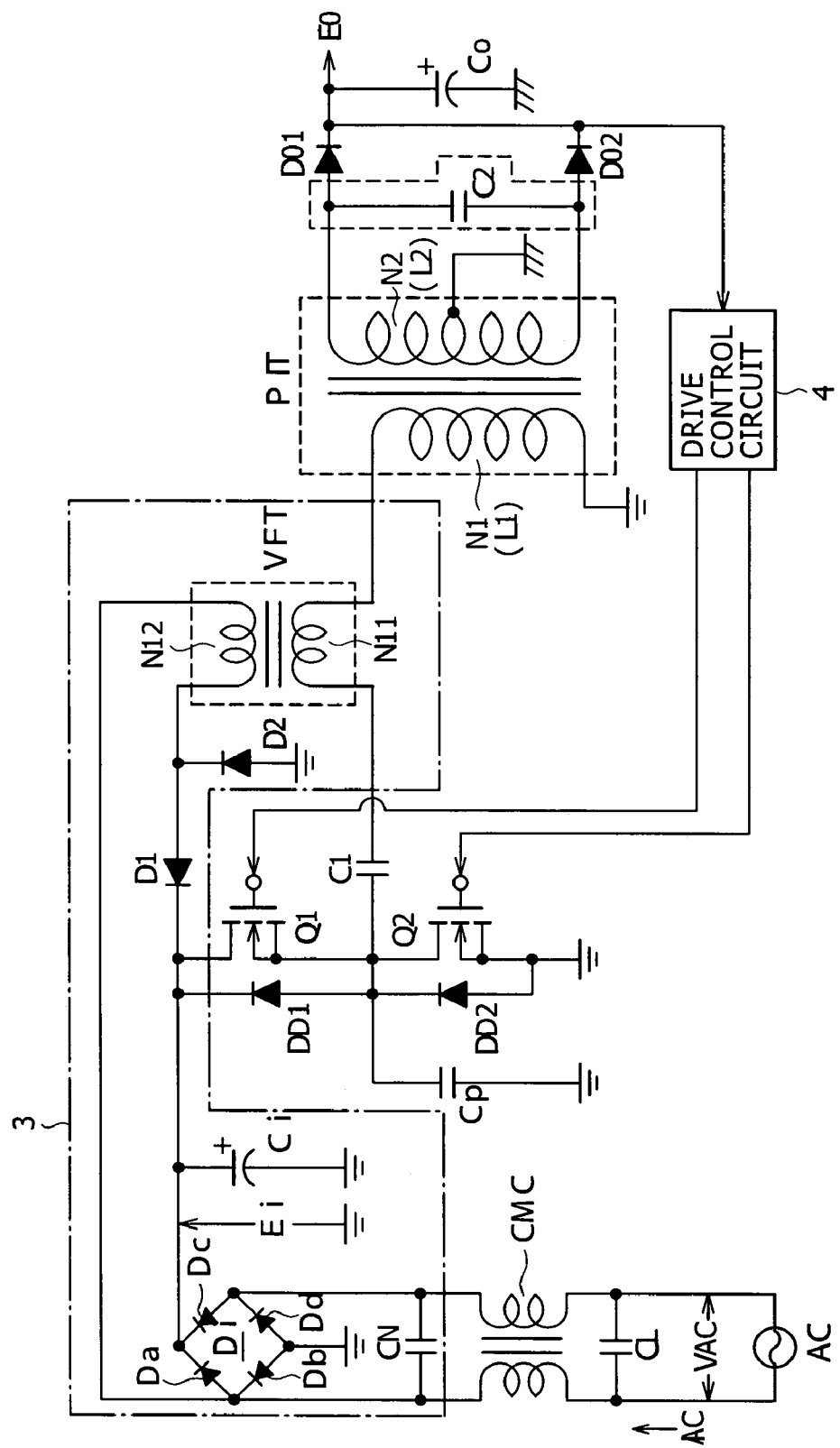
FIG. 12 is a circuit diagram showing an example of configuration of a power supply circuit according to a fifth embodiment.

FIG. 12 shows a configuration of a power supply circuit according to a fifth embodiment of the present invention.

The power supply circuit according to the fifth embodiment of the present invention meets conditions of a single range of a commercial alternating-current power supply AC=200 V system and a load power Po=250 W or higher, for example. Incidentally, the same parts as in FIG. 1, FIG. 6, FIG. 7, and FIG. 11 are identified by the same reference numerals, and description thereof will be omitted.

First, the power supply circuit shown in this figure has a drive control circuit 4. This circuit is for example formed by integrating the control circuit 1 and the control IC 2 provided in the circuit diagram of the power supply circuit according to each of the embodiments described earlier into one circuit part.

A full-wave rectifier circuit comprising a bridge rectifier circuit Di and one smoothing capacitor Ci is formed in a power factor improving circuit 3 shown in this figure. A circuit configuration for power factor improvement including fast recovery type rectifier diodes D1 and D2 and a loosely coupled transformer VFT is added to the full-wave rectifier circuit.

In this case, a slow recovery type rectifier diode is selected as each of rectifier diodes Da to Dd forming the bridge rectifier circuit Di. In this case, a positive electrode input terminal of the bridge rectifier circuit Di (a point of Da-Db connection) is connected to a point of connection between a common mode choke coil CMC and a filter capacitor CN on a side of a positive electrode line of a commercial alternating-current power supply AC.

The positive electrode input terminal of the bridge rectifier circuit Di is also connected to a positive electrode terminal of the smoothing capacitor Ci (a positive electrode line of a rectified and smoothed voltage Ei) via a series connection of a secondary winding N12 of the loosely coupled transformer VFT for power factor improvement—the rectifier diode D1 (an anode→a cathode). This series connection of the secondary winding N12 of the loosely coupled transformer VFT—the rectifier diode D1 can be considered to be connected in parallel with the rectifier diode Da of the bridge rectifier circuit Di.

A positive electrode output terminal of the bridge rectifier circuit Di (a point of Da-Dc connection) is connected to the positive electrode terminal of the smoothing capacitor Ci.

A negative electrode input terminal of the bridge rectifier circuit Di (a point of Dc-Dd connection) is connected to a point of connection between the common mode choke coil CMC and the filter capacitor CN on a side of a negative electrode line of the commercial alternating-current power supply AC. A negative electrode output terminal of the bridge rectifier circuit Di is connected to a primary side ground.

A point of connection between the secondary winding N12 of the loosely coupled transformer VFT and the anode of the rectifier diode D1 is connected with a cathode of the rectifier diode D2. An anode of the rectifier diode D2 is connected to the primary side ground.

In the power factor improving circuit 3 formed as described above, a rectification current in a period of positive polarity of the alternating input voltage VAC branches off into a component of a first rectification current I1 flowing through a rectification current path of the positive electrode line of the commercial alternating-current power supply AC→the rectifier diode Da→the smoothing capacitor Ci→the rectifier diode Dd→the negative electrode line of the commercial alternating-current power supply AC and a component of a second rectification current I2 flowing through a rectification current path of the positive electrode line of the commercial alternating-current power supply AC→the secondary winding N12 of the loosely coupled transformer VFT→the rectifier diode D1→the smoothing capacitor Ci→the rectifier diode Dd→the negative electrode line of the commercial alternating-current power supply AC→the filter capacitor CN.

In this case, the rectifier diodes Da and Dd that perform rectification in the rectification current path in which the first rectification current flows are of a slow recovery type, and does not perform switching operation with a switching period. Therefore the first rectification current does not form an alternating waveform.

On the other hand, in the path in which the second rectification current flows, the rectifier diode D1 switches the rectification current on the basis of an alternating voltage induced in the secondary winding N12 of the loosely coupled transformer VFT. Thus the second rectification current forms an alternating waveform, and flows into the smoothing capacitor Ci.

In a period of negative polarity of the alternating input voltage VAC, the rectification current branches into the first rectification current flowing through a rectification current path of the negative electrode line of the commercial alternating-current power supply AC→the rectifier diode Dc→the smoothing capacitor Ci→the rectifier diode Db→the positive electrode line of the commercial alternating-current power supply AC and the second rectification current flowing through a path of the negative electrode line of the commercial alternating-current power supply AC→the rectifier diode Dc→the smoothing capacitor Ci→the rectifier diode D2→the secondary winding N12 of the loosely coupled transformer VFT→the negative electrode line of the commercial alternating-current power supply AC→the filter capacitor CN.

In this case, the rectifier diodes Dc and Db that rectify the first rectification current in the period of negative polarity of the alternating input voltage VAC are of a slow recovery type, and does not perform switching operation. Therefore the first rectification current does not form an alternating waveform.

On the other hand, the second rectification current is switched by the fast recovery type rectifier diode D2 that performs switching operation on the basis of the alternating voltage induced in the secondary winding N12 of the loosely coupled transformer VFT. Thus the second rectification current forms an alternating waveform.

Thus, in each period of positive polarity/negative polarity of the alternating input voltage VAC in the power factor improving circuit 3 of the power supply circuit shown in FIG. 12, the rectification current is switched to form an alternating waveform according to a switching output fed back by voltage feedback of the loosely coupled transformer VFT. Thereby, as described thus far, a conduction angle of an alternating input current IAC is increased to improve a power factor.

In this case, it suffices for the loosely coupled transformer VFT provided in the power supply circuit according to the fifth embodiment shown in FIG. 12 to employ the structure shown in FIG. 2. In the case of the power supply circuit shown in FIG. 12, however, the length of a gap formed in a central magnetic leg of an E-E-shaped core in the loosely coupled transformer VFT is set at about 1 mm, and a coefficient of coupling between a primary winding N11 and the secondary winding N12 is set at about 0.8. In each of the foregoing first to fourth embodiments, for example, the coupling coefficient is set at 0.75 or lower, and the gap length is set at about 1.5 mm.

Such a change in the coupling coefficient of the loosely coupled transformer VFT in the present embodiment is related to a coupling coefficient set in an isolated converter transformer PIT. This point will be described.

Figure 14:
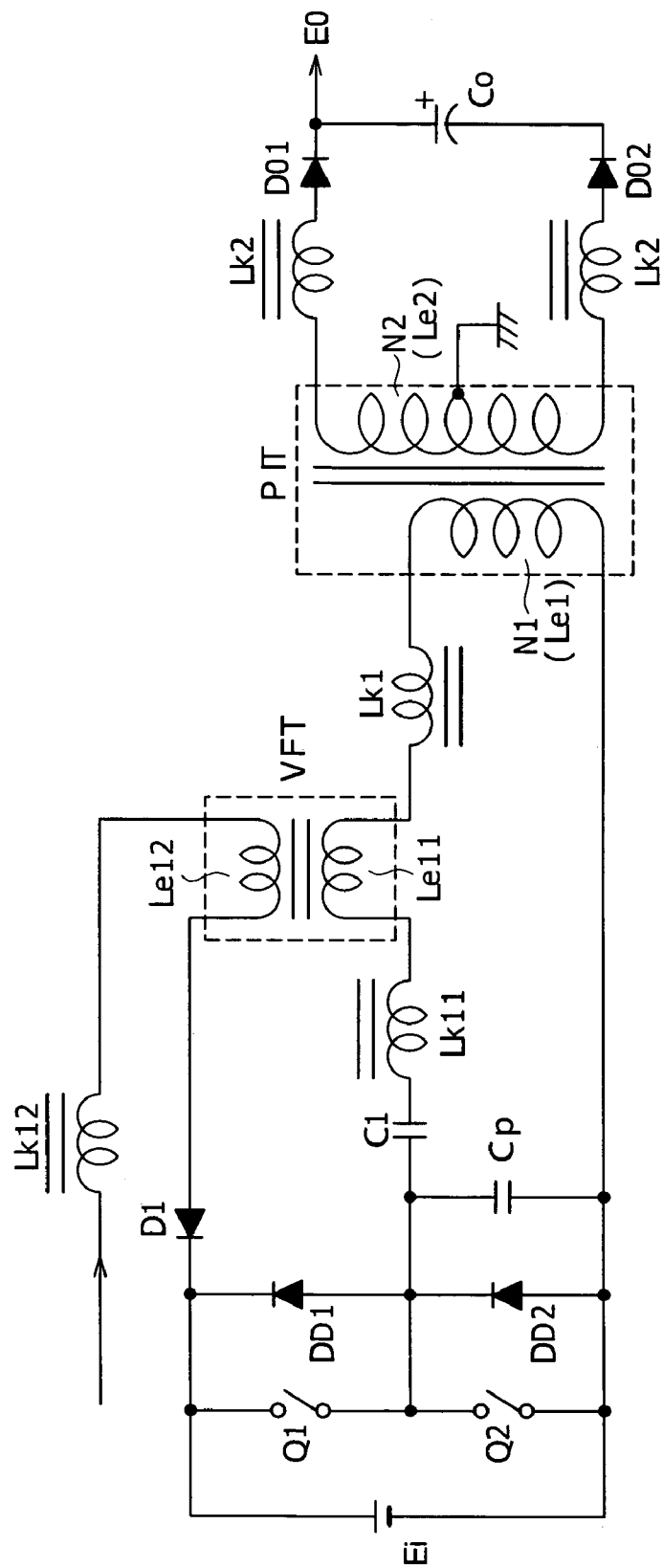
FIG. 14 is a diagram of an equivalent circuit of the circuit shown in FIG. 12 (in the case of a coupling coefficient of 0.8 or lower of the isolated converter transformer)

FIG. 14 shows an equivalent circuit of the power supply circuit shown in FIG. 12 when a state of loose coupling is set with a coupling coefficient of about 0.7 to 0.8 as a coefficient of coupling between a primary winding N1 and a secondary winding N2 side of the isolated converter transformer PIT as in each of the foregoing embodiments.

In the case of the circuit shown in FIG. 12, an inductance (LN11) of the primary winding N11 of the loosely coupled transformer VFT can be represented as a series connection of an exciting inductance Le11 and a leakage inductance Lk11 of the primary winding N11.

Also, an inductance (LN1) of the primary winding N1 of the isolated converter transformer PIT can be represented as a series connection of an exciting inductance Le1 and a leakage inductance Lk1 of the primary winding N1.

As is understood from FIG. 12, the primary winding N1 of the isolated converter transformer PIT and the primary winding N11 of the loosely coupled transformer VFT are connected in series with each other within a primary side series resonant circuit.

Figure 15:
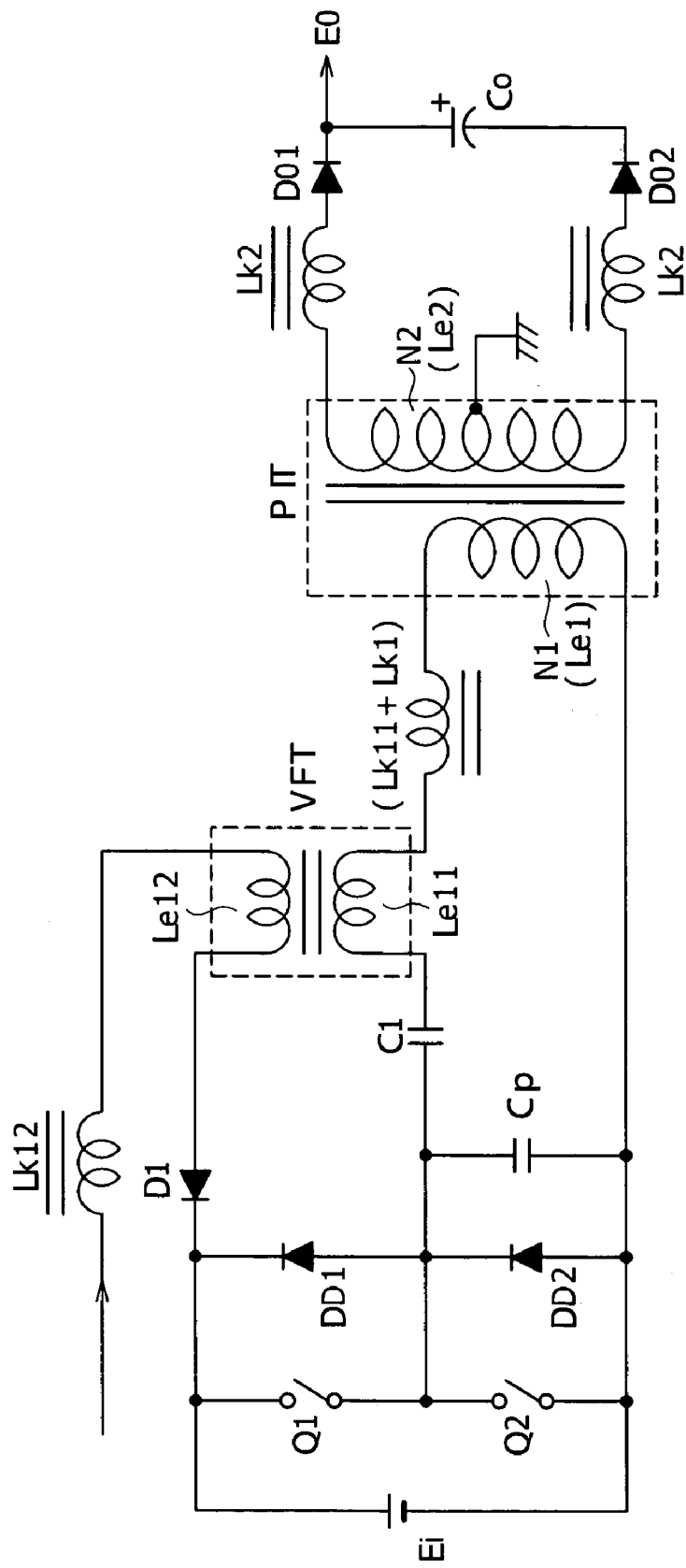
FIG. 15 is a diagram of an equivalent circuit of the circuit shown in FIG. 12 (in the case of a coupling coefficient of 0.90 or higher of the isolated converter transformer)

Hence, according to the equivalent circuit shown in FIG. 14, an inductance when the isolated converter transformer PIT is viewed from the primary side is represented as a series connection of the exciting inductance Le11 of the primary winding N11, the leakage inductance Lk11 of the primary winding N11, and the leakage inductance Lk1 of the primary winding N1. Thus, as shown in FIG. 15, an equivalent leakage inductance when the isolated converter transformer PIT is viewed from the primary side is represented as tk11+Lk1

This means that since the primary winding N11 of the loosely coupled transformer VFT is connected in series with the primary winding N1 of the isolated converter transformer PIT, a leakage inductance of a higher value than the leakage inductance obtained by the isolated converter transformer PIT alone occurs in actuality on the primary side of the isolated converter transformer PIT.

Thus, it is known that the coupling coefficient between the primary side and the secondary side when viewed as that of the power supply circuit as a whole is 0.8 or lower.

In a state in which the coupling coefficient of the power supply circuit is 0.8 or lower, for example, when load power varies greatly, as a load becomes lighter, a direct-current input voltage is increased, thus resulting in a characteristic of great voltage variation.

Accordingly, in order to ensure a constant voltage control range from ±20% of rated voltage of the alternating input voltage to a load open, for example, a product having a correspondingly high withstand voltage needs to be selected as the smoothing capacitor (Ci) for generating the rectified and smoothed voltage Ei (direct-current input voltage), switching devices (Q1 and Q2), a primary side series resonant capacitor C1 and the like. This for example invites an increase in size and weight of a circuit board which increase accompanies an increase in size of part elements and an increase in cost.

In addition, when the direct-current input voltage is increased as the load becomes lighter, a switching loss is also increased because on resistance of the switching devices as MOS-FETs increases as the load becomes lighter. Thus AC/DC power conversion efficiency is decreased.

Further, the increase in the direct-current input voltage as the load becomes lighter means a wide range of variation of the direct-current input voltage. Hence, a switching frequency control range for achieving constant voltage is extended, and a control range is reduced. At the same time, secondary side direct-current output voltage controlled to be constant may be degraded in terms of transient response characteristics between a maximum load and a light load.

Accordingly, the present embodiment is configured such that the isolated converter transformer PIT singly has a coupling coefficient of 0.90 or higher.

Figure 13:
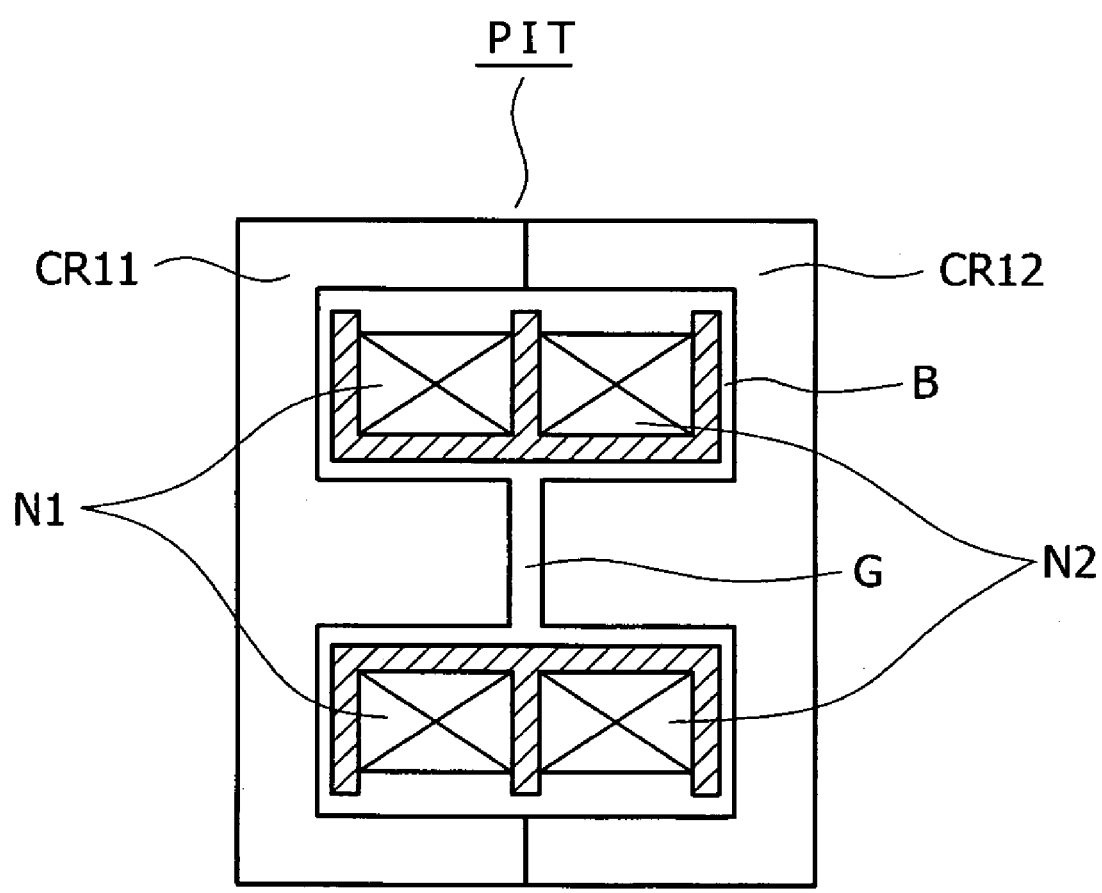
FIG. 13 is a sectional view of an example of structure of an isolated converter transformer according to the embodiment.

As shown in FIG. 13, for example, the structure of the isolated converter transformer PIT has an E-E-shaped core formed by combining E-shaped cores CR11 and CR12 made of ferrite material with each other such that magnetic legs of the core CR11 are opposed to magnetic legs of the core CR12.

The isolated converter transformer PIT also has a bobbin B formed by resin, for example, and having a shape such that a primary side winding part and a secondary side winding part are divided so as to be independent of each other. The primary winding N1 is wound around one winding part of the bobbin B. The secondary winding N2 is wound around the other winding part of the bobbin B. The bobbin B thus wound with the primary winding and the secondary winding is attached to the E-E-shaped core (CR11 and CR12). Thereby the primary side winding and the secondary side winding are wound around the central magnetic leg of the E-E-shaped core in respective different winding regions. The structure of the isolated converter transformer PIT as a whole is thus obtained.

In this case, a coupling coefficient of 0.90 or higher is obtained by setting gap length of a gap G formed at a junction part of the central magnetic leg. In order to set the coupling coefficient to 0.90 or higher, it suffices to set the gap length appropriately in a range of about 0.5 mm and less (including a case of the gap length=0 mm), for example.

FIG. 15 shows an equivalent circuit of the power supply circuit of FIG. 12 when the coupling coefficient of the isolated converter transformer PIT is thus set to 0.90 or higher.

As shown in this figure, the part of the series connection circuit of the primary winding N1 of the isolated converter transformer PIT and the primary winding N11 of the loosely coupled transformer VFT can be considered to have one leakage inductance component (Lk11+LK1) connected in series between the exciting inductance Le1 of the primary winding N1 of the isolated converter transformer PIT and the exciting inductance Le11 of the primary winding N11 of the loosely coupled transformer VFT.

Supposing that the power supply circuit of FIG. 12 is represented by the equivalent circuit of FIG. 15, a coupling coefficient of 0.93 is obtained in the isolated converter transformer PIT with:

An EER-40 core

The gap length=0.4 mm

The primary winding N1=22 T

The secondary winding N2: 14 T+14 T with a center tap as a dividing position

Consequently the following inductance values are obtained.

The inductance LN1 of the primary winding N1 of the isolated converter transformer PIT=391 μH The leakage inductance LK1 of the primary winding N1 of the isolated converter transformer PIT=49 μH The inductance LN2 of the secondary winding N2 of the isolated converter transformer PIT=111 μH The leakage inductance LK2 of the primary winding N1 of the isolated converter transformer PIT=17 μH The loosely coupled transformer VFT has a coupling coefficient of about 0.8 as described above. When the loosely coupled transformer VFT in practice has an EE-28 ferrite core, a gap length set to 1 mm, and a coupling coefficient of 0.79, the following inductance values are obtained.

The inductance LN11 of the primary winding N11 of the loosely coupled transformer VFT=70 μH An inductance LN12 of the secondary winding N12 of the loosely coupled transformer VFT=17 μH As a result, the power supply circuit as a whole configured as shown in FIG. 12 which circuit is represented as the equivalent circuit of FIG. 15 has a coupling coefficient of 0.84. Thus a coupling coefficient higher than 0.80 is obtained.

Figure 16:
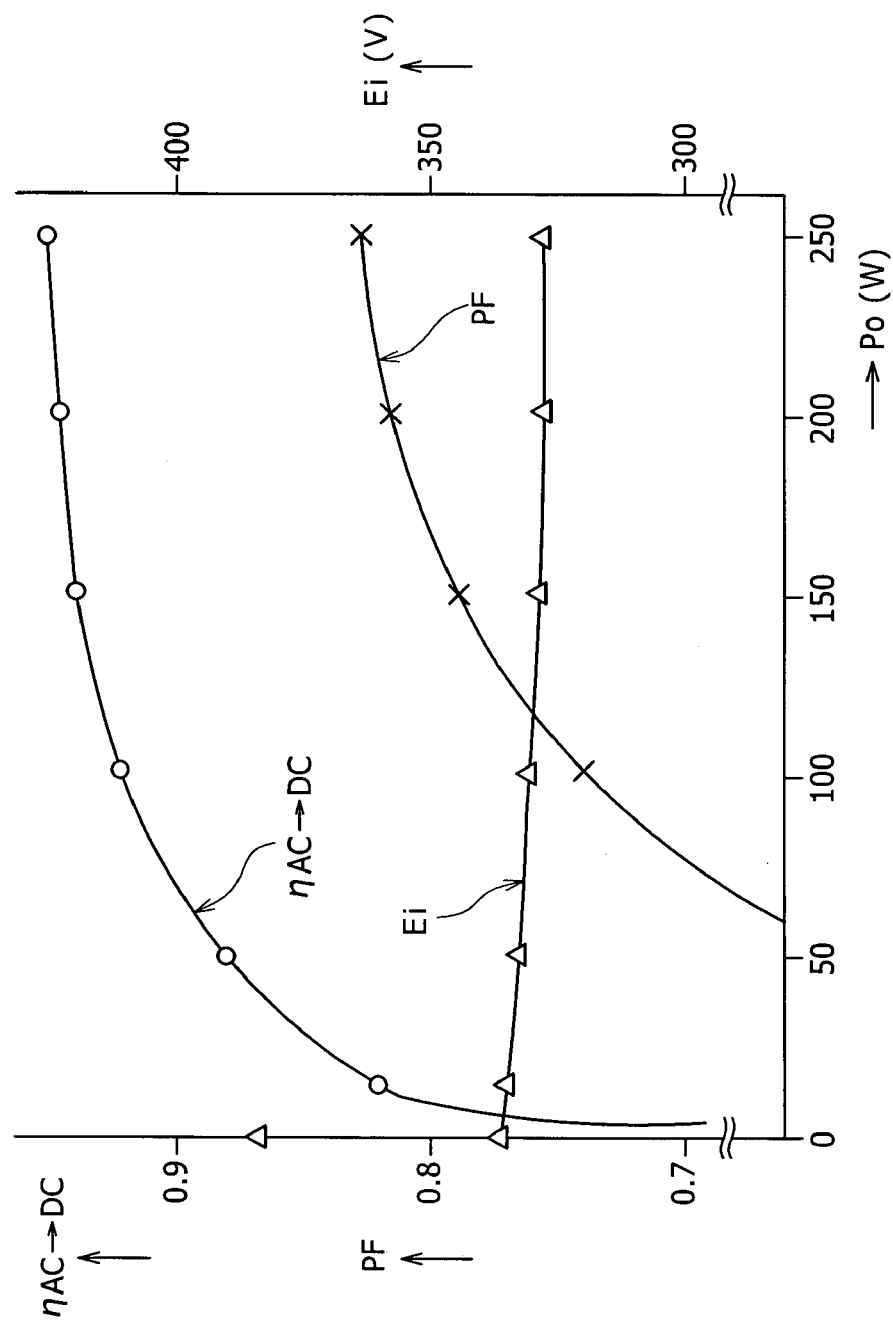
FIG. 16 is a diagram showing characteristics of a power factor, power conversion efficiency, and rectified and smoothed voltage level with respect to load variation in the power supply circuit according to the fifth embodiment.

FIG. 16 shows changes in AC/DC power conversion efficiency (ηAC/DC), the power factor PF, and the rectified and smoothed voltage Ei with respect to variation of load power Po=0 to 250 W when the alternating input voltage VAC=230 V, as experimental results of the power supply circuit of FIG. 12 having the coupling coefficient of 0.84 as the equivalent circuit of FIG. 15 as described above. Incidentally, in obtaining the experimental results shown in this figure, 0.039 μF is selected for the primary side series resonant capacitor C1.

According to FIG. 16, the level of the rectified and smoothed voltage Ei is 336 V to 327 V with respect to the variation of load power Po=0 to 250 W, and is hence varied in a range of 9 V. The range of variation is sufficiently reduced. That is, a phenomenon in which the rectified and smoothed voltage Ei (direct-current input voltage) is increased greatly as the load becomes lighter does not occur because a required value or higher (for example 0.8 or higher) is retained as the coupling coefficient of the circuit as a whole.

The AC/DC power conversion efficiency tends to increase as the load varies from the load power Po=0 W to heavy load. Though a range of load variation is different, a comparison with FIG. 4 showing the characteristics of the power supply circuit according to the foregoing first embodiment, for example, indicates that a curve in a range of load variation in which the load is light (a range where the load power Po is about 100 W or lower in FIG. 16, for example) is gentler. That is, a decrease in the power conversion efficiency under light-load conditions is suppressed.

As for the power factor, PF>0.75 is maintained in a range of the load power Po=100 W to 250 W, thus meeting a power supply harmonic distortion regulation.

Since the level variation range of the rectified and smoothed voltage Ei is reduced as shown by the experimental results in FIG. 16, in ensuring a constant voltage control range from ±20% of rated voltage of the alternating input voltage to a load open, for example, the smoothing capacitor Ci, the switching devices (Q1 and Q2), the primary side series resonant capacitor C1 and the like in the power supply circuit shown in FIG. 12 do not need to have a high withstand voltage. This makes it possible to reduce the size and weight of the circuit board and reduce the cost.

In addition, as shown in FIG. 16, a decrease in the power conversion efficiency under light-load conditions is suppressed. In addition, since the range of variation of the direct-current input voltage under light-load conditions is reduced, a constant voltage control level range relative to the switching frequency control range becomes narrower. That is, the switching frequency control range is relatively extended, and thereby a regulation range is extended and thus improved. Further, as an accompanying result of this, transient response characteristics between a maximum load and a light load in stabilizing the secondary side direct-current output voltage are improved.

Further, as described earlier, the primary winding N1=22 T set in the actual configuration of the isolated converter transformer PIT indicates that the number of turns is reduced as compared with the case where the coupling coefficient is 0.8 or lower, for example, due to an increase of the coupling coefficient by reducing the gap length.

For example, when the coupling coefficient is set to 0.8 or lower, for example, the number of turns of the primary winding N1 needs to be about 33 T.

Since the number of turns is thus reduced, cost of wire material as the windings in one isolated converter transformer PIT is reduced. As the wire material, a 60-μϕ/150-bundle litz wire, for example, is selected. In addition, since the number of turns is reduced, a winding process time is shortened, which leads to an improvement in manufacturing efficiency.

Description will be made of modifications of the power supply circuit according to the fifth embodiment shown in FIG. 12.

As a first example, as indicated by a broken line on the secondary side of the circuit of FIG. 12, as with the second embodiment shown in FIG. 6, the power supply circuit according to the fifth embodiment has a parallel resonant capacitor C2 connected in parallel with the secondary winding N2 of the isolated converter transformer PIT.

Also in this case, a capacitance of the parallel resonant capacitor C2 and a leakage inductance L2 of the secondary winding N2 form a secondary side parallel resonant circuit. Depending on an actually selected capacitance value of the parallel resonant capacitor C2, the secondary side parallel resonant circuit is formed as a voltage resonant circuit for converting operation of a secondary side rectifier circuit into a voltage resonant type operation, or a partial voltage resonant circuit for obtaining a partial voltage resonant operation.

As a second modification example, the circuit configuration shown in FIG. 1 is used as the power factor improving circuit 3 in place of the configuration shown in FIG. 12. In this case, while the circuit configuration is the same as in FIG. 1, the coupling coefficients of the isolated converter transformer PIT and the loosely coupled transformer VFT are set as described above, whereby the power supply circuit according to the fifth embodiment is obtained.

Whichever example is employed, in the fifth embodiment, the coupling coefficients of the isolated converter transformer and the power factor improving transformer are set so as to obtain a required coupling coefficient of the circuit as a whole, and the isolated converter transformer in particular has a required coupling coefficient set therein that does not represent loose coupling, whereby the range of variation of the direct-current input voltage (rectified and smoothed voltage) according to load variation is reduced. This eliminates the need for selecting a product having a high withstand voltage as the smoothing capacitor for generating the direct-current input voltage, the switching devices and the like, and thus makes it possible to correspondingly reduce cost and the size and weight of the circuit board. This also suppresses a decrease in power conversion efficiency, or facilitates an improvement in power conversion efficiency, and further extends a constant voltage control range.

A power supply circuit according to a sixth embodiment will next be described. The power supply circuit according to the sixth embodiment is based on the configuration of the power supply circuit according to the foregoing fifth embodiment.

However, while the power supply circuit according to the fifth embodiment for example meets conditions of a single range of a commercial alternating-current power supply AC=200 V system and a load power Po=250 W or higher, the power supply circuit according to the sixth embodiment meets conditions of a single range of a commercial alternating-current power supply AC=100 V system and a load power Po=250 W or higher.

A configuration of a power factor improving circuit 3 including a rectifier circuit system in the power supply circuit according to the sixth embodiment is changed to deal with an input of the commercial alternating-current power supply AC=100 V system.

Figure 17:
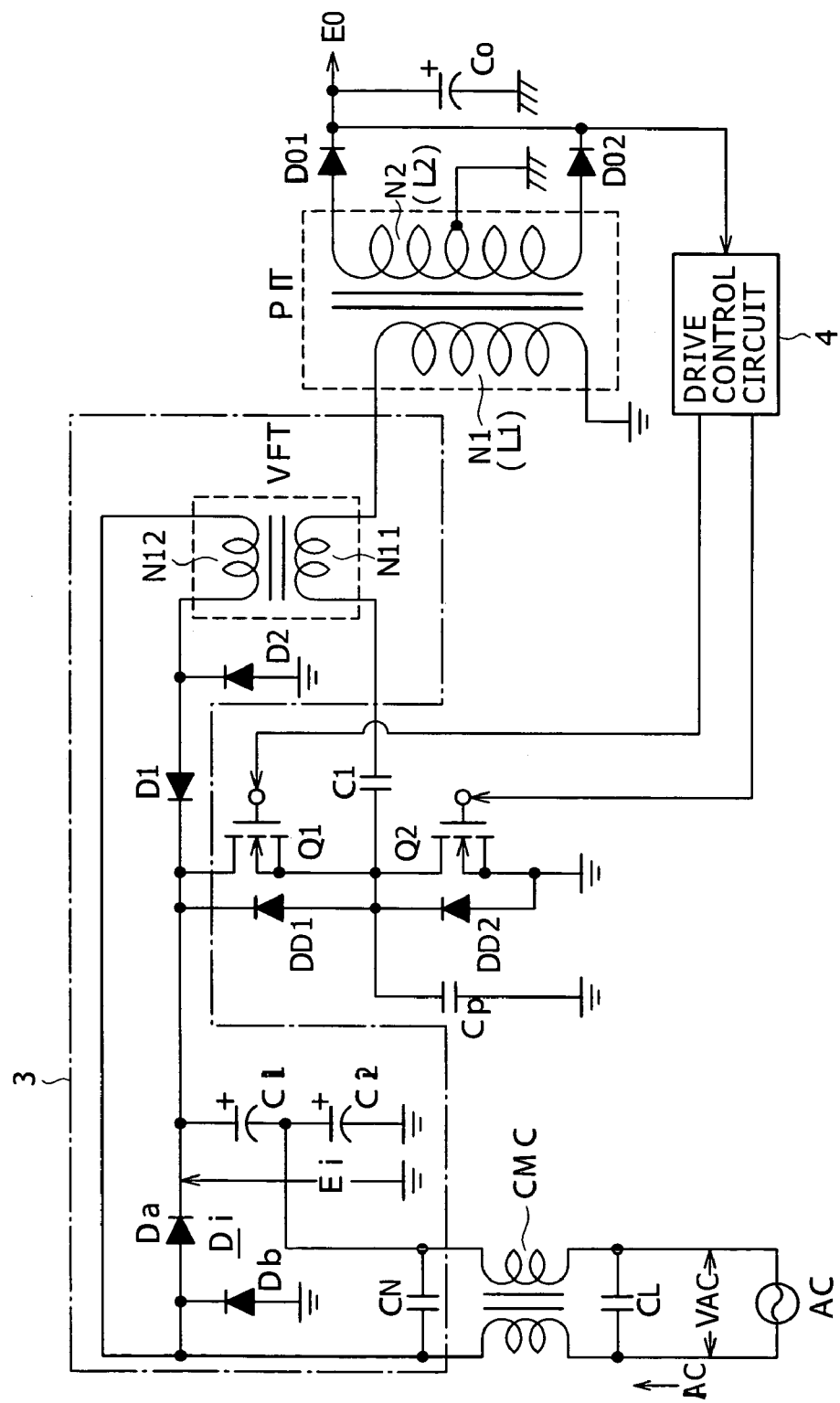
FIG. 17 is a circuit diagram showing an example of configuration of a power supply circuit according to a sixth embodiment.

FIG. 17 shows an example of configuration of the power supply circuit according to the sixth embodiment. Incidentally, in this figure, the same parts as in the figures showing the configurations of the power supply circuits according to the first to fifth embodiments (FIG. 1, FIG. 6, FIG. 7, FIG. 11, and FIG. 12) are identified by the same reference numerals, and description thereof will be omitted.

The power factor improving circuit 3 of the power supply circuit shown in this figure is provided with a voltage doubler rectifier circuit to deal with the 100 V system of the commercial alternating-current power supply AC.

A bridge rectifier circuit Di comprises slow recovery type rectifier diodes Da and Db. The rectifier diode Da has an anode connected to a point of connection between a common mode choke coil CMC and a filter capacitor CN on a side of a positive electrode line of the commercial alternating-current power supply AC, and has a cathode connected to a positive electrode terminal of a smoothing capacitor Ci1 (a positive electrode line of a rectified and smoothed voltage Ei).

The rectifier diode Db has an anode connected to a primary side ground, and a cathode connected to the anode of the rectifier diode Da.

As a smoothing capacitor, two smoothing capacitors Ci1→Ci2 connected in series with each other are provided. The positive electrode terminal of the smoothing capacitor Ci1 is connected to the cathode of the rectifier diode Da, as described above. A negative electrode terminal of the smoothing capacitor Ci2 is connected to the primary side ground. A point of connection between a negative electrode terminal of the smoothing capacitor Ci1 and a positive electrode terminal of the smoothing capacitor Ci2 is connected to a point of connection between the common mode choke coil CMC and the filter capacitor CN on a side of a negative electrode line of the commercial alternating-current power supply AC.

In the power factor improving circuit 3, a series circuit of a secondary winding N12 of a loosely coupled transformer VFT and a fast recovery type rectifier diode D1 is connected between the positive electrode terminal of the smoothing capacitor Ci1 (the positive electrode line of the rectified and smoothed voltage Ei) and the point of connection between the common mode choke coil CMC and the filter capacitor CN on the side of the positive electrode line of the commercial alternating-current power supply AC. In this case, the rectifier diode D1 has an anode connected to the secondary winding N12, and a cathode connected to the positive electrode terminal of the smoothing capacitor Ci1.

A point of connection between the anode of the rectifier diode D1 and the secondary winding N12 of the loosely coupled transformer VFT is connected with a cathode of a fast recovery type rectifier diode D2. An anode of the rectifier diode D2 is connected to the primary side ground.

As a rectification current in a period of positive polarity of the alternating input voltage VAC in the thus formed power factor improving circuit 3, a first rectification current I1 flows from the positive electrode line of the commercial alternating-current power supply AC through a path of the rectifier diode Da→the smoothing capacitor Ci1→the negative electrode line of the commercial alternating-current power supply AC. Also, a second rectification current I2 flows from the positive electrode line of the commercial alternating-current power supply AC through a path of the secondary winding N12 of the loosely coupled transformer VFT→the rectifier diode D1→the smoothing capacitor Ci1→the negative electrode line of the commercial alternating-current power supply AC→the filter capacitor CN.

Also in this case, the first rectification current does not form an alternating waveform because the slow recovery type rectifier diode Da does not perform switching operation. On the other hand, the second rectification current is interrupted by the fast recovery type rectifier diode D1 that performs switching operation on the basis of an alternating voltage obtained in the secondary winding N12 of the loosely coupled transformer VFT. Thus the second rectification current forms an alternating waveform, and flows into the smoothing capacitor Ci1.

In a period of negative polarity of the alternating input voltage VAC, the rectification current branches into the first rectification current flowing from the negative electrode line of the commercial alternating-current power supply AC through a path of the smoothing capacitor Ci2→the rectifier diode Db→the positive electrode line of the commercial alternating-current power supply AC and the second rectification current flowing from the negative electrode line of the commercial alternating-current power supply AC through a path of the smoothing capacitor Ci2→the rectifier diode D2→the secondary winding N12 of the loosely coupled transformer VFT→the positive electrode line of the commercial alternating-current power supply AC→the filter capacitor CN.

Also in this case, the first rectification current does not form an alternating waveform because the slow recovery type rectifier diode Db does not perform switching operation. On the other hand, the second rectification current is interrupted by the rectifier diode D2 that performs switching operation on the basis of application thereto of an alternating voltage obtained in the secondary winding N12 of the loosely coupled transformer VFT. Thus the second rectification current forms an alternating waveform, and flows into the smoothing capacitor Ci2.

Thus, also in this case, in each period of positive polarity/negative polarity of the alternating input voltage VAC, the path in which the rectification current flows through a required rectifier diode of the bridge rectifier circuit Di and a path in which the rectification current flows through the fast recovery type rectifier diode D1 or D2 form path portions in which the rectification current branches off to flow in parallel.

The rectification current flowing in the path on a side of the fast recovery type rectifier diode D1 or D2 is switched by the rectifier diode D1 or D2. Thereby, as described thus far, a conduction angle of an alternating input current IAC is increased to improve a power factor.

According to the rectification current paths described above, as rectifying operation, the smoothing capacitor Ci1 is charged in a period of positive polarity of the alternating input voltage VAC, and the smoothing capacitor Ci2 is charged in a period of negative polarity of the alternating input voltage VAC. Thus, also in this case, a voltage doubler rectifier operation is obtained which generates the rectified and smoothed voltage Ei corresponding to twice a level of the alternating input voltage VAC as voltage across the series connection circuit of the smoothing capacitors Ci1–Ci2.

Figure 20:
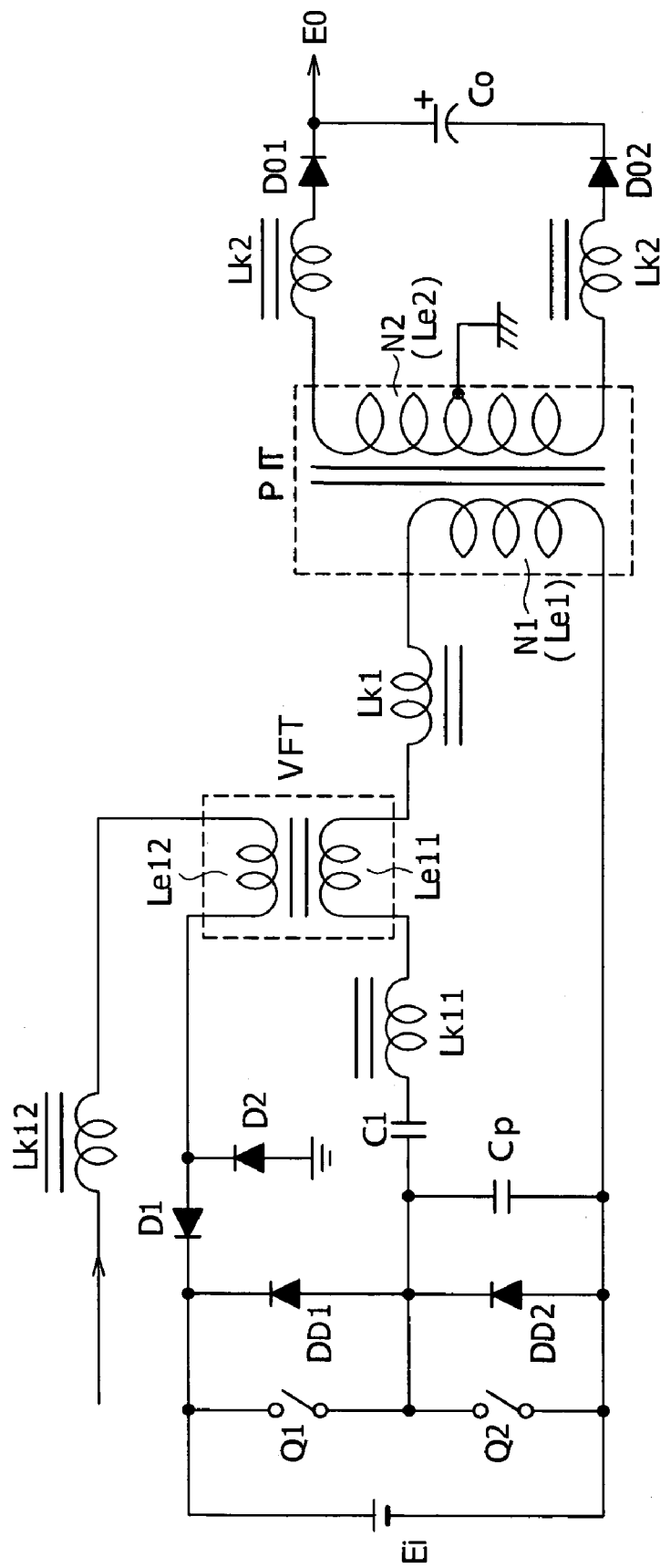
FIG. 20 is a diagram of an equivalent circuit of the circuit shown in FIG. 17 (in the case of a coupling coefficient of 0.8 or lower of the isolated converter transformer)

FIG. 20 shows an equivalent circuit of the power supply circuit according to the sixth embodiment shown in FIG. 17 when a state of loose coupling is set with a coupling coefficient of about 0.7 to 0.8 as a coefficient of coupling between a primary winding N1 and a secondary winding N2 side of an isolated converter transformer PIT.

Also in the circuit shown in FIG. 20, an inductance (LN11) of a primary winding N11 of the loosely coupled transformer VFT can be represented as a series connection of an exciting inductance Le11 and a leakage inductance Lk11 of the primary winding N11.

Also, an inductance (LN1) of the primary winding N1 of the isolated converter transformer PIT can be represented as a series connection of an exciting inductance Le1 and a leakage inductance Lk1 of the primary winding N1.

Also in this case, as shown in FIG. 17, the primary winding N1 of the isolated converter transformer PIT and the primary winding. N1 of the loosely coupled transformer VFT are connected in series with each other within a primary side series resonant circuit.

Figure 21:
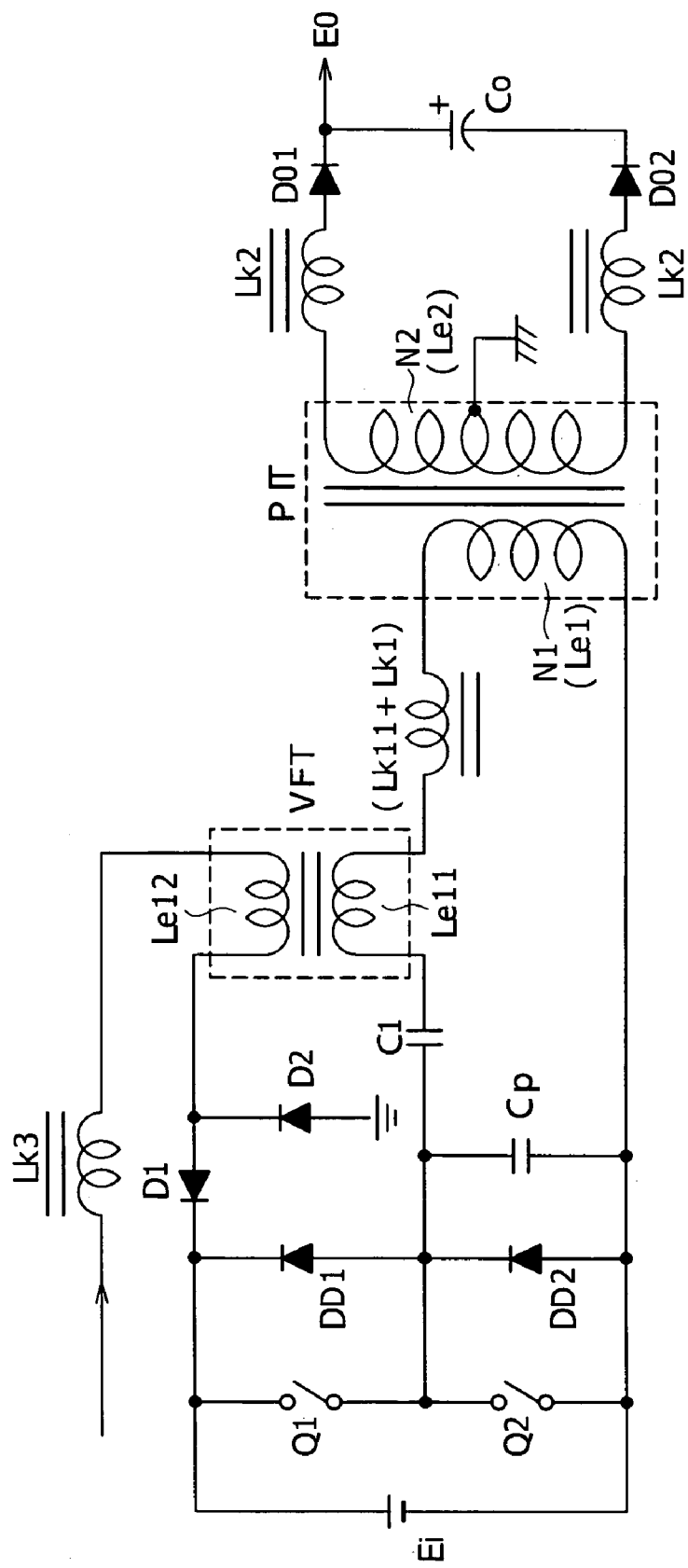
FIG. 21 is a diagram of an equivalent circuit of the circuit shown in FIG. 17 (in the case of a coupling coefficient of 0.90 or higher of the isolated converter transformer)

Hence, as shown in the equivalent circuit of FIG. 21, the leakage inductance of the primary winding N1 when viewed from the isolated converter transformer PIT side is represented as a series connection of the leakage inductance Lk11 of the primary winding N11 and the leakage inductance Lk1 of the primary winding N1. That is, as in FIG. 15, the actual leakage inductance of the primary winding N1 of the isolated converter transformer PIT in this case is represented as $Lk11+Lk1$ As a result, the coupling coefficient between the primary side and the secondary side when viewed as that of the power supply circuit as a whole is 0.8 or lower.

Accordingly, the power supply circuit according to the sixth embodiment is configured such that the isolated converter transformer PIT singly has a coupling coefficient of 0.90 or higher. The structure of the isolated converter transformer PIT for this is shown in FIG. 13, for example, and therefore description thereof will be omitted.

FIG. 21 shows an equivalent circuit of the power supply circuit of FIG. 17 when the coupling coefficient of the isolated converter transformer PIT is thus set to 0.90 or higher.

As shown in this figure, the part of the series connection circuit of the primary winding N1 of the isolated converter transformer PIT and the primary winding N11 of the loosely coupled transformer VFT can be considered to have one leakage inductance component (Lk11+LK1) connected in series between the exciting inductance Le1 of the primary winding N1 of the isolated converter transformer PIT and the exciting inductance Le11 of the primary winding N11 of the loosely coupled transformer VFT.

Supposing that the power supply circuit of FIG. 17 is represented by the equivalent circuit of FIG. 21, a coupling coefficient of 0.93 is obtained in the actual isolated converter transformer PIT with for example:

An EER-40 core

The gap length=0.4 mm

The primary winding N1=22 T

The secondary winding N2: 14 T+14 T with a center tap as a dividing position

Consequently the following inductance values are obtained.

The inductance LN1 of the primary winding N1 of the isolated converter transformer PIT=319 μH The leakage inductance LK1 of the primary winding N1 of the isolated converter transformer PIT=49 μH An inductance LN2 of the secondary winding N2 of the isolated converter transformer PIT=111 μH A leakage inductance LK2 of the secondary winding N2 of the isolated converter transformer PIT=17 μH In setting a coupling coefficient of the loosely coupled transformer VFT to about 0.8, the loosely coupled transformer VFT in practice has an EE-28 ferrite core and a gap length of 1.5 mm, and consequently has a coupling coefficient of 0.75. Thereby the following inductance values are obtained.

The inductance LN11 of the primary winding N11 of the loosely coupled transformer VFT=95 μH An inductance LN12 of the secondary winding N12 of the loosely coupled transformer VFT=43 μH As a result, the power supply circuit as a whole configured as shown in FIG. 17 which circuit is represented as the equivalent circuit of FIG. 21 has a coupling coefficient of 0.84. Thus a coupling coefficient higher than 0.80 is obtained.

Figure 22:
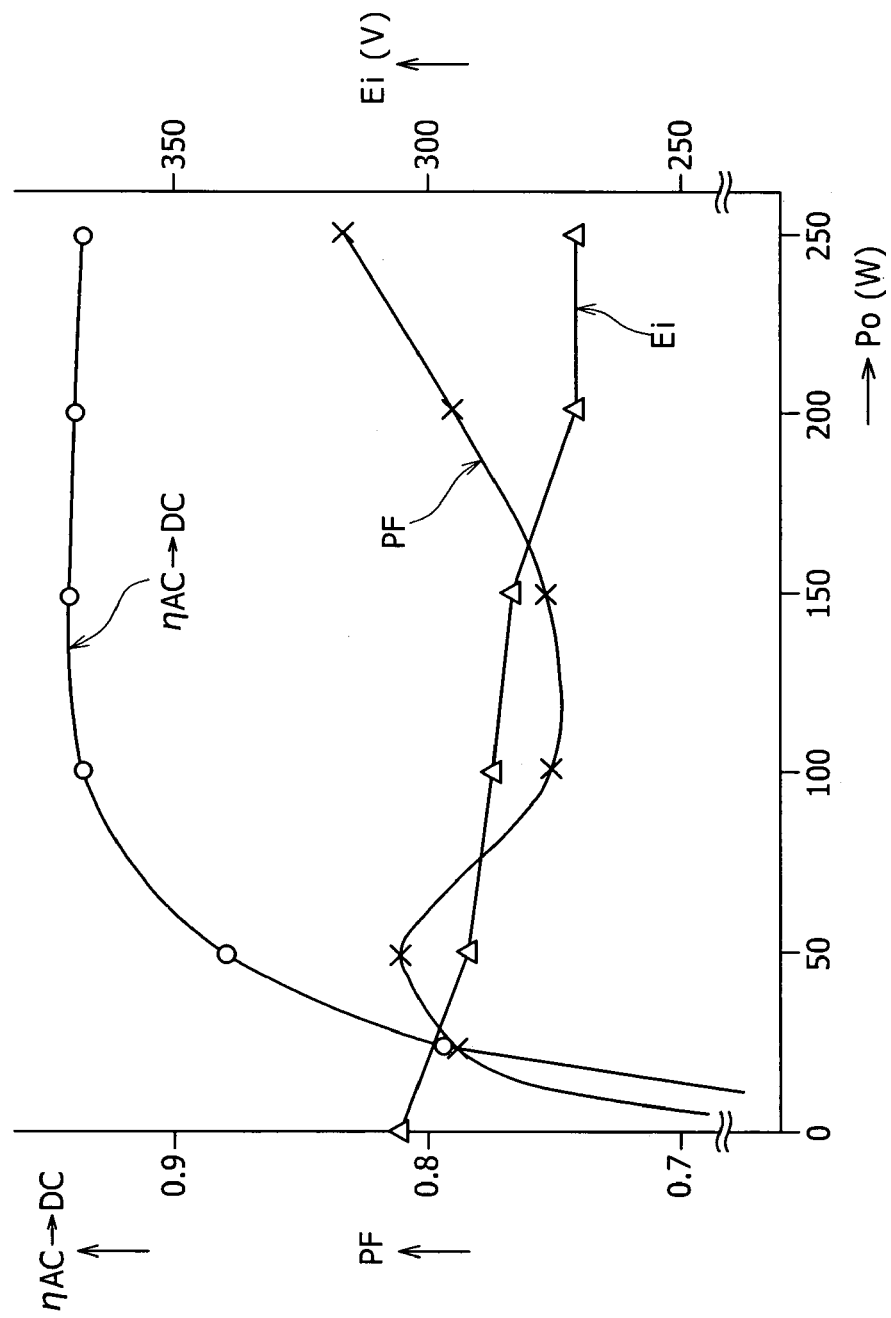
FIG. 22 is a diagram showing characteristics of a power factor, power conversion efficiency, and rectified and smoothed voltage level with respect to load variation in the power supply circuit according to the sixth embodiment.

FIG. 22 shows changes in AC/DC power conversion efficiency (ηAC/DC), the power factor PF, and the rectified and smoothed voltage Ei with respect to variation of load power Po=0 to 250 W when the alternating input voltage VAC=100 V, as experimental results of the power supply circuit of FIG. 17 having the coupling coefficient of 0.84 as the equivalent circuit of FIG. 21 as described above. Incidentally, in obtaining the experimental results shown in this figure, 0.022 μF is selected for a primary side series resonant capacitor C1.

According to FIG. 22, also in this case, the level of the rectified and smoothed voltage Ei is 270 V to 312 V with respect to the variation of load power Po=0 to 250 W, and is hence varied in a range of 42 V. This experimental result indicates that the range of variation of the direct-current input voltage level is sufficiently reduced in the complex resonant converter having the voltage doubler rectifier circuit that deals with the commercial alternating-current power supply AC=100 V system and the load power Po=250 W or higher.

Characteristics of the AC/DC power conversion efficiency shown in this figure indicate that a curve in a range of load variation in which the load is light is gentle, and that therefore a decrease in the power conversion efficiency under light-load conditions is suppressed.

As for the power factor, PF>0.75 is maintained in a range of the load power Po=15 W to 250 W, thus meeting a power supply harmonic distortion regulation.

As is understood from such characteristics, the smoothing capacitor Ci, the switching devices (Q1 and Q2), the primary side series resonant capacitor C1 and the like in the power supply circuit according to the sixth embodiment do not need to have a high withstand voltage. This makes it possible to reduce the size and weight of the circuit board and reduce the cost.

In addition, a decrease in the power conversion efficiency under light-load conditions is suppressed. In addition, since an increase in the direct-current input voltage under light-load conditions is suppressed, a control range for achieving constant voltage by switching frequency control is extended, and transient response characteristics between a maximum load and a light load in stabilizing control of the secondary side direct-current output voltage are improved.

Next, two examples will be given as modifications of the power supply circuit according to the sixth embodiment.

Figure 18:
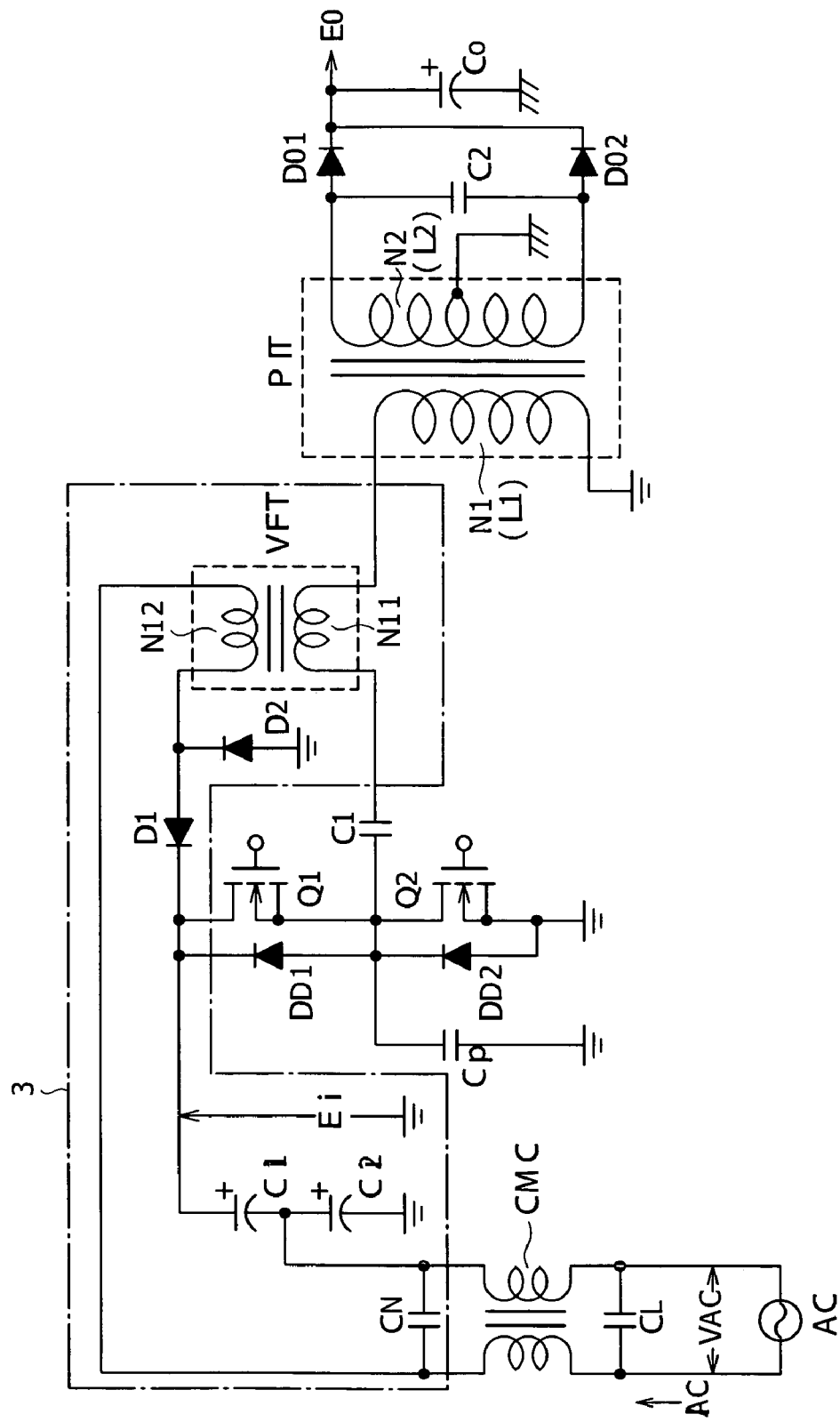
FIG. 18 is a circuit diagram showing a modification of the power supply circuit according to the sixth embodiment.

FIG. 18 shows a configuration of a modification as a first example.

In this modification as the first example, a parallel resonant capacitor C2 is connected in parallel with a secondary winding N2 of an isolated converter transformer PIT to thereby form a secondary side parallel resonant circuit as a voltage resonant circuit for converting operation of a secondary side rectifier circuit into a voltage resonant type operation, or a partial voltage resonant circuit for obtaining a partial voltage resonant operation.

Within a power factor improving circuit 3, the rectifier circuit Di formed with the slow recovery type rectifier diodes Da and Db in FIG. 17 is omitted. In this circuit configuration, all components of rectification current in a positive period of an alternating input voltage VAC are switched by a fast recovery type rectifier diode D1 to form an alternating waveform, and all components of rectification current in a negative period of the alternating input voltage VAC are switched by a fast recovery type rectifier diode D2 to form an alternating waveform.

Figure 19:
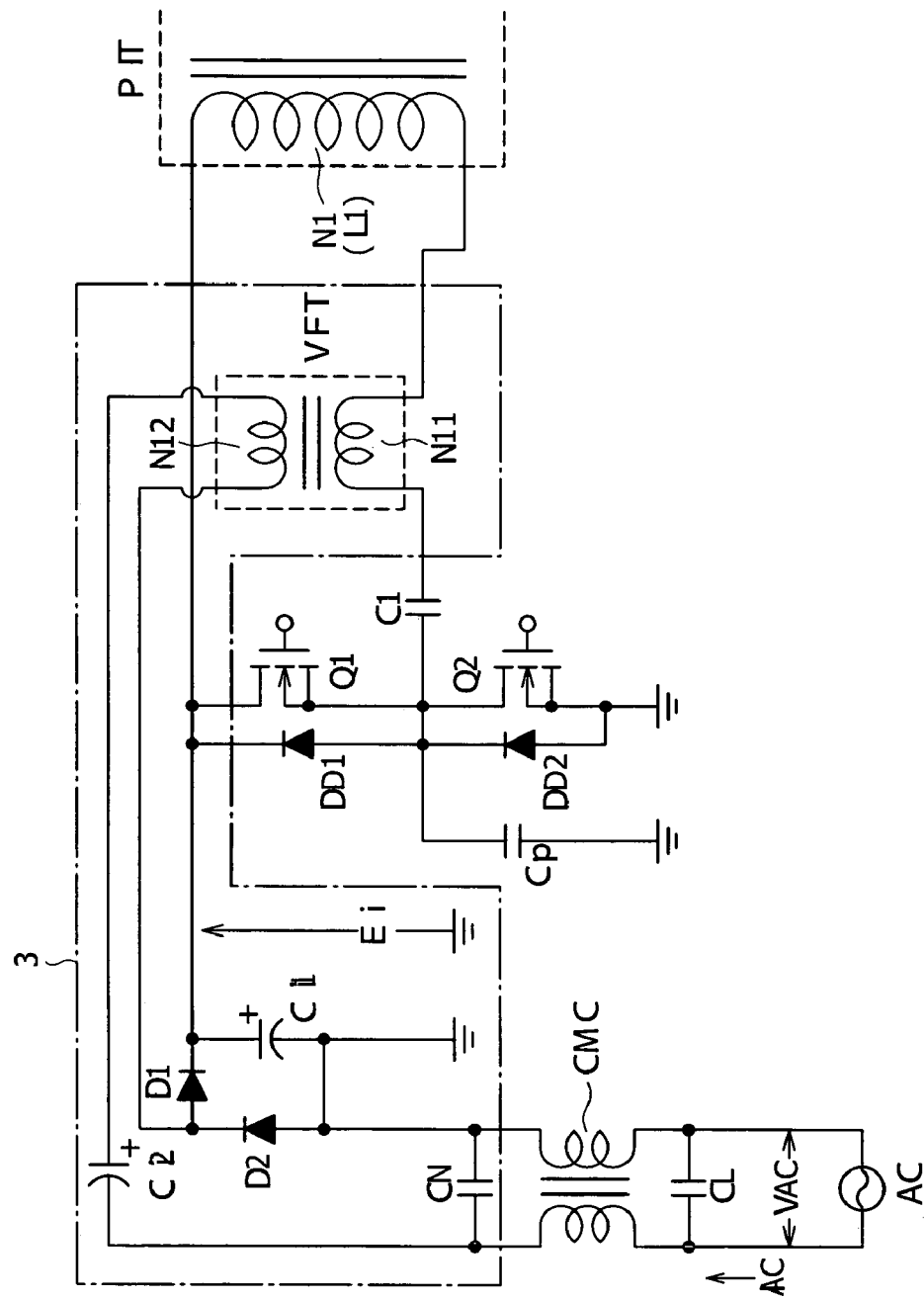
FIG. 19 is a circuit diagram showing a modification of the power supply circuit according to the sixth embodiment.

FIG. 19 shows a configuration of a modification as a second example.

While a power factor improving circuit 3 shown in this figure has two fast recovery type rectifier diodes D1 and D2 and two smoothing capacitors Ci1 and Ci2 as in FIG. 18, a form of connection of the fast recovery type rectifier diodes D1 and D2 and the smoothing capacitors Ci1 and Ci2 is different.

In this case, a negative electrode terminal of the smoothing capacitor Ci2 is connected to a point of connection between a common mode choke coil CMC and a filter capacitor CN on a side of a positive electrode line of a commercial alternating-current power supply AC. A positive electrode terminal of the smoothing capacitor Ci2 is connected to a point of connection between an anode of the rectifier diode D1 and a cathode of the rectifier diode D2 via a secondary winding N12 of a loosely coupled transformer VFT, the secondary winding N12 being connected in series with the positive electrode terminal of the smoothing capacitor Ci2.

A cathode of the rectifier diode D1 is connected to a positive electrode terminal of the smoothing capacitor Ci1. An anode of the rectifier diode D2 is connected to a point of connection between the common mode choke coil CMC and the filter capacitor CN on a side of a negative electrode line of the commercial alternating-current power supply AC.

In this case, the point of connection between the common mode choke coil CMC and the filter capacitor CN on the side of the negative electrode line of the commercial alternating-current power supply AC is connected to a primary side ground and is thereby at a ground potential. A negative electrode terminal of the smoothing capacitor Ci2 is connected to the primary side ground.

A series connection circuit of switching devices Q1 and Q2 in a succeeding stage is connected in parallel with the smoothing capacitor Ci1. That is, a direct-current input voltage (rectified and smoothed voltage Ei) in this case is obtained as voltage across the smoothing capacitor Ci1.

Operation of the power factor improving circuit 3 in such a configuration is as follows.

First, in a period of negative polarity of the alternating input voltage VAC, rectification current flows from the negative electrode line of the commercial alternating-current power supply AC through a path of the rectifier diode D2→the secondary winding N12 of the loosely coupled transformer VFT→the smoothing capacitor Ci2→the negative electrode line of the commercial alternating-current power supply AC.

As a result of the rectification current flowing through the above-described rectification current path, the smoothing capacitor Ci2 is charged, whereby a potential having a level corresponding to that of the alternating input voltage VAC multiplied by unity is obtained across the smoothing capacitor Ci2.

At this time, an alternating voltage induced in the secondary winding N12 of the loosely coupled transformer VFT is applied to the rectifier diode D2. Thus the rectifier diode D2 switches and interrupts the rectification current, whereby the rectification current forms an alternating waveform having a switching period. Incidentally, a high-frequency component having the switching period is absorbed so as to flow through the filter capacitor CN in the above-described rectification current path.

In a next period of negative polarity of the alternating input voltage VAC, the rectification current flows from the positive electrode line of the commercial alternating-current power supply AC through a path of the smoothing capacitor Ci2→the secondary winding N12 of the loosely coupled transformer VFT→the rectifier diode D1→the smoothing capacitor Ci1→the negative electrode line of the commercial alternating-current power supply AC (the primary side ground).

As a result of the rectification current flowing through the above-described rectification current path, the smoothing capacitor Ci1 is charged such that the potential obtained across the smoothing capacitor Ci2 is superimposed on the level of the alternating input voltage VAC. Thereby a rectified and smoothed voltage Ei having a level corresponding to twice the alternating input voltage VAC is obtained as voltage across the smoothing capacitor Ci1. That is, a voltage doubler rectifier operation is obtained.

In the above-described rectification current path, an alternating voltage induced in the secondary winding N12 of the loosely coupled transformer VFT is applied to the rectifier diode D1. Thus the rectifier diode D1 switches the rectification current.

Hence, also in this case, the rectification current is switched according to switching output fed back by voltage feedback of the loosely coupled transformer VFT in each period of positive polarity/negative polarity of the alternating input voltage VAC. That is, a power factor improving operation is obtained.

Incidentally, the secondary side parallel resonant circuit shown in FIG. 18 as a modification may be provided in the power supply circuit according to the sixth embodiment employing the configuration of the power factor improving circuit 3 shown in FIG. 17 or FIG. 19, for example. That is, the secondary side parallel resonant circuit may be added without limitation by the configuration of the power factor improving circuit 3.

A power supply circuit according to a seventh embodiment will next be described. The power supply circuit according to the seventh embodiment is a so-called wide range-capable power supply circuit that deals with a commercial alternating-current power supply AC=100 V system and AC=200 V system. The power supply circuit according to the seventh embodiment is similar to the power supply circuits according to the fifth and sixth embodiments in that the power supply circuits deal with load power Po=250 W or higher.

Figure 23:
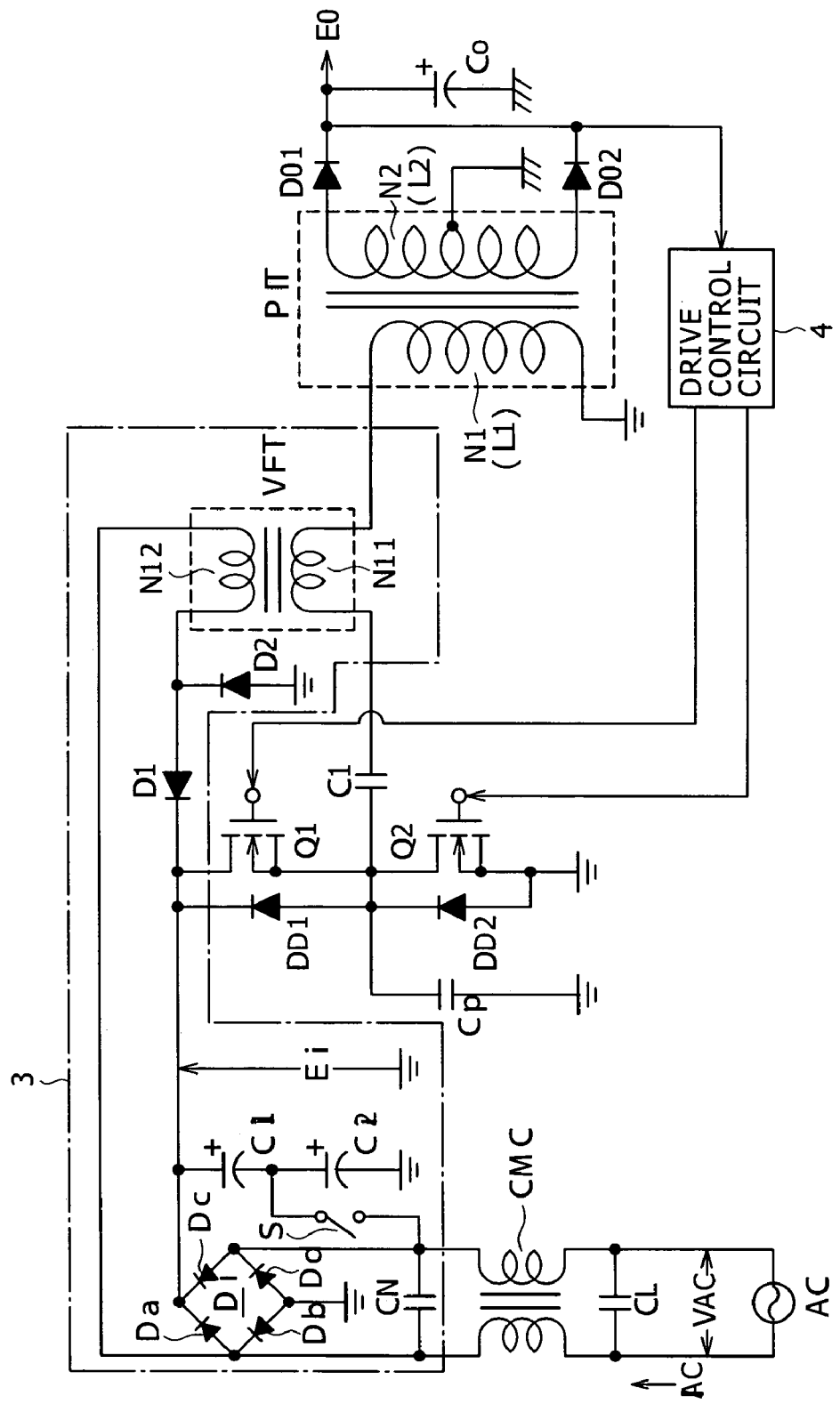
FIG. 23 is a circuit diagram showing an example of configuration of a power supply circuit according to a seventh embodiment.

FIG. 23 shows an example of configuration of the power supply circuit according to the seventh embodiment. Incidentally, in this figure, the same parts as in figures showing the configurations of the power supply circuits according to the first to fifth embodiments are identified by the same reference numerals, and description thereof will be omitted.

In a power factor improving circuit 3 shown in this figure, one filter capacitor CN, a bridge rectifier circuit Di comprising slow recovery type rectifier diodes Da to Dd, and two fast recovery type rectifier diodes D1 and D2 are connected in the same form of connection as in the power factor improving 3 of the power supply circuit according to the fifth embodiment shown in FIG. 12.

In this case, two smoothing capacitors Ci1 and Ci2 are provided as a smoothing capacitor for generating a rectified and smoothed voltage Ei (direct-current input voltage). The smoothing capacitors Ci1 and Ci2 are connected in series with each other as shown in the figure. A positive electrode terminal of the smoothing capacitor Ci1 is connected to a point of connection between a positive electrode output terminal of the bridge rectifier circuit Di for the rectified and smoothed voltage Ei and the fast recovery type rectifier diode D1. A negative electrode terminal of the smoothing capacitor Ci2 is connected to a primary side ground.

A point of connection between a negative electrode terminal of the smoothing capacitor Ci1 and a positive electrode terminal of the smoothing capacitor Ci2 connected in series with each other is connected via a switch S to a point of connection between a common mode choke coil CMC and a filter capacitor CN on a side of a negative electrode line of a commercial alternating-current power supply AC.

The switch S performs switching so as to be turned on when an alternating input voltage VAC=less than 150 V corresponding to the AC 100 V system is input and turned off when an alternating input voltage VAC=150 V or higher corresponding to the AC 200 V system is input. While a circuit part for switching control of the switch S is not shown in FIG. 23, a relay switch is used for the switch S, for example. Then, it suffices to provide a circuit part configured to detect the level of the alternating input voltage VAC and switch the switch S by driving an electromagnetic relay according to a result of the detection.

Operation of the power factor improving circuit 3 having a rectifier circuit system thus configured is as follows.

First, when the alternating input voltage VAC lower than 150 V is input in correspondence with the commercial alternating-current power supply AC=100 V system and thus the switch S is on, a voltage doubler rectifier circuit is formed as follows.

When the alternating input voltage VAC is of positive polarity, a first rectification current flows in a path of a positive electrode line of the commercial alternating-current power supply AC→the rectifier diode Da→the smoothing capacitor Ci1→the switch S→the negative electrode line of the commercial alternating-current power supply AC, and a second rectification current flows in a path of the positive electrode line of the commercial alternating-current power supply AC→a secondary winding N12 of a loosely coupled transformer VFT→the rectifier diode D1→the smoothing capacitor Ci1→the switch S→the negative electrode line of the commercial alternating-current power supply AC→the filter capacitor CN.

The smoothing capacitor Ci1 is charged with the first rectification current and the second rectification current. Thus a direct-current voltage having a level corresponding to the alternating input voltage VAC multiplied by unity is obtained as voltage across the smoothing capacitor Ci1.

In the rectification current path in which the second rectification current flows, the fast recovery type rectifier diode D1 switches the second rectification current on the basis of an alternating voltage induced in the secondary winding N12 of the loosely coupled transformer VFT. That is, the second rectification current forms an alternating waveform.

When the alternating input voltage VAC is of negative polarity, the first rectification current flows in a path of the negative electrode line of the commercial alternating-current power supply AC→→the switch S→the smoothing capacitor Ci2→the rectifier diode Db→the positive electrode line of the commercial alternating-current power supply AC, and the second rectification current flows from the negative electrode line of the commercial alternating-current power supply AC through the switch S to a path of the smoothing capacitor Ci2→the rectifier diode D2→the secondary winding N12 of the loosely coupled transformer VFT→the positive electrode line of the commercial alternating-current power supply AC→the filter capacitor CN.

The smoothing capacitor Ci2 is charged with the first rectification current and the second rectification current. Thus a direct-current voltage having a level corresponding to the alternating input voltage VAC multiplied by unity is obtained also as voltage across the smoothing capacitor Ci2.

As a result, a rectified and smoothed voltage Ei that is a direct-current voltage having a level corresponding to twice the alternating input voltage VAC is obtained as voltage across the series connection circuit of the smoothing capacitors Ci1–Ci2. That is, a voltage doubler rectifier operation is obtained.

Also in the period of negative polarity of the alternating input voltage VAC, in the rectification current path in which the second rectification current flows, the fast recovery type rectifier diode D2 switches the second rectification current on the basis of the alternating voltage induced in the secondary winding N12 of the loosely coupled transformer VFT. Thus, the second rectification current forms an alternating waveform.

Hence, in each positive/negative period of the alternating input voltage VAC, the second rectification current is switched by the fast recovery type rectifier diode D1 or D2 to flow in an alternating waveform. As a result of the rectified current component thus forming an alternating waveform, as described thus far, a conduction angle of an alternating input current IAC is increased to improve a power factor.

When the alternating input voltage VAC of 150 V or higher is input in correspondence with the commercial alternating-current power supply AC=200 V system, the switch S is turned off. A circuit configuration of the power factor improving circuit 3 when the switch S is off is similar to that of the power factor improving circuit 3 in the power supply circuit according to the fifth embodiment shown in FIG. 12. Specifically, in this case, the series connection circuit of the smoothing capacitors Ci1–Ci2 is charged with rectified current by full-wave rectification operation. Thereby a rectified and smoothed voltage Ei (direct-current voltage) having a level corresponding to the alternating input voltage VAC multiplied by unity is obtained as voltage across the series connection circuit of the smoothing capacitors Ci1–Ci2.

Also in this case, as described with reference to FIG. 12, an operation of switching the second rectification current by the fast recovery type rectifier diode D1 or D2 in each positive/negative period of the alternating input voltage VAC is obtained to improve the power factor.

An equivalent circuit of the power supply circuit according to the seventh embodiment shown in FIG. 23 when a state of loose coupling is set with a coupling coefficient of about 0.7 to 0.8 as a coefficient of coupling between a primary winding N1 and a secondary winding N2 side of an isolated converter transformer PIT is shown in FIG. 20 described earlier. Thus, an actual leakage inductance of the primary winding N1 of the isolated converter transformer PIT in this case is also represented as $Lk11+Lk1$ As a result, the coupling coefficient between the primary side and the secondary side when viewed as that of the power supply circuit as a whole is 0.8 or lower.

Thus, the power supply circuit according to the seventh embodiment is also configured such that the isolated converter transformer PIT singly obtains a coupling coefficient of 0.90 or higher as described with reference to FIG. 13, for example.

An equivalent circuit of the power supply circuit of FIG. 23 when the coupling coefficient of the isolated converter transformer PIT is set to 0.90 or higher is shown in FIG. 21.

Thus, also in the power supply circuit shown in FIG. 23, the part of the series connection circuit of the primary winding N1 of the isolated converter transformer PIT and a primary winding N11 of the loosely coupled transformer VFT can be considered to have one leakage inductance component (Lk11+LK1) connected in series between an exciting inductance Le1 of the primary winding N1 of the isolated converter transformer PIT and an exciting inductance Le11 of the primary winding N11 of the loosely coupled transformer VFT.

Supposing that the power supply circuit of FIG. 23 is represented by the equivalent circuit of FIG. 21, the actual isolated converter transformer PIT in the power supply circuit according to the seventh embodiment is formed in the same manner as in the foregoing sixth embodiment, whereby a coupling coefficient of 0.93 is obtained. Thereby the same values as described in the sixth embodiment are obtained for an inductance LN1 and the leakage inductance LK1 of the primary winding N1 of the isolated converter transformer PIT and an inductance LN2 and a leakage inductance LK2 of the secondary winding N2.

The loosely coupled transformer VFT is also actually configured in the same manner as in the sixth embodiment, and thereby has a coupling coefficient of 0.75. In addition, the same values as in the sixth embodiment are obtained for an inductance LN11 of the primary winding N11 of the loosely coupled transformer VFT and an inductance LN12 of the secondary winding N12.

As a result, the power supply circuit as a whole configured as shown in FIG. 23 which circuit is represented as the equivalent circuit of FIG. 21 has a coupling coefficient of 0.84. Thus a coupling coefficient higher than 0.80 is obtained.

Figure 25:
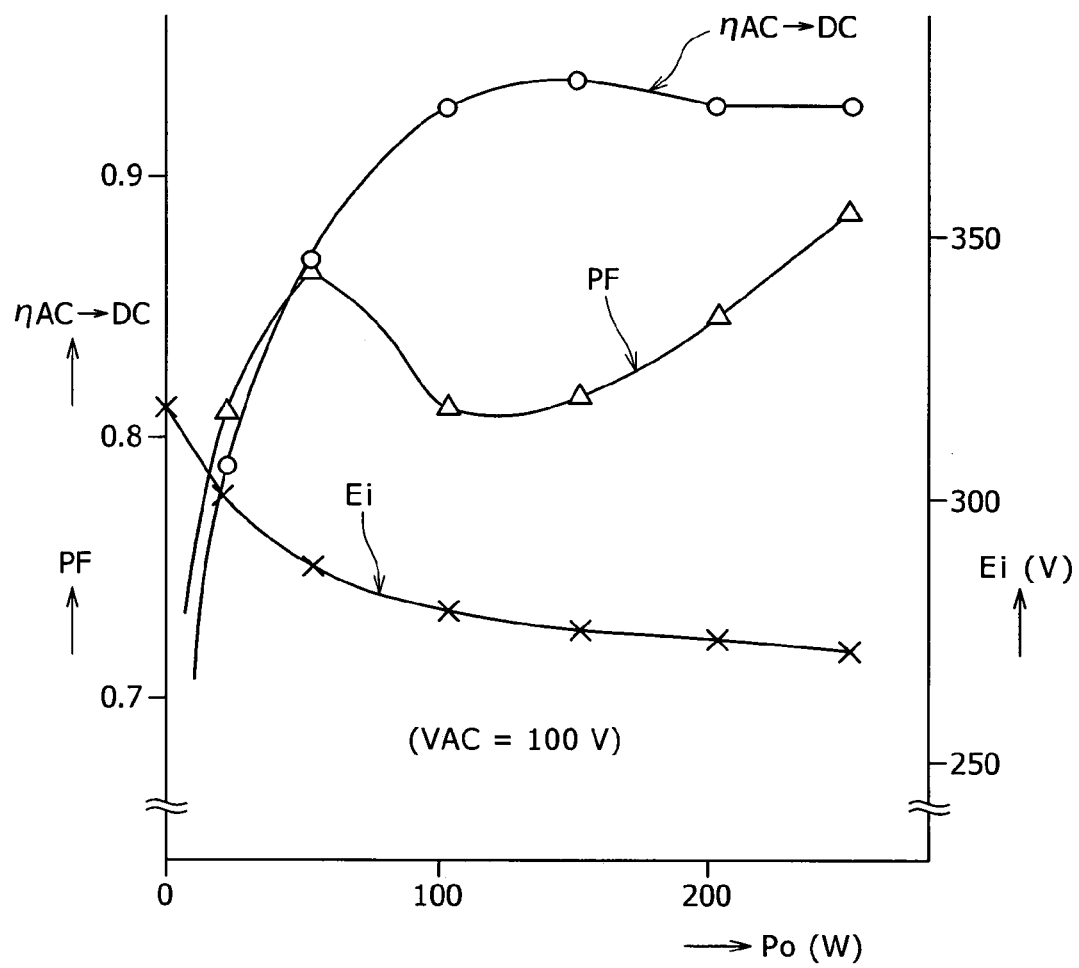
FIG. 25 is a diagram showing characteristics (VAC=100 V) of a power factor, power conversion efficiency, and rectified and smoothed voltage level with respect to load variation in the power supply circuit according to the seventh embodiment.
Figure 26:
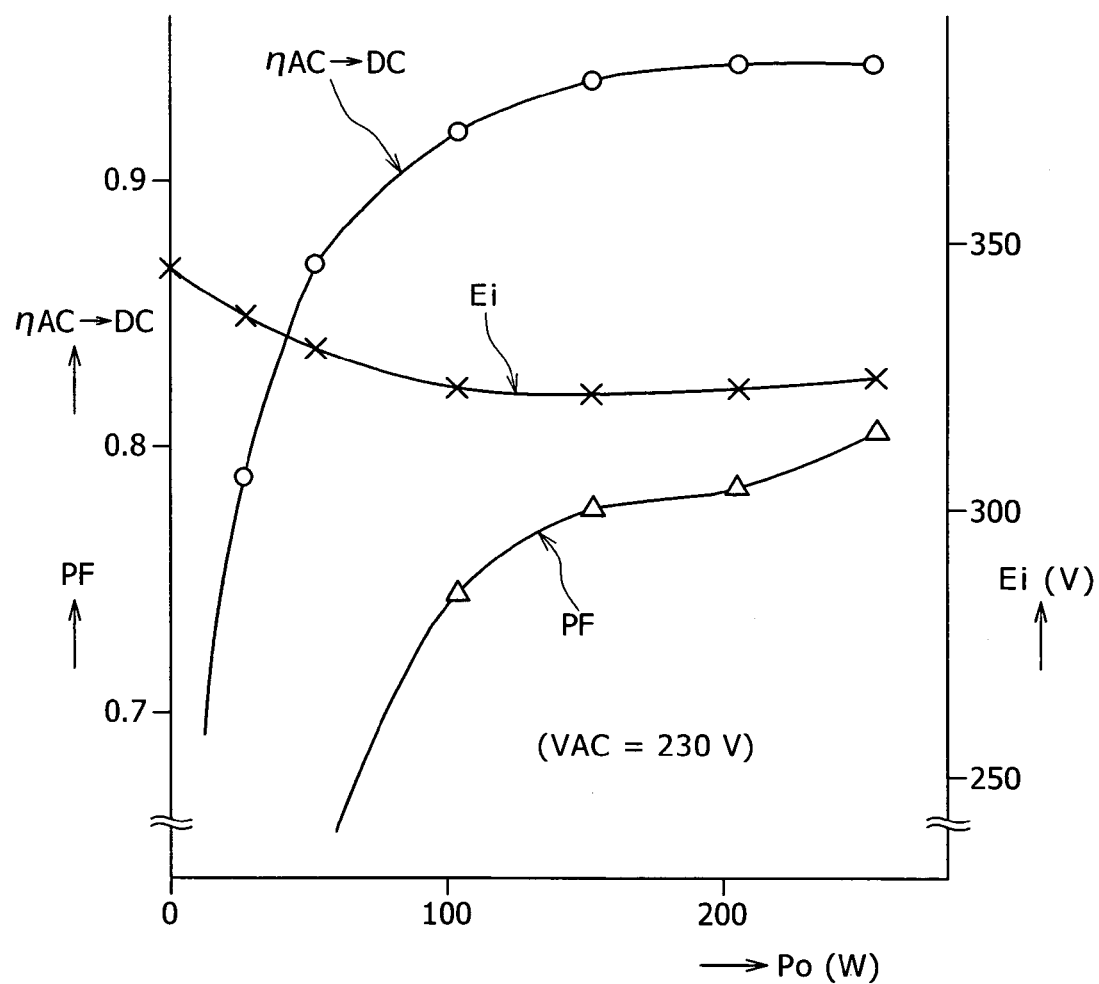
FIG. 26 is a diagram showing characteristics (VAC=230 V) of a power factor, power conversion efficiency, and rectified and smoothed voltage level with respect to load variation in the power supply circuit according to the seventh embodiment.

FIG. 25 and FIG. 26 show changes in AC/DC power conversion efficiency ($\eta$AC/DC), the power factor PF, and the rectified and smoothed voltage Ei with respect to variation of load power Po=0 to 250 W, as experimental results of the power supply circuit of FIG. 17 having the coupling coefficient of 0.84 as the equivalent circuit of FIG. 21. FIG. 25 shows characteristics when the alternating input voltage VAC=100 V (at the time of the AC 100 V system). FIG. 26 shows characteristics when the alternating input voltage VAC=230 V (at the time of the AC 200 V system). In obtaining the experimental results shown in this figure, 0.022 µF is selected for a primary side series resonant capacitor C1.

According to FIG. 25 and FIG. 26, with respect to the variation of load power Po=0 to 250 W, the level of the rectified and smoothed voltage Ei is varied in a range of 46 V when the alternating input voltage VAC=100 V, and is varied in a range of 19 V when the alternating input voltage VAC=230 V. This experimental result also indicates that the range of variation of the level of the direct-current input voltage is sufficiently reduced in the complex resonant converter that deals with the load power Po=250 W or higher at the times of both the AC 100 V system and the AC 200 V system.

Characteristics of the AC/DC power conversion efficiency shown in these figures also indicate that a curve in a range of load variation in which range the load is light is gentle, and that therefore a decrease in the power conversion efficiency under light-load conditions is suppressed or the power conversion efficiency is improved.

As for the power factor, PF>0.80 is maintained in a range of the load power Po=15 W to 250 W at the time of the alternating input voltage VAC=100 V, and PF>0.75 is maintained in a range of the load power Po=100 W to 250 W at the time of the alternating input voltage VAC=230 V. Thus a power supply harmonic distortion regulation is met in both input conditions of the alternating input voltage VAC.

Since such characteristics are obtained, the power supply circuit according to the seventh embodiment has the same effects as the fifth and sixth embodiments described earlier.

Figure 24:
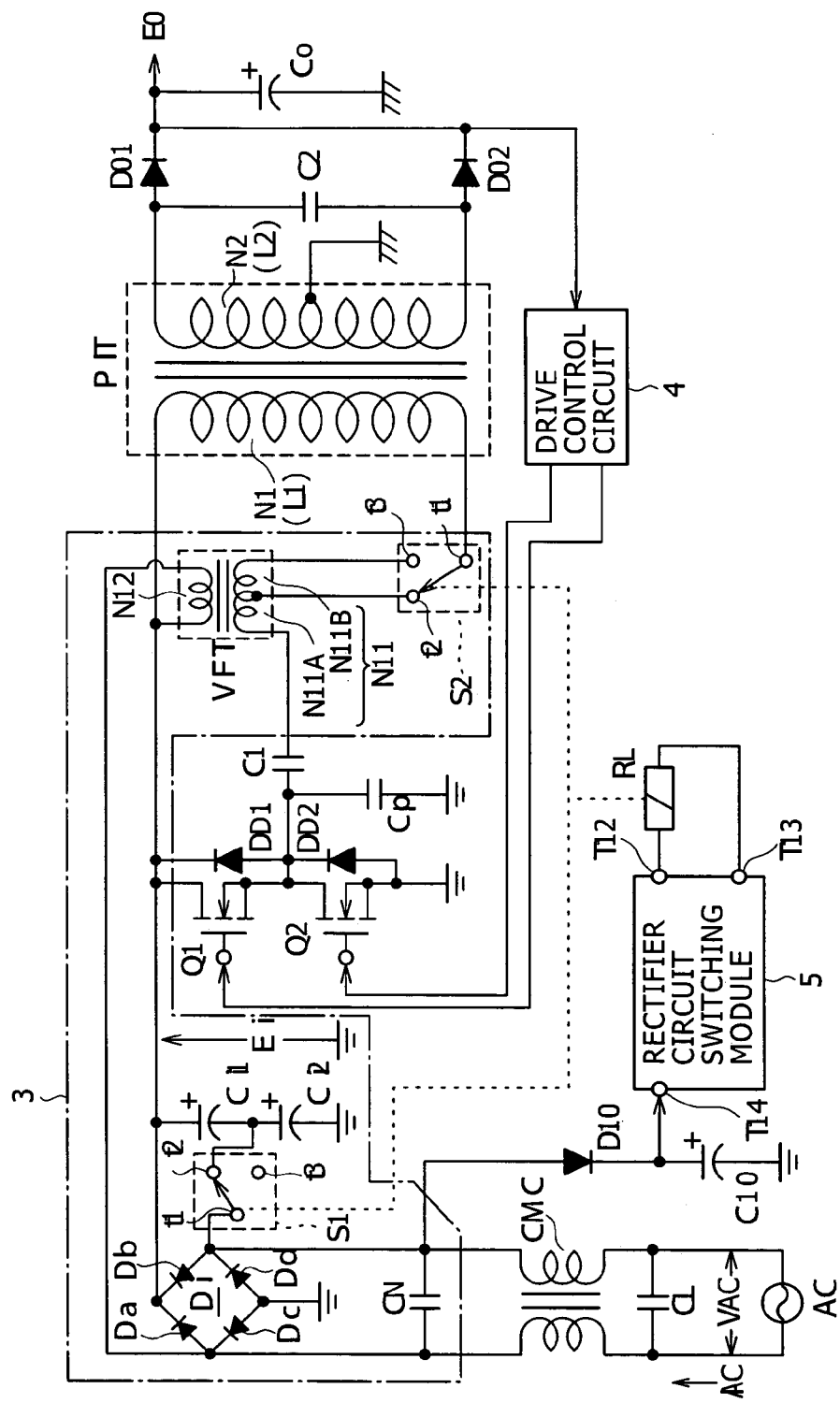
FIG. 24 is a circuit diagram showing a modification of the power supply circuit according to the seventh embodiment.

FIG. 24 shows a modification of the power supply circuit according to the seventh embodiment. Incidentally, in this figure, the same parts as in FIG. 23 are identified by the same reference numerals, and description thereof will be omitted.

In the power factor improving circuit 3 of the circuit shown in this figure, the fast recovery type rectifier diodes D1 and D2 shown in FIG. 23 are omitted. Instead, in this case, a fast recovery type rectifier diode is selected as rectifier diodes Da to Dd forming a bridge rectifier circuit Di.

A point of connection between smoothing capacitors Ci1–Ci2 in this case is connected to a terminal t2 of a relay switch S1.

The relay switch S1 is a so-called two-position switch. The relay switch S1 is switched such that a terminal t1 is alternatively connected to either the terminal t2 or a terminal t3 by an electromagnetic relay RL to be described later.

In this case, one end of a secondary winding N12 of a loosely coupled transformer VFT is connected to a positive electrode line of a rectified and smoothed voltage Ei (direct-current input voltage). Another end of the secondary winding N12 of the loosely coupled transformer VFT is connected to a positive electrode line of a commercial alternating-current power supply AC and a positive electrode input terminal of the bridge rectifier circuit Di.

A primary winding N11 of the loosely coupled transformer VFT in this case is formed so as to be divided into winding parts N11A and N11B via a tap. An end of the winding part N11A is connected to a switching output point via a series resonant capacitor C1. A point of connection between the winding parts N11A and N11B is connected to a terminal t2 of a relay switch S2. An end of the winding part N11B is connected to a terminal t3 of the relay switch S2.

The relay switch S2 is also a two-position switch. The relay switch S2 is switched such that a terminal t1 is alternatively connected to either the terminal t2 or the terminal t3 by the electromagnetic relay RL.

In this figure, a rectifier circuit switching module 5 is provided as a circuit part for driving the relay RL. A direct-current voltage obtained by a half-wave rectifier circuit comprising a diode D10 and a capacitor C10 is input as a detection voltage to a terminal T14 of the rectifier circuit switching module 5 in this case. Since the half-wave rectifier circuit (D10 and C10) is supplied with the commercial alternating-current power supply AC and performs rectification operation, the rectifier circuit switching module 5 detects a level of an alternating input voltage VAC.

The electromagnetic relay is connected between terminals T12 and T13 of the rectifier circuit switching module 5. The rectifier circuit switching module 5 drives the electromagnetic relay RL by on/off control of a current to be made to flow between the terminals T12 and T13, thus switching the relay switches S1 and S2.

When the detected level of the alternating input voltage VAC is lower than 150 V (at the time of the AC 100 V system), the rectifier circuit switching module 5 drives the electromagnetic relay RL such that the terminals t1–t2 of the relay switches S1 and S2 are connected to each other.

First, when the terminals t1–t2 are connected to each other in the relay switch S1, a voltage doubler rectifier circuit is formed in the power factor improving circuit 3.

Specifically, in a period of positive polarity of the alternating input voltage VAC, a rectification current flows through a path of the positive electrode line of the commercial alternating-current power supply AC→the rectifier diode Da→the smoothing capacitor Ci1→(the relay switch S1)→the negative electrode line of the commercial alternating-current power supply AC (filter capacitor CN). At this time, a current also flows through a path of the positive electrode line of the commercial alternating-current power supply AC→the secondary winding N12 of the loosely coupled transformer VFT→the smoothing capacitor Ci1→(the relay switch S1)→the negative electrode line of the commercial alternating-current power supply AC (filter capacitor CN).

Thus, the smoothing capacitor Ci1 is charged with the rectification current, whereby a direct-current voltage having a level equal to the alternating input voltage VAC multiplied by unity is obtained as voltage across the smoothing capacitor Ci1.

Since the secondary winding N12 of the loosely coupled transformer VFT is inserted as described above, an alternating voltage having a switching period is superimposed on the rectification current path, and the first rectification current is switched by the fast recovery type rectifier diode Da to form an alternating waveform.

In a period of negative polarity of the alternating input voltage VAC, the rectification current flows through a path of the negative electrode line of the commercial alternating-current power supply AC→(the relay switch S1)→the smoothing capacitor Ci2→the rectifier diode Dc→the positive electrode line of the commercial alternating-current power supply AC (filter capacitor CN).

At this time, the smoothing capacitor Ci2 is charged with the rectification current, whereby a direct-current voltage having a level equal to the alternating input voltage VAC multiplied by unity is obtained as voltage across the smoothing capacitor Ci2. Thereby a rectified and smoothed voltage Ei (direct-current input voltage) that is a direct-current voltage having a level corresponding to twice the alternating input voltage VAC is obtained as voltage across the smoothing capacitors Ci1–Ci2 connected in series with each other. That is, a voltage doubler rectifier operation is obtained.

The secondary winding N12 of the loosely coupled transformer VFT is connected to a cathode side of the rectifier diode Dc. Therefore the rectification current flowing through the above-described path is switched by the fast recovery type rectifier diode Dc to form an alternating waveform.

When the terminals t1–t2 on the relay switch S2 side are connected to each other, only the winding part N11A is effective as the primary winding N11 of the loosely coupled transformer VFT.

Next, when the detected level of the alternating input voltage VAC is 150 V or higher (at the time of the AC 200 V system), the rectifier circuit switching module 5 drives the electromagnetic relay RL such that the terminals t1–t3 of the relay switches S1 and S2 are connected to each other.

When the terminals t1–t3 are connected to each other in the relay switch S1, the terminal t2 is open, so that the point of connection between the smoothing capacitors Ci1–Ci2 is not connected to the negative electrode line of the commercial alternating-current power supply AC. Thus a full-wave rectifier circuit is formed as rectifier circuit.

Specifically, in a period of positive polarity of the alternating input voltage VAC, a rectification current flows through a path of the positive electrode line of the commercial alternating-current power supply AC→the smoothing capacitors Ci1–Ci2→the rectifier diode Dd→the negative electrode line of the commercial alternating-current power supply AC (filter capacitor CN). At this time, a charging current branches off to flow from the positive electrode line of the commercial alternating-current power supply AC through the secondary winding N12 of the loosely coupled transformer VFT to the smoothing capacitors Ci1→Ci2.

In a period of negative polarity of the alternating input voltage VAC, the rectification current flows through a path of the negative electrode line of the commercial alternating-current power supply AC→the rectifier diode Db→the smoothing capacitors Ci1–Ci2→the rectifier diode Dc→the positive electrode line of the commercial alternating-current power supply AC (filter capacitor CN).

Thus, in each positive/negative period of the alternating input voltage VAC, the smoothing capacitors Ci1–Ci2 connected in series with each other are charged with the rectified current, whereby a rectified and smoothed voltage Ei (direct-current input voltage) having a level corresponding to the alternating input voltage VAC multiplied by unity is obtained as voltage across the smoothing capacitors Ci1→Ci2. That is, a full-wave rectification operation is obtained.

When the terminals t1–t3 on the relay switch S2 side are connected to each other, the series connection of the winding parts N11A and N11B is effective as the primary winding N11 of the loosely coupled transformer VFT.

It is understood from the description thus far that as with the power supply circuit shown in FIG. 23, the power supply circuit shown in FIG. 24 is capable of a wide range by employing a configuration in which the rectifier circuit system for generating the rectified and smoothed voltage Ei is switched between the voltage doubler rectifier operation at the time of the AC 100 V system and the full-wave rectification operation at the time of the AC 200 V system.

At both times of the AC 100 V system and the AC 200 V system, the rectification current is switched by one of the rectifier diodes Da to Dd forming the bridge rectifier circuit Di in each positive/negative period of the alternating input voltage VAC, so that a power factor improving operation is also obtained.

In addition, the primary winding N11 of the loosely coupled transformer VFT in the circuit shown in FIG. 24 is changed such that only the winding part N11A is effective when the alternating input voltage VAC is lower than 150 V (at the time of the AC 100 V system) and the series connection of the winding parts N11A–N11B is effective when the alternating input voltage VAC is 150 V or higher (at the time of the AC 200 V system). That is, the change is made such that the number of turns of the primary winding N11 of the loosely coupled transformer VFT is larger at the time of the AC 200 V system than at the time of the AC 100 V system.

When the number of turns of the primary winding N11 of the loosely coupled transformer VFT is changed, a turns ratio between the primary winding N11 and the secondary winding N12 is changed, and also the level of the alternating voltage induced in the secondary winding N12 and to be fed back to the rectification current path is changed.

As a result, a power factor in the present embodiment is about 0.75 at the time of the AC 100 V system under a condition of the load power Po=about 250 W, for example, and thus power conversion efficiency is improved.

It is known that in the configuration for improving the power factor by voltage feedback of switching output to the rectification current path by the loosely coupled transformer VFT as in the power supply circuits according to the embodiments described thus far, for example, a ripple voltage of a high-frequency component is superimposed on the direct-current input voltage (rectified and smoothed voltage) Ei.

Accordingly, in the circuit shown in FIG. 24, while one end of a primary winding N1 is connected from the primary winding N11 of the loosely coupled transformer VFT via a primary side series resonant capacitor C1 to the switching output point, another end of the primary winding N1 is connected to a positive electrode terminal of the smoothing capacitor Ci1. That is, instead of being connected to the primary side ground, one end of the primary side series resonant circuit is connected to the positive electrode line of the rectified and smoothed voltage Ei.

In such a case, for example a primary side resonance current flowing through the primary winding N11 of the loosely coupled transformer VFT and the rectification current in an alternating waveform flowing through the secondary winding N12 of the loosely coupled transformer VFT can be set to be of phases opposite to each other.

When one end of the primary winding N1 is thus connected to the positive electrode terminal of the smoothing capacitor Ci1 and the primary side resonance current and the current flowing within the power factor improving circuit 3 are of phases opposite to each other, a high-frequency component of the primary side resonance current as the switching output is cancelled out by a switching output component of opposite phase fed back by voltage feedback in the power factor improving circuit 3.

As a result, the ripple voltage component of the rectified and smoothed voltage Ei is suppressed.

Incidentally, the primary side resonance current and the current flowing within the power factor improving circuit 3 can be set to be of phases opposite to each other as described above by a winding direction of each of the windings (N11 and N12) of the loosely coupled transformer VFT, for example.

In addition, the setting can be made by relation between winding directions of the windings (N11 and N12) of the loosely coupled transformer VFT and the windings (N1 and N2) of an isolated converter transformer PIT, for example.

Also in the power supply circuit shown in FIG. 24, a parallel resonant capacitor C2 is connected in parallel with the secondary winding N2 of the isolated converter transformer PIT to thereby form a secondary side parallel resonant circuit as a voltage resonant circuit for converting operation of a secondary side rectifier circuit into a voltage resonant type operation, or a partial voltage resonant circuit for obtaining a partial voltage resonant operation.

Incidentally, also in the seventh embodiment, the secondary side parallel resonant circuit may be added to the circuit configuration shown in FIG. 23, for example.

The present invention is not limited to the configurations of the power supply circuits described thus far.

As switching devices, for example, devices other than MOS-FETs, such as IGBTs (Insulated Gate Bipolar Transistors), may be used as long as the devices are usable in an external excitation system. Also, constants and the like of the parts and elements described above may be changed according to an actual condition or the like.

In addition, a power supply circuit according to the present invention can be formed with a current resonant converter of a self-excited type using a half-bridge coupling system. In this case, a bipolar transistor, for example, can be selected as a switching device.

Further, the circuit configuration for generating the secondary side direct-current output voltage on the secondary side of the isolated converter transformer PIT, for example, may be changed as appropriate.

Further, the configuration of the power factor improving circuit 3 is not limited to other than those shown in the foregoing embodiments, and applicable configurations may be selected from circuit configurations using various voltage feedback systems that have hitherto been proposed by the present applicant.

The invention claimed is:

1. A switching power supply circuit comprising:

rectifying and smoothing means including a plurality of low-frequency rectifying devices for rectifying an alternating input voltage in each positive/negative period of the alternating input voltage and a smoothing capacitor for smoothing the voltage rectified by the low-frequency rectifying devices;

switching means for being supplied with the rectified and smoothed voltage generated by said rectifying and smoothing means and performing switching operation, said switching means being formed with two switching devices coupled by half-bridge coupling;

switching-driving means for switching-driving said two switching devices such that said two switching devices are turned on/off alternately;

an isolated converter transformer having a core in which a gap is formed, and a primary winding and a secondary winding wound around the core, said primary winding supplied with a switching output obtained by the switching operation of said switching means and said secondary winding in which an alternating voltage as the switching output obtained in the primary winding is induced being in a state of loose coupling;

a primary side series resonant circuit for being supplied with the switching output from said switching means and converting operation of said switching means into a current resonant type operation, said primary side series resonant circuit being formed by at least a leakage inductance component of said primary winding and a capacitance of a primary side series resonant capacitor connected in series with said primary winding;

direct-current output voltage generating means configured to generate a secondary side direct-current output voltage by receiving the alternating voltage obtained in said secondary winding and performing a rectifying operation;

constant-voltage control means configured to perform constant-voltage control on said secondary side direct-current output voltage by varying switching frequency of said switching means by controlling said switching-driving means according to level of said secondary side direct-current output voltage;

a power factor improving transformer having a core in which a gap of a predetermined length is formed, and a power factor improving primary winding and a power factor improving secondary winding wound around the core, said power factor improving primary winding inserted in series with said primary side series resonant circuit and said power factor improving secondary winding connected in parallel with a rectifying current path formed as said rectifying and smoothing means being in a state of loose coupling; and a plurality of high-frequency rectifying devices connected in series with said power factor improving secondary winding, for performing switching operation in each positive/negative period of the alternating voltage induced in the power factor improving secondary winding by said power factor improving primary winding, said alternating voltage having a high frequency as compared with frequency of said alternating input voltage.

2. A switching power supply circuit as claimed in claim 1, wherein, said rectifying and smoothing means is voltage doubler rectifying and smoothing means, including two smoothing capacitors, that is, a smoothing capacitor for smoothing the voltage obtained by rectifying said alternating input voltage by the rectifying device in a positive period of said alternating input voltage, and a smoothing capacitor for smoothing the voltage obtained by rectifying said alternating input voltage by the rectifying device in a negative period of said alternating input voltage, and formed such that a voltage obtained by accumulating voltages across said two smoothing capacitors is said rectified and smoothed voltage.

3. A switching power supply circuit comprising:

rectifying and smoothing means including a plurality of rectifying devices for rectifying an alternating input voltage in each positive/negative period of the alternating input voltage and a smoothing capacitor for smoothing the voltage rectified by the rectifying devices;

switching means for being supplied with the rectified and smoothed voltage generated by said rectifying and smoothing means and performing switching operation, said switching means being formed with two switching devices coupled by half-bridge coupling;

switching-driving means for switching-driving said two switching devices such that said two switching devices are turned on/off alternately;

an isolated converter transformer having a core in which a gap of a predetermined length is formed, and a primary winding and a secondary winding wound around the core, said primary winding supplied with a switching output obtained by the switching operation of said switching means and said secondary winding in which an alternating voltage corresponding to the switching output obtained in the primary winding is induced being in a state of loose coupling;

a primary side series resonant circuit for being supplied with the switching output from said switching means and converting operation of said switching means into a current resonant type operation, said primary side series resonant circuit being formed by at least a leakage inductance component of said primary winding and a capacitance of a primary side series resonant capacitor connected in series with said primary winding;

direct-current output voltage generating means configured to generate a secondary side direct-current output voltage by receiving the alternating voltage obtained in said secondary winding and performing a rectifying operation;

constant-voltage control means configured to perform constant-voltage control on said secondary side direct-current output voltage by varying switching frequency of said switching means by controlling said switching-driving means according to level of said secondary side direct-current output voltage; and a power factor improving transformer having a core in which a gap of predetermined length is formed, and a power factor improving primary winding and a power factor improving secondary winding wound around the core, said power factor improving primary winding inserted in series with said primary side series resonant circuit and said power factor improving secondary winding connected in parallel with a rectifying current path formed as said rectifying and smoothing means being in a state of loose coupling;

wherein the rectifying devices of said rectifying and smoothing means perform switching operation on a basis of an alternating voltage induced in said power factor improving secondary winding by said power factor improving primary winding.

4. A switching power supply circuit as claimed in claim 3, wherein, said rectifying and smoothing means includes a circuit formed by four rectifying devices connected by bridge connection and two smoothing capacitors connected in series with each other such that said four rectifying devices connected by said bridge connection charge a series connection of said two smoothing capacitors with a rectified current obtained by full-wave rectification; and said switching power supply circuit further includes switch means inserted to switch on/off between said two smoothing capacitors and a line of an alternating current, and switch control means for performing control to turn off said switch means when level of said alternating current is a reference value or higher, and turn on said switch means when the level of said alternating current is lower than the reference value.

5. A switching power supply circuit as claimed in claim 3, wherein, said power factor improving primary winding is divided into two parts via a tap, and an end part of one divided part of said power factor improving primary winding is connected to said primary side series resonant capacitor; and said switching power supply circuit further includes switching means for performing switching to select an end part of the other divided part of said power factor improving primary winding and a terminal of said tap as a part to be connected to an end part of the primary winding of the isolated converter transformer, and switching control means for performing control to make said switching means select the end part of the other divided part of said power factor improving primary winding when level of said alternating current is a reference value or higher, and make said switching means select the terminal of said tap when the level of said alternating current is lower than the reference value.

6. A switching power supply circuit as claimed in one of claims 1, and 3, wherein, to deal with an increase in an equivalent leakage inductance component when said isolated converter transformer is viewed from a primary side due to setting of said power factor improving primary winding and said power factor improving secondary winding in a state of loose coupling, the gap of said isolated converter transformer is set to a length within a predetermined value.

7. A switching power supply circuit as claimed in one of claims 1, and 3, further comprising a primary side partial voltage resonant circuit formed by at least including a capacitance of a partial voltage resonant capacitor connected in parallel with at least one of said two switching devices and the leakage inductance component of said primary winding, said primary side partial voltage resonant circuit performing a voltage resonant operation only in accordance with timing of turning on or turning off of each said switching device.

* * * * *